United States Patent [19]

Diamant et al.

[11] Patent Number: 5,822,589
[45] Date of Patent: Oct. 13, 1998

[54] METHOD FOR LOCATING ERRORS IN A COMPUTER PROGRAM

[75] Inventors: John R. Diamant; Wade Satterfield; Kam Chooi Wong, all of Ft. Collins, Colo.

[73] Assignee: Hewlett-Packard Company, Palo Alto, Calif.

[21] Appl. No.: 760,443

[22] Filed: Dec. 6, 1996

[51] Int. Cl.[6] .................................................. G06F 11/00
[52] U.S. Cl. ........................ 395/704; 395/683; 395/705; 395/183.13
[58] Field of Search .................................. 395/701, 702, 395/703, 704, 705, 500, 183.01, 183.13, 183.14, 683; 707/103

[56] References Cited

U.S. PATENT DOCUMENTS 5,361,351  11/1994  Lenkov et al. ............................ 295/704
5,371,891  12/1994  Gray et al. ................................ 395/705
5,694,539  12/1997  Haley et al. .......................... 395/183.14
5,696,974  12/1997  Agrawal et al. .......................... 395/709

*Primary Examiner*—Emanuel Todd Voeltz
*Assistant Examiner*—Demetra R. Smith

[57] ABSTRACT

A system that automatically detects logical errors when compiling a program. The system detects such logical errors as calling a virtual function of a class passed into a function by value; virtual functions called from constructors or destructors; multiple definitions of classes, enums, or typedefs; multiple declarations of an object; mixing standard C I/O routines with C++ routines; a member function or data of a class hiding inherited member function or data; problems with the order of dynamic initialization; or failing to initialize non-static and non-class data members. The system also will suggest the use of the contact attribute for a member function that does not modify data members and suggest the use of const for parameters of functions when the parameter is not modified.

14 Claims, 20 Drawing Sheets

METHOD FOR LOCATING ERRORS IN A COMPUTER PROGRAM

FIELD OF THE INVENTION

This invention relates to computer systems and more particularly to programming languages within such computer systems. Even more particularly, the invention relates to detecting logical programming errors within programs written using such programming languages.

BACKGROUND OF THE INVENTION

Compilers for programming languages within computer systems routinely check for syntax errors before they will attempt to compile a program. This type of checking may be done prior to the compilation process or it may be done as part of the compilation process. Syntax errors include such things as misspelled key words, unbalanced parenthesis, undefined variables, etc. The newest compilers even combine a text editor with the compiler so that syntax is checked when a programming statement is typed in by a programmer. This allows the errors to be detected at the earliest possible moment.

While syntax error checking is very important, and must be performed if a program is to compile, it is desirable that checking for logical errors also be performed. Logical errors include performing statements in a illogical sequence, failing to perform statements that need to be performed, and even includes such things as typographical errors that would otherwise go undetected because they are syntactically correct. Most textbooks that teach how to use a programming language also include suggestions on avoiding many types of logical errors. Some books have been entirely devoted to the teaching of ways to avoid logical errors, for example, "Effective C++" by Scott Meyers, Addison Wesley Publishing Company, 1992. The subtitle of this book is "50 Specific Ways to Improve Your Programs and Designs". This same author, Scott Meyers, has also written other books and articles on detection of programming errors, such as "Automatic Detection of C++ Programming errors: initial Thoughts on a lint++", published at the 1991 USENIX Conference.

While books have suggested some errors, and some compilers and text editors include checking for a few of these errors, many more are not identified in books and/or have yet to be programmatically implemented. While books are an effective teaching tool, no one reads every book, so a computer implementation of the rules is a vast improvement over simply mentioning the rules within a book. Furthermore, books teach people how to avoid these problems, but they seldom provide a logical method whereby a program can perform an automatic check to detect a rule violation.

There is a need in the art then, for an improved method for detecting logical errors within a program. There is further need in the art, for a system that will detect many logical errors and inform a programmer when these logical errors are committed. The present invention meets these and other needs in the art.

SUMMARY OF THE INVENTION

It is an aspect of the present invention to detect errors within a computer program.

It is another aspect of the invention to detect logical programming errors wherein correct programming statements are entered in an illogical order.

The above and other aspects of the invention are accomplished in a system that automatically detects many logical errors when compiling the source code of a programming language. The present invention detects logical errors with the C and C++ programming languages, such as calling a virtual function of a class passed into a function by value; leaving data members uninitialized because of the use of a default constructor; virtual functions called from constructors or destructors; multiple definitions of classes, enums, or typedefs; multiple declarations of an object and disabling compiler type checking; mixing standard C programming language I/O routines with C++ I/O routines, causing out of order output; a member function or data of a class hiding inherited member function or data; problems with the order of dynamic initialization; or failing to initialize all data members in a user written constructor. The invention also will suggest the use of the const attribute for a member function that does not modify data and require the use of const for parameters of functions when the parameter is not modified.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
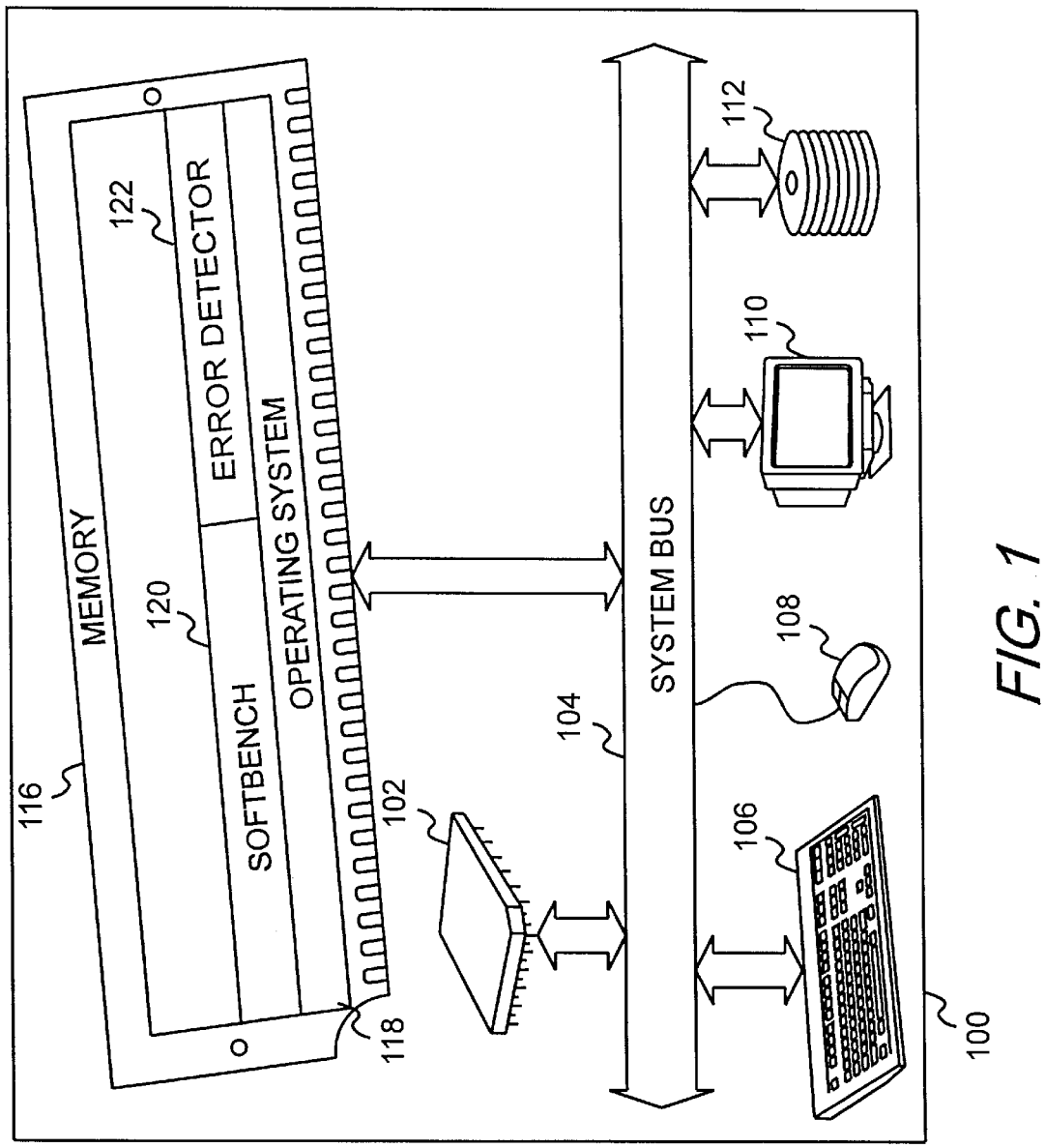
FIG. 1 shows a computer system incorporating the error detection method of the present invention.

FIG. 1 shows a block diagram of a computer system that incorporates the error detection method of the present invention. Referring now to FIG. 1, a computer system 100 contains a processor 102 that communicates to other elements of the computer system 100 over a system bus 104. A keyboard 106 and a mouse 108 allow input to the computer system 100 and a display device 110 allows software within the computer system 100 to output text and graphical information to a user of the computer system 100. A disk 112 stores the software and data of the present invention.

A memory 116 contains an operating system 118, which may be any one of a number of operating systems, such as the Unix(tm) Operating System, the Microsoft Windows Operating System, or other operating systems. The memory 116 also contains the SoftBench system 120, which provides a compiler, parser and a softcheck utility that contains the error detector 122 of the present invention.

In operation, a user of the computer system 100 loads the SoftBench system 120 through the operating system 118. The user then enters source code for a computer program by typing source code lines of the computer program on the keyboard 106 or by loading previously typed in programs from the disk 112. The user then commands the SoftBench system 120 to run the softcheck utility to analyze the programs that have been entered. One of the steps of the softcheck utility within the SoftBench system 120 is to call the error detector 122 of the present invention.

Figure 2:
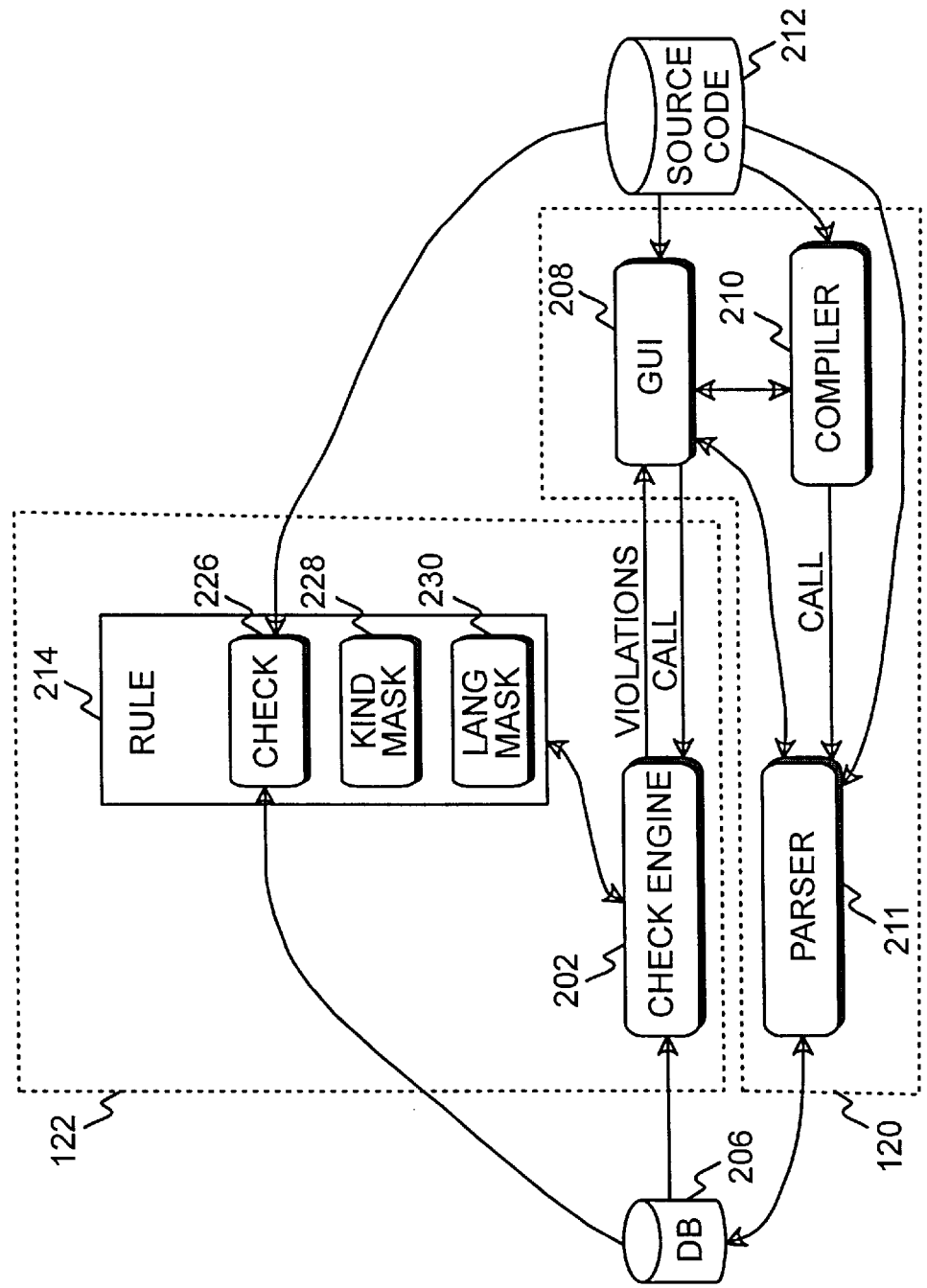
FIG. 2 shows a block diagram of the high level operation of the compiler and error detection method of FIG. 1.

FIG. 2 shows a block diagram of the high level operation of the SoftBench system 120 and the error detector 122 of FIG. 1. Referring now to FIG. 2, the user interacts with the system through the Graphical User Interface (GUI) system 208 to request that a compiler 210 compile and a parser 211 parse their program, and to request that the error detector 122, also called a softcheck utility, analyze their program. During the parsing process, the parser 211 separates each symbol within the users program and builds a database 206 of the symbols. Within the database 206, each symbol is identified with a "kind" indicator. The kind indicator identifies the kind of symbol, for example, the symbol might be a variable, or it might be a function name, etc. This type of separation of the symbols and identifying their kind is typical in all commercially available compilers, and is well known in the art. A description of the database 206 is contained in Appendix A attached hereto and incorporated herein by reference.

The softcheck utility 122 contains a check engine 202 that searches the database 206 for the symbols within the user's program and passes the symbols of interest on to the rules for processing. To determine which symbols are of interest, the check engine 202 calls the kindmask method 228 of each rule 214 to determine the kinds of symbols the rule wants from the check engine 202. For the remaining rules, the check engine 202 searches the database 206 and each time a new symbol is found, the check engine 202 calls the kindmask method 228 of each rule to check for a match between the symbol found and the kind of symbol the rule can process.

When a match occurs between the kind of symbol that a rule can process, and the kind of the symbol retrieved by check engine 202 and lang mask 230, check engine 202 calls the rule to process the particular kind of symbol. Each of the rules contained within the present invention is explained below with respect to one or more of the remaining FIGS. 3–19 of the present invention. Check engine 202 will call the appropriate FIG. 3–19 depending upon the kind of symbol retrieved, or it may call more than one figure for a symbol. For some rules, the rule is called once to process all symbols.

In the preferred embodiment of the present invention, each rule is written as a class within the C++ programming language. One of the methods of each rule class is a method called the "kindmask" 228 and when called, this method returns an indicator of the kind of symbol the rule will process. Another method within each rule class is called the language mask or "langmask" 230 and when this method is called it returns an indicator of the particular language that the rule will process. The method of each rule that is called by check engine 202 to perform the actual rule checking is called the "check" method 226. The following figures are flowcharts of the check method within the various rules defined within the present invention.

Figure 3:
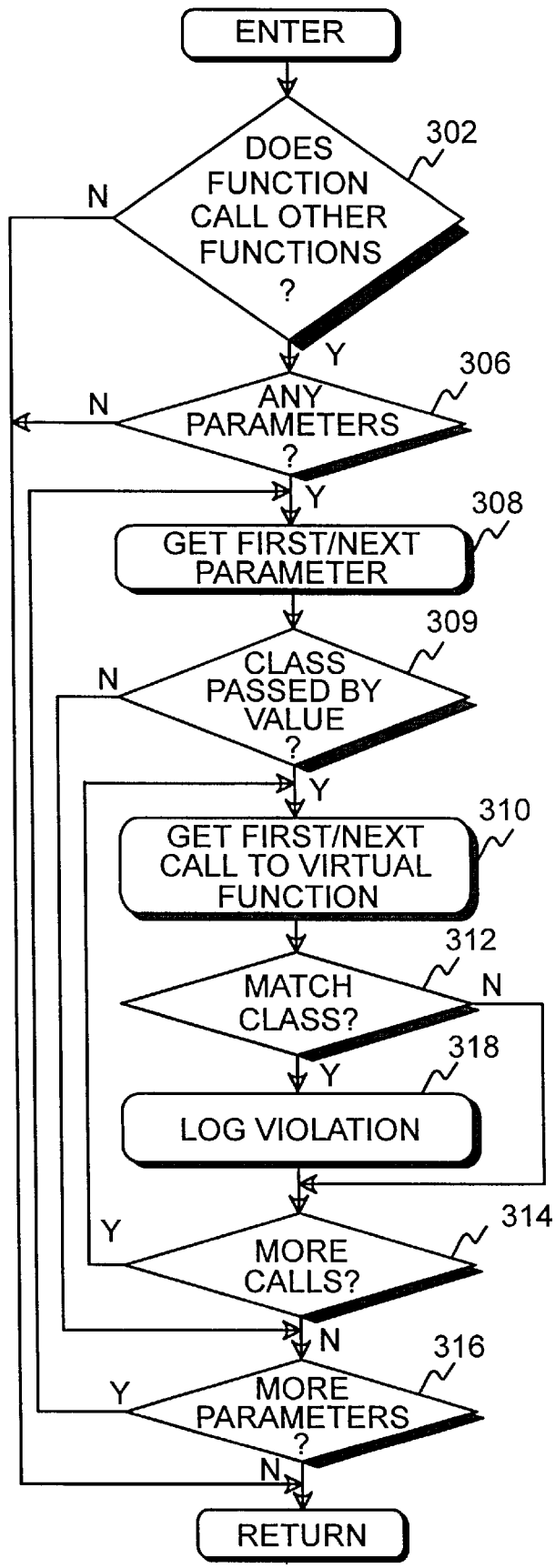
FIG. 3 shows a flowchart of a method for detecting calling of a virtual function of a class passed in by value.

FIG. 3 shows a flowchart for the check method of a rule 214 that determines whether a routine is attempting to call a virtual function of a class that was passed into the routine by value. Referring now to FIG. 3, after entry, block 302 identifies a list of functions called by this routine. If it calls no other functions, it cannot possibly call a virtual function of a class passed in by value. Therefore, if it does not call any other functions, block 302 simply returns to FIG. 2.

If the function being examined does call other functions, block 302 transfers to block 306 which determines if there is at least one parameter. If none is found, block 306 returns to FIG. 2.

If a parameter is found, block 306 transfers to block 308 which gets the first or next parameter to the function. Block 309 determines whether the parameter is a class passed by value, and if not, transfers to block 316. If the parameter is a class passed in by value, block 309 goes to block 310. Block 310 then gets the first or next call to a function within the function being examined and determines whether it is a virtual function and block 312 determines whether the virtual function is a member function of the class passed in by value. If so, block 312 transfers to block 318 which logs a violation and then transfers to block 314.

If the class did not match, block 312 goes to block 314 which determines whether there are more calls within the function and if there are, transfers back to block 310 to get the next call. After all calls from within the function have been examined, block 314 goes to block 316 which determines whether there are more parameters, and if there are, transfers back to block 308 to get the next parameter. After all parameters have been examined block 316 returns to FIG. 2.

Figure 4A:
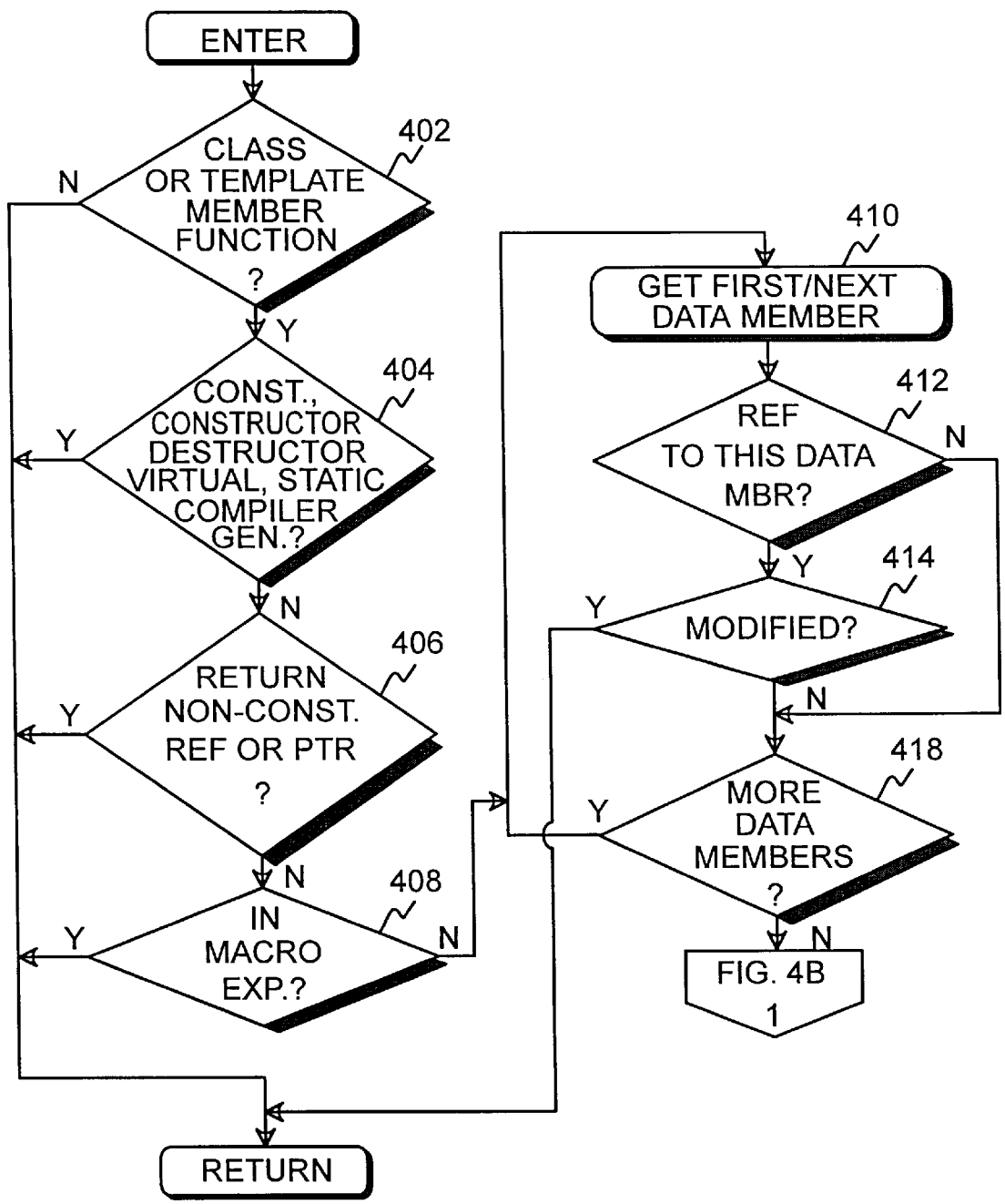
FIGS. 4A and 4B show a flowchart of a method for suggesting the use of const for member functions when no data member is modified within the member function.
Figure 4B:
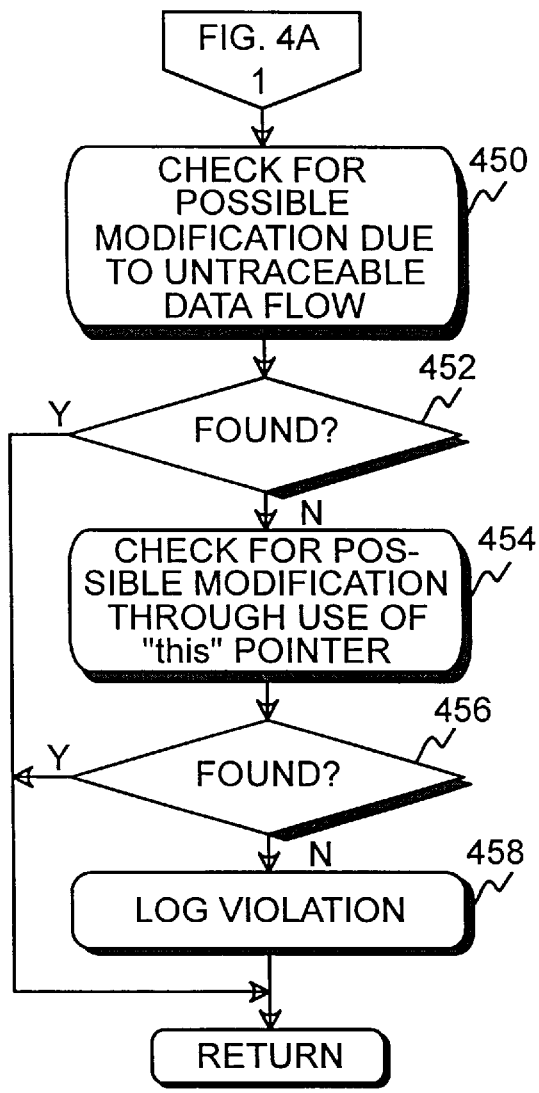

FIGS. 4A and 4B show a flowchart of a rule for suggesting that member functions of a class be labeled as const when no data members are modified by the member function. Referring now to FIG. 4A, after entry, block 402 determines whether the object being examined by the rule is a member function of a class or class template and if not, block 402 simply returns to FIG. 2 since only functions that are members of classes or class templates are examined by this rule. If a class or class template member function is being examined, block 402 goes to block 404 which determines whether the function member being examined is already a const member function, is a constructor, a destructor, a virtual member function, a static member function, or a compiler generated function. Since these are not subject to the rule, when the function being examined is one of them, block 404 simply returns to FIG. 2.

If not, block 404 goes to block 406 which determines whether the function returns a non-const reference or pointer. These functions are skipped since some programming styles do not want such functions declared const because they allow the caller to modify the contents and lead to a violation of the spirit of the use of the const type modifier. If this is true, block 406 returns to the caller, but if not, block 406 goes to block 408 which determines whether the function is in a macro expansion, and if it is, block 408 returns to the caller.

If the function is not in a macro expansion, it will be examined, so block 408 goes to block 410 which gets the first or next data member within the class of the member function and block 412 determines whether there is a reference to this data member within the function. If there are no references to the data member, block 412 simply goes to block 418 since the data member is of no interest. If there is a reference to the data member, block 412 goes to block 414 which determines whether the data member is modified, and if not, block 414 goes to block 418 since this data member will not cause the rule to fail. If the data member is modified, however, block 414 returns. If the data member is not modified, control then goes to block 418 which checks to see if there are more data members to be examined and if there are, block 418 returns to block 410 to get the next data member and examine it.

After all data members have been examined, block 418 transfers to block 450 on FIG. 4B. Block 450 determines whether a data member modification may have been missed because it is untraceable by this analysis. This checks for a modification to a non-const reference to an object; any address operation; any call to a function with parameters that could be modified, that is, a non-value, non-const parameter; any call to a non-const member function; and any call to a member function that returns a pointer or a non-const reference.

If a modification possibly exists, block 452 returns to FIG. 2 since this function is not a candidate for const. If not, block 452 goes to block 454 which determines whether a data member may be modified through an explicit use of the "this" pointer. If any explicit reference to the "this" pointer is found, block 456 returns to FIG. 2 since the function modifies a data member and is not a candidate for the const type modifier. If not, block 456 goes to block 458 which logs a violation.

Figure 5:
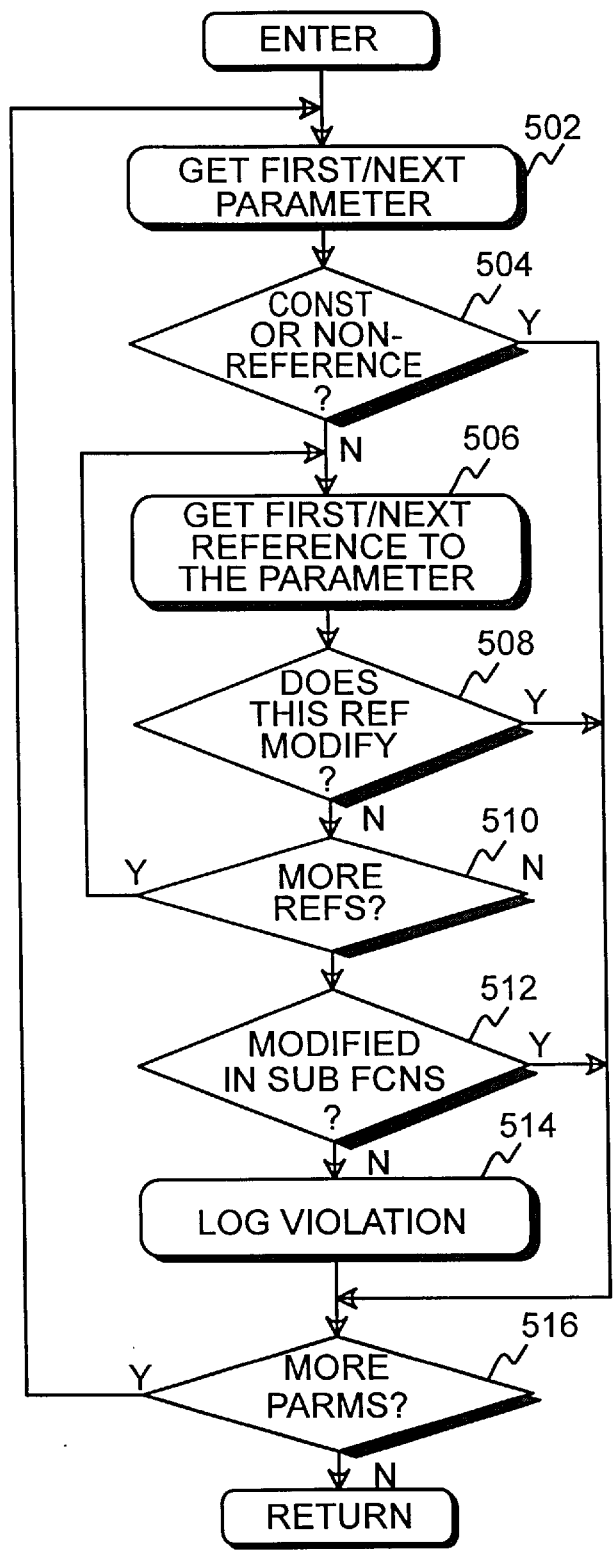
FIG. 5 shows a flowchart of a method for suggesting the use of const for a parameter that is not modified in a function.

FIG. 5 shows a flowchart for a rule that suggests whether parameters passed into a function should be identified as const. This rule is called for all functions, function members, and function templates. Referring now to FIG. 5, after entry, block 502 gets the first or next parameter being passed into the function. Block 504 determines whether it is already identified as a const or non reference parameter, and if it is, block 504 goes to block 516 since this parameter already satisfies the rule. If the parameter is identified as a non-const, reference parameter, block 504 goes to block 506 which gets the first or next reference to the parameter within the function. Block 508 then determines whether the reference modifies the parameter, and if so, goes to block 516. If the reference does not modify the parameter, block 508 goes to block 510. Block 510 then determines whether there are more references to the parameter, and if there are, returns to block 506 to process the next reference. After all references to this parameter have been processed, block 510 goes to block 512 which determines whether the parameter is modified in any sub-function calls. This is determined by examining all calls to sub-functions to determine whether all parameters are identified as const or value in those calls. If the parameter is not modified by sub-functions, block 512 goes to block 514 which logs a violation to inform the programmer that this parameter should be marked as a const parameter.

After logging the violation, or if the parameter was modified in sub-functions, or if the parameter was modified within the function, control goes to block 516 which determines whether there are more parameters to be examined, and if there are, block 516 returns to block 502 to process the next parameter. After all parameters have been processed, block 516 returns to FIG. 2.

Figure 6:
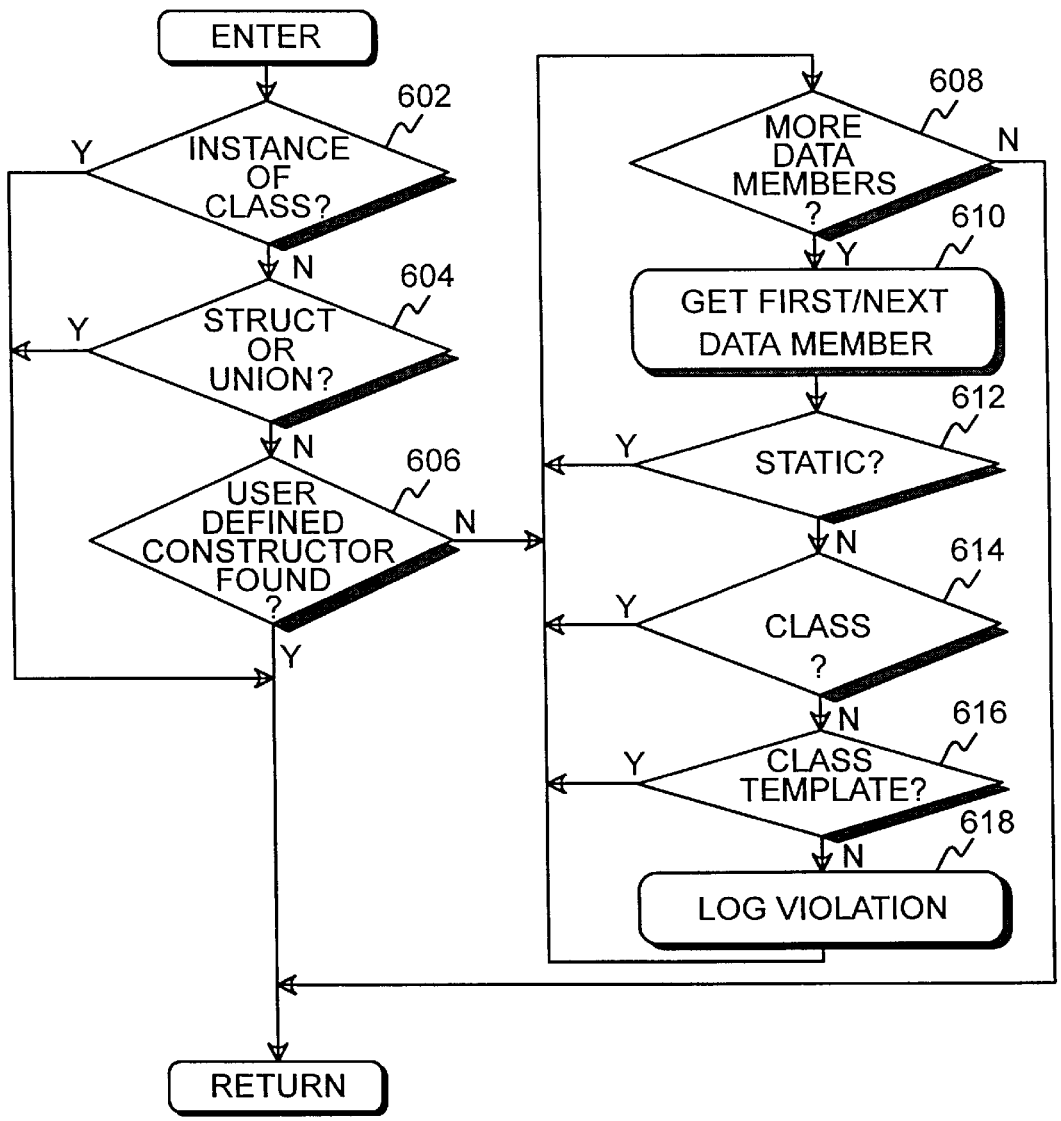
FIG. 6 shows a flowchart of a method for detecting when non-inherited scalar or pointer type data members are left uninitialized because a compiler-generated default constructor is used.

FIG. 6 shows a flowchart of a rule for identifying when the compiler generated default constructor does not initialize one or more data elements. That is, any non-inherited scalar or pointer-type data members will be left uninitialized if a compiler generated default constructor is ever used. The rule is triggered by any class with no user defined constructors, and which contains any non-inherited non-static data members that are not a class or class template type. Referring to FIG. 6, after entry, block 602 determines whether an instance of a class template is being processed, and if so, block 602 simply returns to FIG. 2 since the rule will examine the class template rather than each of its instances.

If it is not a class template instance, block 602 goes to block 604 which determines whether the object being examined is a struct or union, and if so, block 604 also returns to FIG. 2 since if the object is declared as a struct or union, rather than a class, the rule assumes that structs or unions are not expected to behave in an object oriented manner and thus, the rule does not examine them.

If the object being examined is not a struct or union, block 604 goes to block 606 which determines whether the class contains a user defined constructor. If the class contains a user defined constructor, block 606 simply returns to FIG. 2 since the problem will not occur in a class with a user defined constructor. If there is no user defined constructor found, block 606 goes to block 608 which determines whether there are any data members to be examined, and if not, block 608 returns to FIG. 2.

If there are one or more data members to be examined, block 608 goes to block 610 which gets the first or next data member, and block 612 determines whether the data member is static. If it is static, block 612 returns to block 608 since static data members are initialized elsewhere. If the data member is not static, control goes to block 614 which determines whether the data member is a class. If the data member is a class, block 614 returns to block 608 since members whose type is a class are initialized by the default constructor. If the data member is not a class, block 614 goes to block 616 which determines whether the data member type is a class template, and if it is, block 616 also returns to block 608 since class templates are also automatically initialized. If not, block 616 goes to block 618 which logs a violation indicating that a data member will be left uninitialized. After logging the violation, block 618 returns to block 608 to check the rest of the data members.

Figure 7:
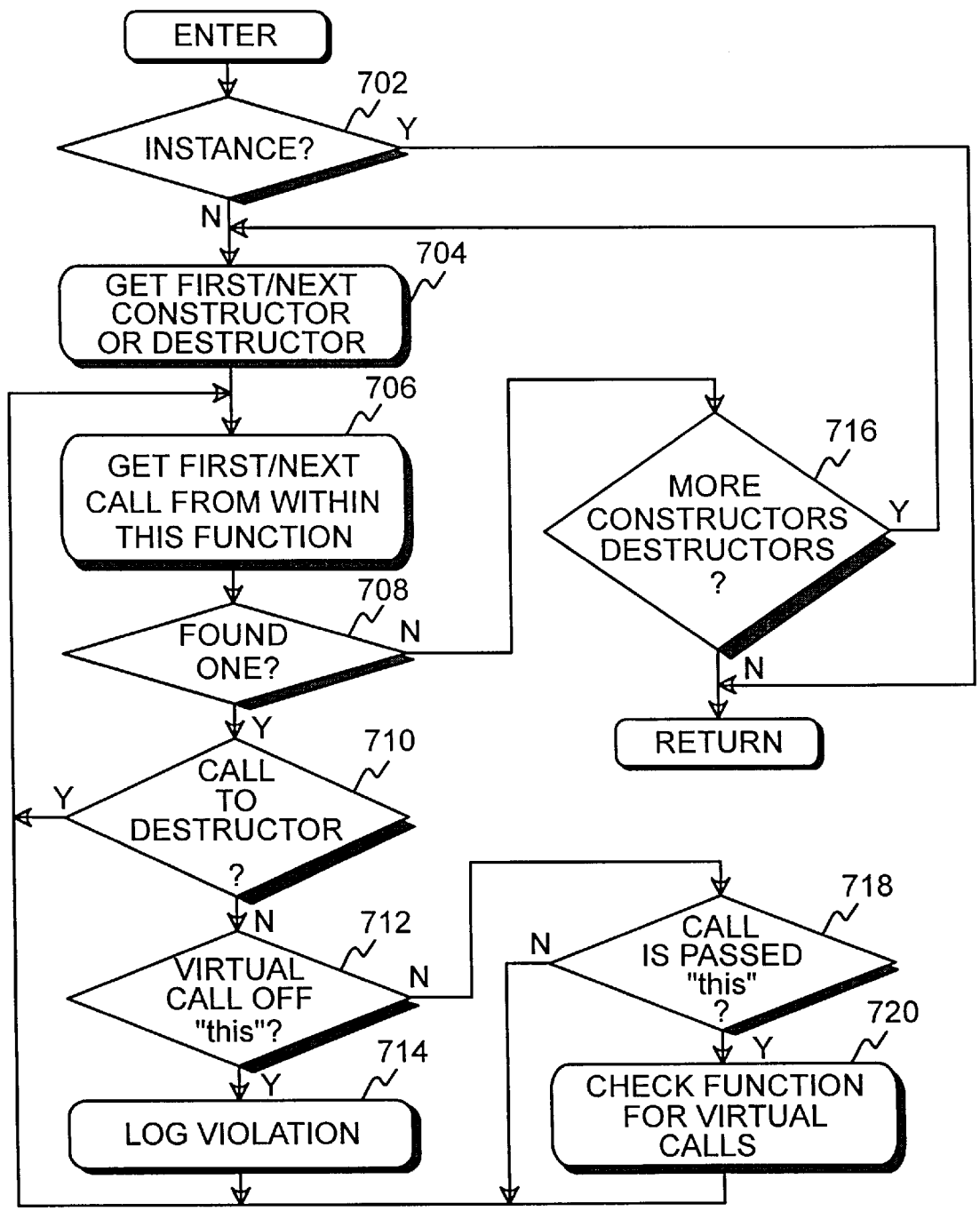
FIG. 7 shows a flowchart of a method for detecting a call to a virtual function from a constructor or destructor.

FIG. 7 shows a flowchart for a rule which determines whether virtual functions are being called from constructors or destructors, because the virtual table may not be in a state well-understood by programmers when a call is made within a constructor or destructor. The rule is triggered by virtual function calls within a constructor or destructor of an object, or within functions called by a constructor or a destructor. Referring to FIG. 7, after entry, block 702 determines whether an instance of a class template is being examined, and if so, simply returns to FIG. 2 since the rule will examine the instances as it checks the templates. If it is not an instance, block 702 goes to block 704 which gets the first or next constructor or destructor within the class. Block 706 then gets the first or next call to a function within this constructor or destructor and block 708 determines whether a call has been found. If so, block 708 goes to block 710 which determines whether it is a call to a destructor, since a call from a constructor or destructor to a virtual destructor is allowable within the rule. If the call is not to a destructor, block 710 goes to block 712 which determines whether the call is a virtual call off the instance of the object currently being constructed or destructed ("this"), and if not, block 712 goes to block 718 to check for indirect virtual calls. If the call is a virtual call off the instance of the object currently being constructed or destructed, block 712 goes to block 714 which logs a violation to inform the programmer of the virtual call within a constructor or destructor.

Block 718 checks to determine if the function is a non-virtual call off of "this". If so, control passes to block 720. If not, block 718 returns to block 706 to check the next call site.

Block 720 checks the called function for virtual calls. It does this by recursively calling a function that includes blocks 706, 708, 710, 712, 714, 718, and 720, with block 708 returning from the recursive function when it does not find a call.

After all calls to functions within this constructor or destructor have been processed, block 708 goes to block 716 which determines whether there are more constructors or destructors within the class, and if there are, block 716 returns to block 704 to process the next constructor or destructor. After all constructors and destructors have been processed, block 716 returns to FIG. 2.

Figure 8:
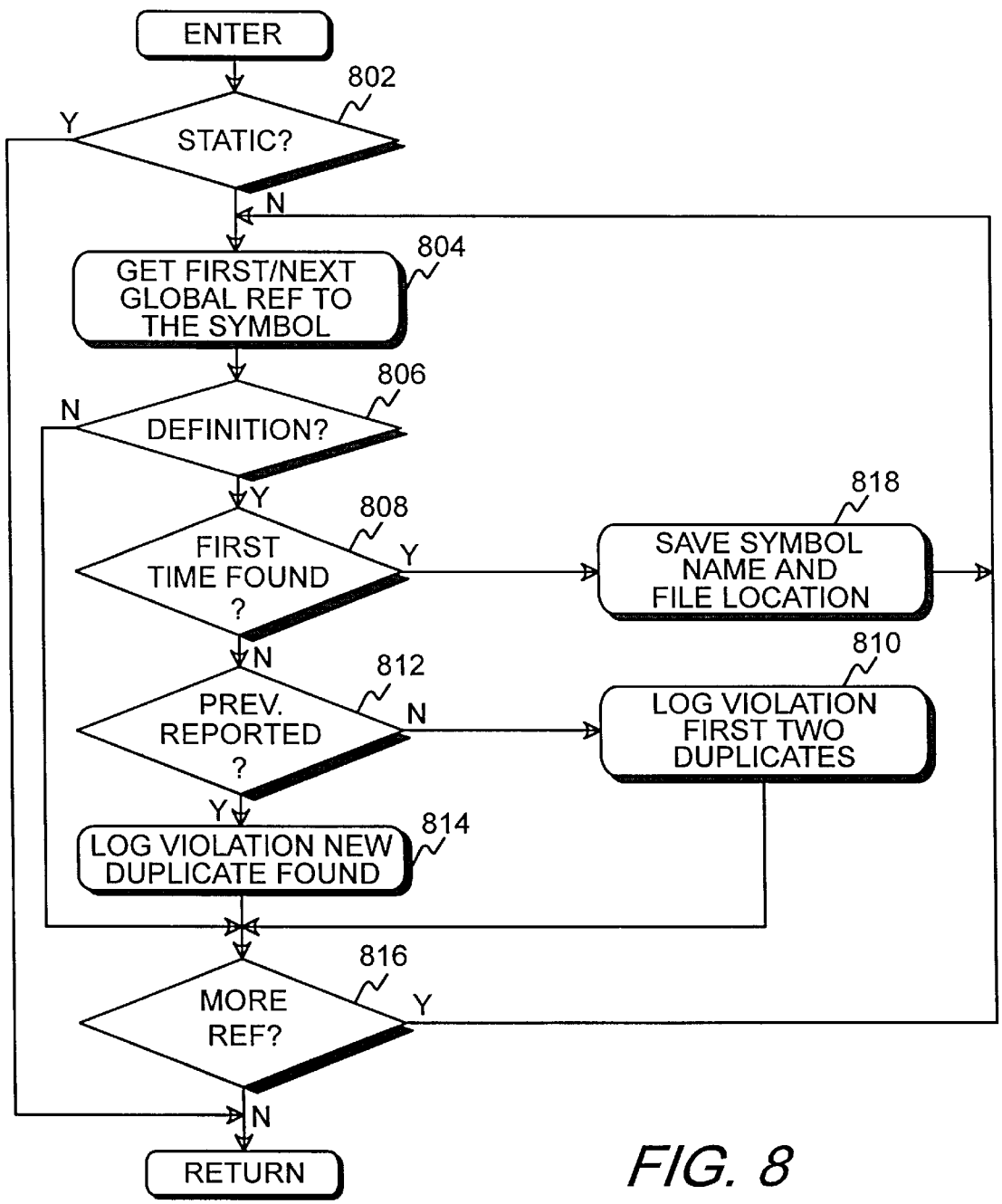
FIG. 8 shows a method for detecting multiple definitions of classes, enums, or typedefs.

FIG. 8 shows a flowchart of a rule which determines whether classes, enums or typedefs have been defined more than once. The compiler will catch this problem if a duplicate definition appears in a single compilation unit (also called a translation unit), however, if two different objects with the same name appear in different compilation units, the compiler will not catch the problem. A compilation unit comprises a file that is passed to a compiler and all files included by that file, either directly or indirectly. The rule is called for classes, enums, and typedefs.

Referring to FIG. 8, after entry, block 802 determines whether the object being passed is a static variable, and if it is, simply returns to FIG. 2 since static variables are not accessible from other compilation units. If the variable is not static, block 802 goes to block 804 which gets the first or next symbol from the global reference list for the object. Block 806 determines if the global reference is a definition, and if not goes to block 816 to process the next global reference. If the global reference is a definition, block 806 goes to block 808 which determines whether this is the first time a definition has been found and if it is, block 808 goes to block 818 which saves the symbol name and file location as the last definition found. Block 818 then goes to block 804 to process the next reference to the symbol.

If this is not the first time a definition has been found, block 808 goes to block 812 which determines whether the error has been previously reported. If the error has been previously reported, block 812 goes to block 814 which logs a single violation for the new duplicate symbol definition.

If the error has not been previously reported, block 812 goes to block 810 which logs two violations, one for each of the two definitions, and marks the error as having been previously reported before returning to block 816 to process the next reference. After all global references to the symbol have been processed, block 816 returns to FIG. 2.

Figure 9:
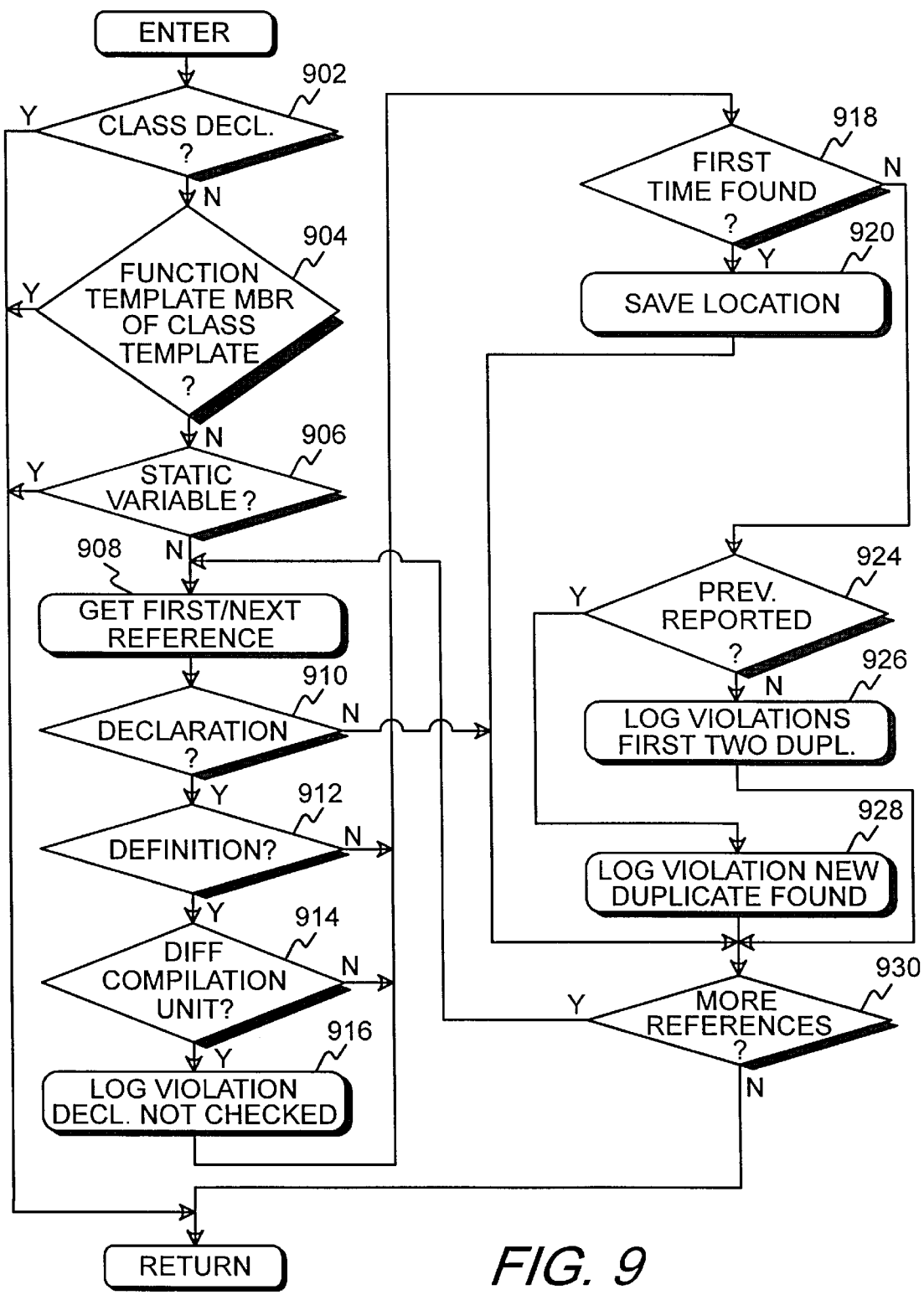
FIG. 9 shows a method for detecting multiple declarations of objects.

FIG. 9 shows a flowchart for rules that determine whether there are multiple declarations of the same object or the declaration is not included in the same compilation unit as the definition of the object. Referring to FIG. 9, after entry, block 902 determines whether the object being examined is a class declaration, and if it is, block 902 simply returns to FIG. 2 since duplicate class declarations are allowed. If it is not a class declaration, block 902 goes to block 904 which determines whether the object is a function template member of a class template. If it is, block 904 returns to FIG. 2 since these are reported when the class template is processed. Block 906 determines whether the object is a static variable, and if it is, block 906 returns to FIG. 2 since static variables are not visible in multiple compilation units and multiple declarations of static variables are kept consistent by the compiler.

If the object is not a static variable, block 906 goes to block 908 which gets the first or next reference to the object. Block 910 then determines whether the reference is a declaration, and if not, block 910 goes to block 930 to determine whether there are more references.

If the reference is a declaration, block 910 goes to block 912 which determines whether a definition for the object has been found and if a definition has been found, block 912 goes to block 914 which determines whether the definition is in a different compilation unit than the declaration. If the definition is in a different compilation unit, block 914 goes to block 916 which logs a violation.

If there is no definition for the object, or the definition is in the same compilation unit as the declaration, or after logging a violation, control goes to block 918 to check for duplicate declarations. Block 918 determines whether this is the first time the declaration has been found, and if it is, goes to block 920 to save the location of the declaration. Block 920 then goes to block 930 to determine if there are more references to the object.

If this is not the first time the declaration has been found, block 918 goes to block 924 which determines whether it has been previously reported, and if it has not, two violations are logged by block 926 before control goes back to block 930 to determine if there are more references.

If the error has been reported before, block 924 goes to block 928 which logs a violation. Block 930 then determines whether there are more references and if there are, returns to block 908 to get the next reference. After all references have been processed block 930 returns to FIG. 2.

Figure 10:
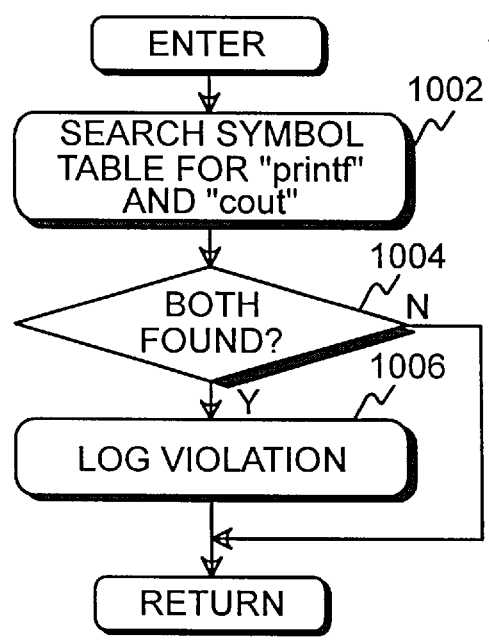
FIG. 10 shows a method for detecting the use of both standard C I/O and C++ I/O routines.

FIG. 10 shows a flowchart for a rule that determines whether two different types of input/output are being used by a program. The two incompatible types are I/O stream type of input/output used typically with C++ programs, and standard I/O routines, which are typically used with C programs. Since these different types of input/output buffer independently, if both types are used in the same program, output data may not appear in the order that was intended by the programmer. This rule is called only once when the program is first examined.

Referring now to FIG. 10, after entry, block 1002 searches the symbol table built for the program to determine whether there is a reference to both "printf" and a reference to "cout". Block 1004 determines whether both are found, and if they are, block 1004 goes to block 1006 to log a violation since both types of input/output are being used by the program. If both types are not found, block 1004 simply returns to FIG. 2.

Figure 11:
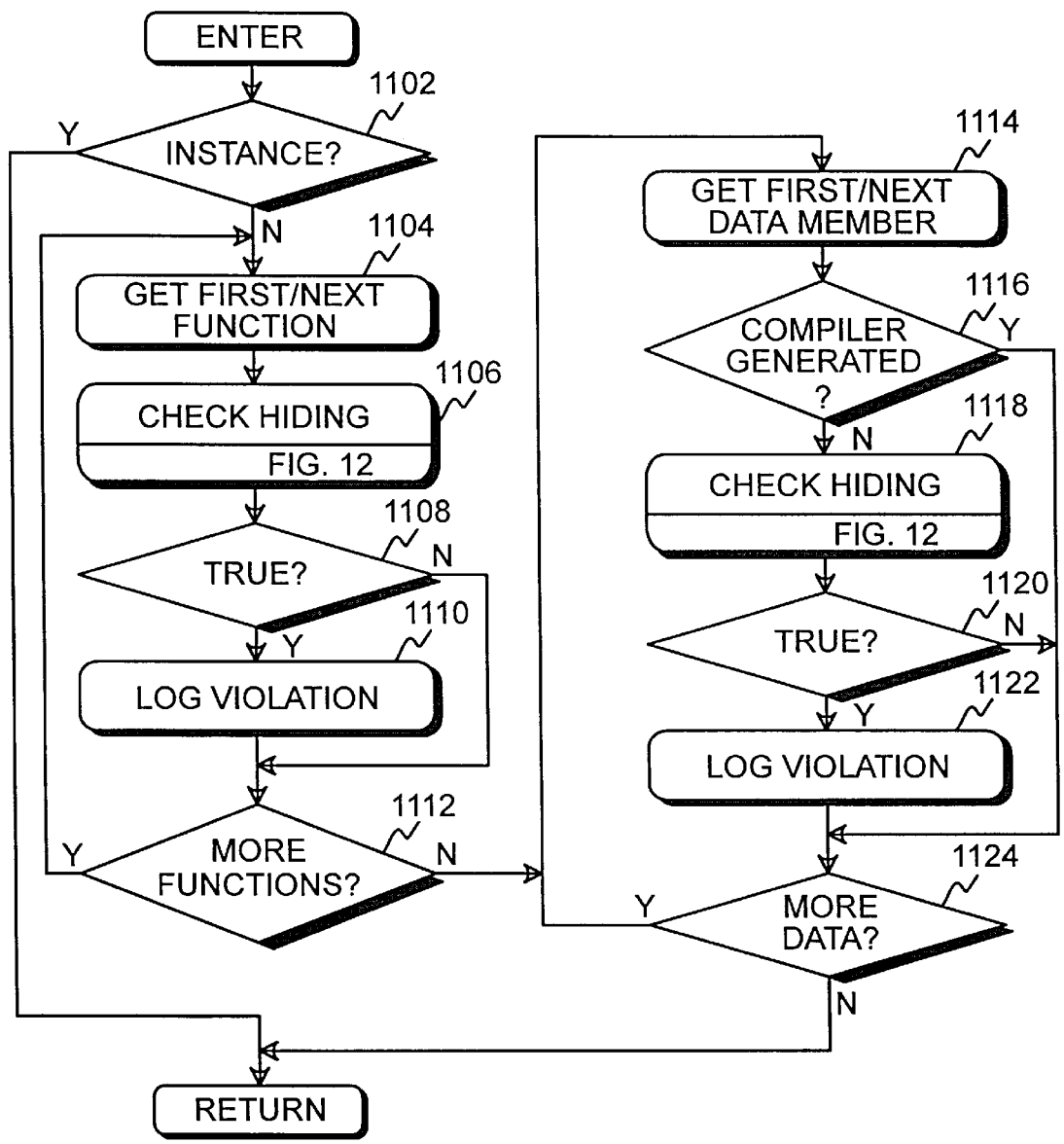
FIGS. 11–13 show a flowchart of a method for detecting member functions of data hiding inherited member functions or data.
Figure 12:
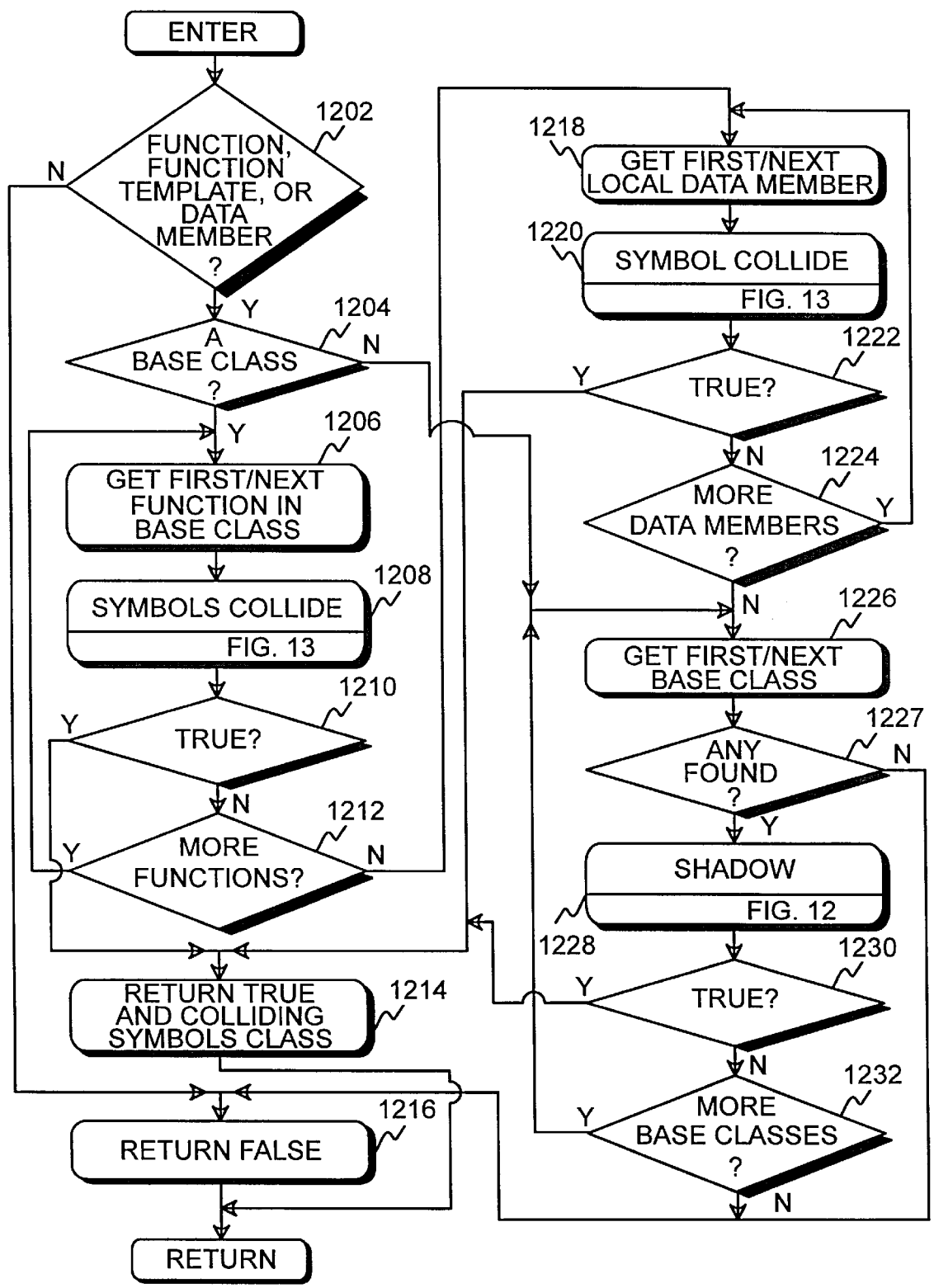
Figure 13:
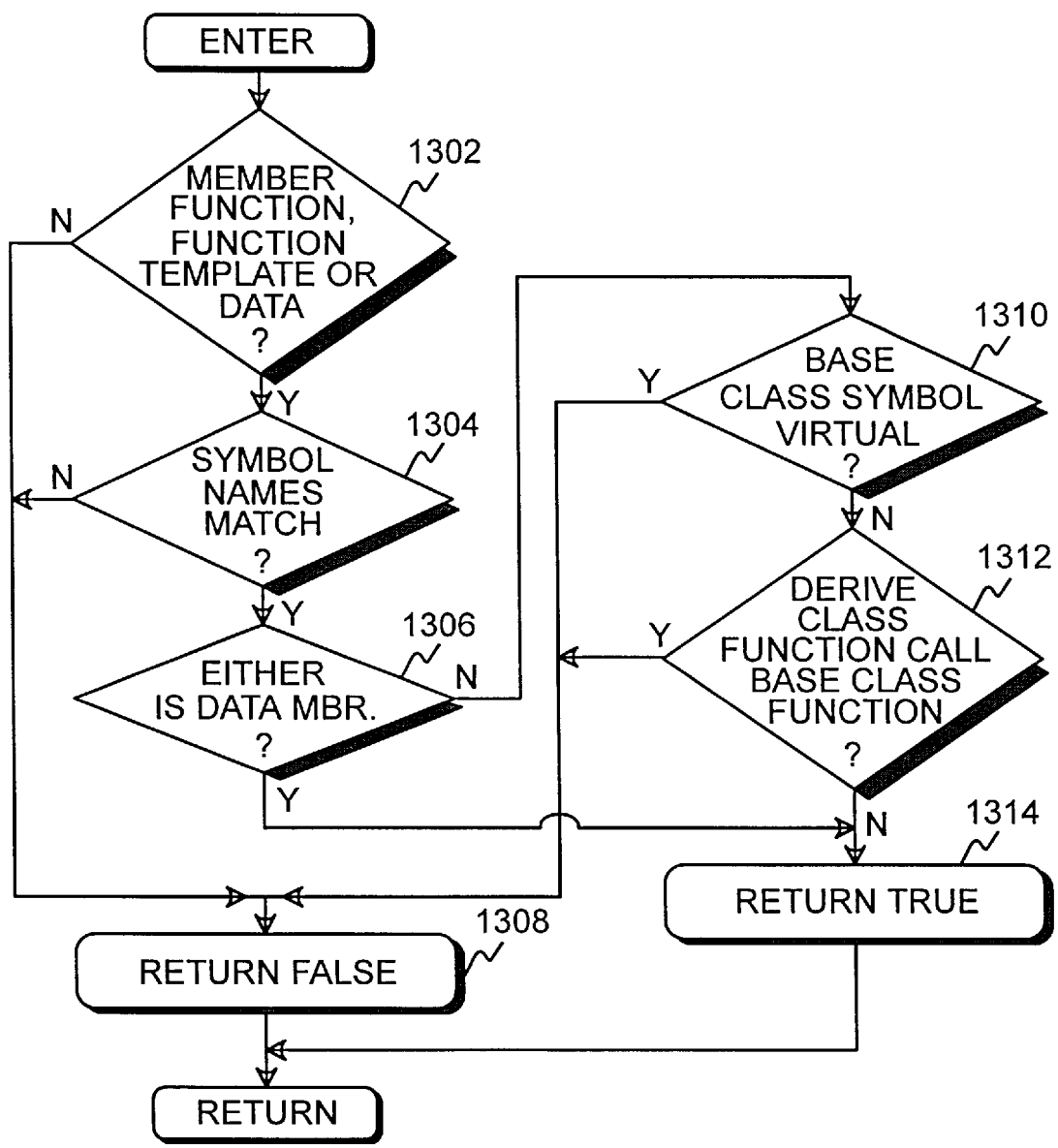

FIGS. 11, 12 and 13 show a flowchart for a rule that determines whether an inherited data member is hidden by a locally defined data member. It also determines whether a data member is hiding an inherited member function, or a member function is hiding an inherited data member, or whether a member function is hiding an inherited non-virtual member function. This rule is called for each class and class template within the program.

Referring now to FIG. 11, after entry, block 1102 determines whether this is an instance of a class template, and if it is, simply returns to FIG. 2. If this is not an instance of a class template, block 1102 goes to block 1104 which gets the first or next member function of the class. Block 1106 then calls FIG. 12 to determine whether this function is hiding an inherited data member or an inherited non-virtual member function. After returning from FIG. 12, block 1108 determines whether FIG. 12 found that hiding was occurring, and if so, transfers to block 1110 to log a violation. If hiding was not occurring, or after logging a violation, control goes to block 1112 which determines whether there are more functions to be processed and if there are, returns to block 1104 to get the next function.

After all functions have been processed, block 1112 goes to block 1114 which gets the first or next data member within the object. Block 1116 then determines whether the data member was generated by the compiler, and if so, transfers to block 1124 because compiler generated data members are not checked. If the data member was not compiler generated, block 1116 goes to block 1118 which calls FIG. 12 to determine whether the data member is hiding an inherited data member or an inherited member function.

After returning from FIG. 12, block 1120 determines if FIG. 12 did find that hiding was occurring, and if so, block 1120 transfers to block 1122 to log a violation. If no hiding was found, or after logging a violation, control goes to block 1124 which determines whether there are more data members, and if so, returns to block 1114 to process the next data member. After all data members have been processed, block 1124 returns to FIG. 2.

FIG. 12 shows a flowchart of the check hiding function called from blocks 1106 and 1118 of FIG. 11. Referring now to FIG. 12, after entry, block 1202 determines whether the symbol passed into the function is a member function, a function template, or a data member. If it is not one of these three, the rule assumes that there is no problem so block 1202 transfers to block 1216 to return false, to indicate no hiding. If the symbol is one of these three, block 1202 goes to block 1204 which checks for a base class. If no base class was specified when FIG. 12 was called, block 1204 goes to block 1226 to get one. If a base class was specified, block 1204 goes to block 1206 which gets the first or next function in the base class for the symbol. Block 1208 then determines if the potentially colliding symbol is visible and not private, and if so, block 1208 calls FIG. 13 to determine whether the symbols collide, and after returning from FIG. 13 block 1210 goes to block 1214 to return a true indication and the colliding symbol's class if the symbols did collide. If the symbols did not collide, block 1210 goes to block 1212 which determines whether there are more functions in the base class to be processed and if there are, block 1212 returns to block 1206 to process the next function.

After all functions in the base class have been processed, block 1212 goes to block 1218 which gets the first or next local data member from the base class. Block 1220 then determines whether the potentially colliding symbol is visible and not private, and if so, block 1220 calls FIG. 13 to determine whether the symbols collide, and after returning block 1222 goes to block 1214 if the symbols did collide to return a true indication and the colliding symbol's class. If the symbols did not collide, block 1222 goes to block 1224 which determines whether there are more data members in the base class, and if there are, block 1224 returns to block 1218 to process the next data member.

After all data members have been processed, block 1224 goes to block 1226 which gets the first or next base class for this class. Block 1227 determines if a base class was found. If no base class was found, block 1227 goes to block 1216 to return false, indicating that the symbol is not hiding anything in the non-existent base class. If a base class was found, block 1227 goes to block 1228 which recursively calls FIG. 12 to process the base class.

If the result is data hiding, block 1230 goes to block 1214 to return a true indication and the colliding symbol's class, otherwise block 1230 goes to block 1232 which determines whether there are additional base classes to be processed. If there are additional base classes to be processed, block 1232 returns to block 1226 to process the next base class. After all base classes have been processed, block 1232 goes to block 1216 which returns a false indication since no collisions have been found.

FIG. 13 shows a flowchart of the symbol collide function called from block 1208 and 1220 of FIG. 12. Referring now to FIG. 13, after entry, block 1302 determines whether the symbol being processed is a member function, function template, or data member, and if it is none of these, block 1302 goes to block 1308 to return a false indication indicating there is no collision. If the symbol is one of these three, block 1302 goes to block 1304 which determines whether the symbol names match—that is, does the member name match without considering the parameter list. If the symbol names do not match, there cannot be a collision, so block 1304 goes to block 1308 to return a false indication. If the symbol names do match, block 1304 goes to block 1306 to determine whether either symbol represents a data member and if either one is a data member, block 1306 goes to block 1314 which returns a true indication indicating there is a collision.

If neither is a data member, block 1306 goes to block 1310 which determines whether the base class symbol is a virtual symbol and if it is, block 1310 goes to block 1308 which returns a false indication of no collision. If the base class symbol is not virtual, block 1310 goes to block 1312 which determines whether a derived class function contains only a call to a base class function having the same parameters. If this is true, block 1312 returns to block 1308 which returns an indication of no collision. If this is not true, block 1312 goes to block 1314 which returns a true indication to FIG. 12 indicating that a collision has occurred.

Figure 14:
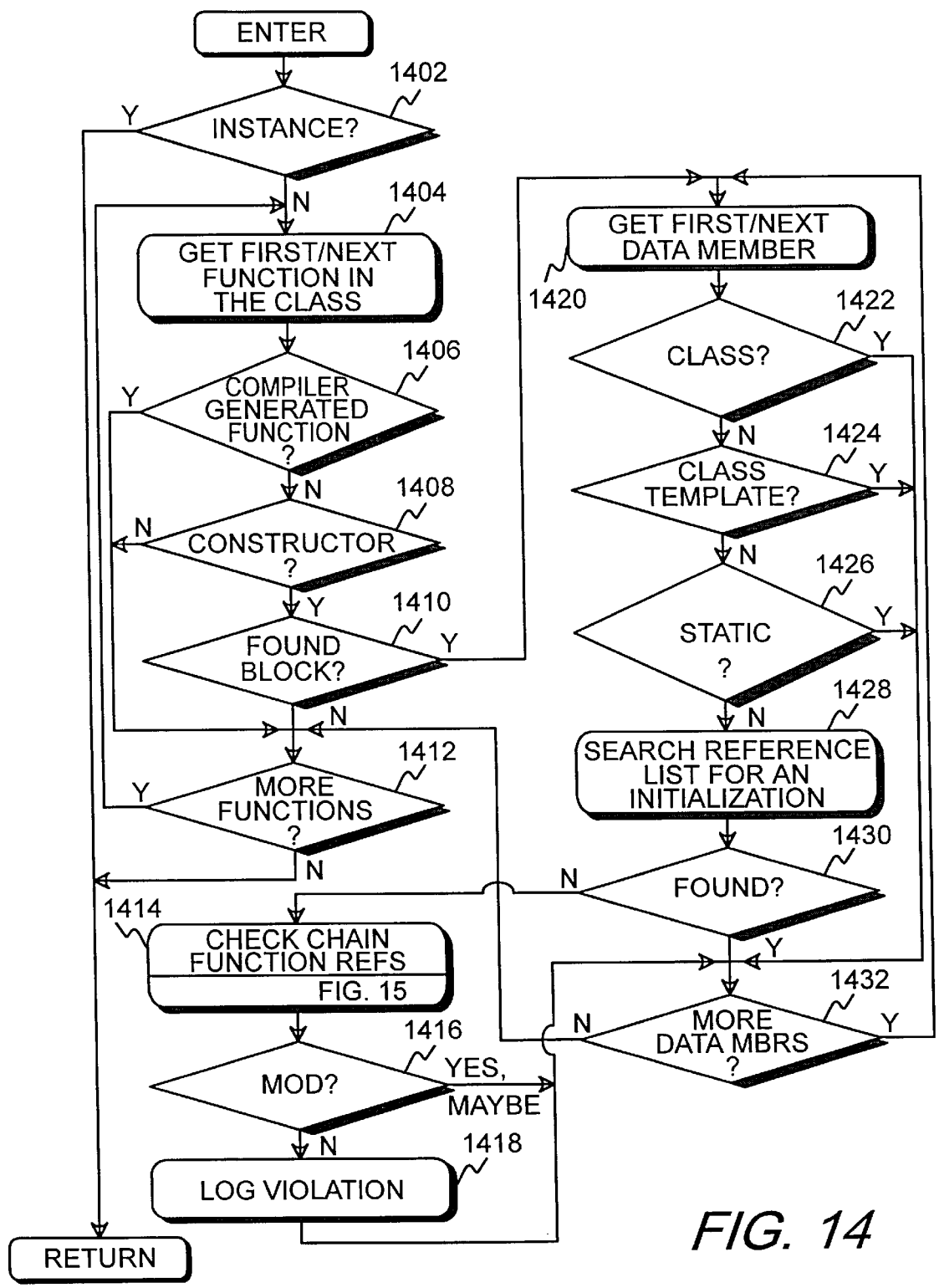
FIGS. 14 and 15 show a flowchart of a method for detecting when non-static data members are not initialized by any constructor.
Figure 15:
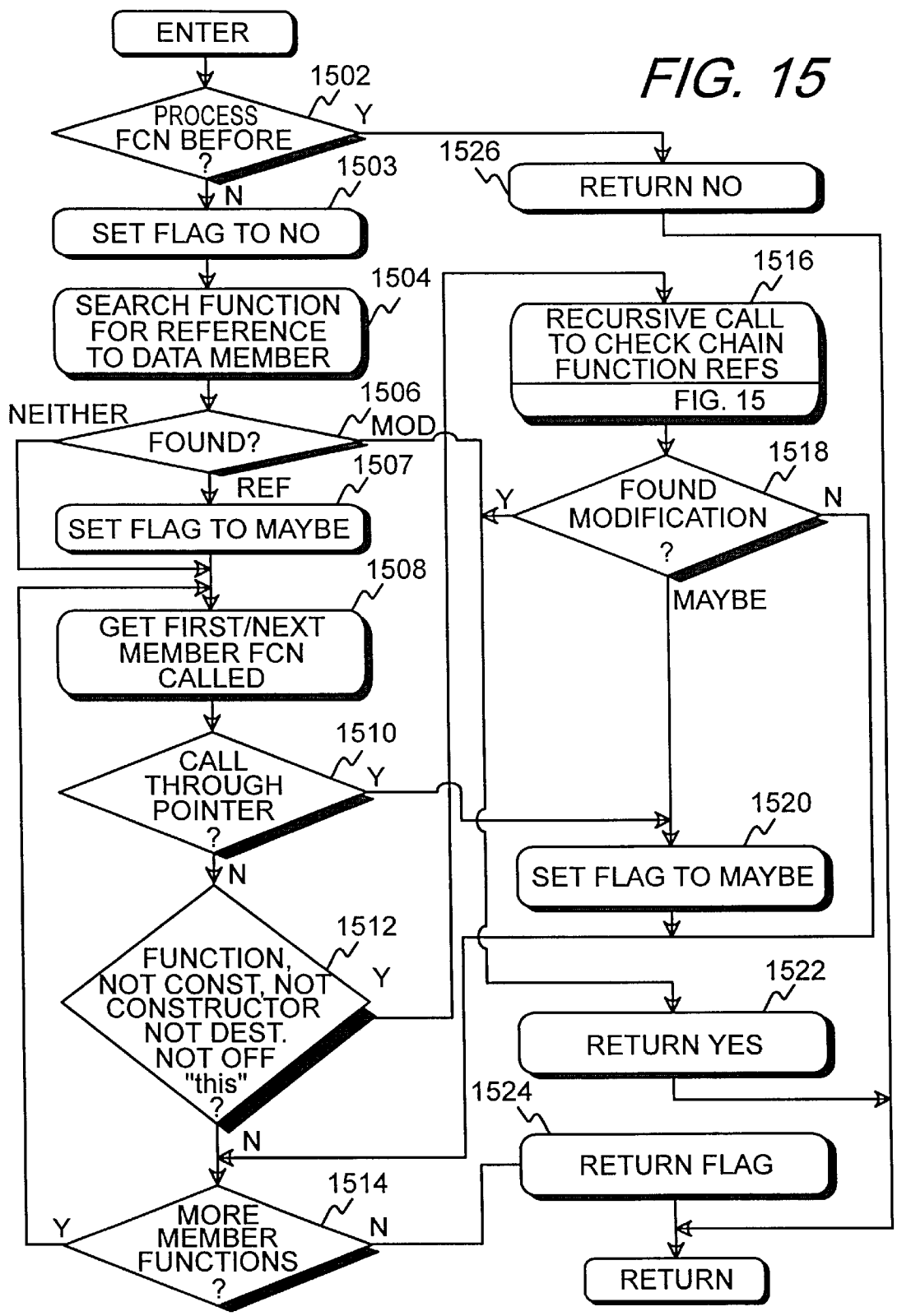

FIGS. 14 and 15 show a flowchart of a method for detecting that non-static data members are not initialized by any constructor of a class. Referring to FIG. 14, after entry, block 1402 determines whether the rule has been called for an instance of the class template and if so, the rule returns since any violations will be reported when the class template is examined. If the class is not an instance of a class template, block 1402 goes to block 1404 which gets the first or next function within the class and block 1406 determines whether the function was created by the compiler. If the function was created by the compiler, block 1406 goes to block 1412 to process the next function, since compiler generated functions cannot cause the problem checked by this rule.

If the function is not a compiler generated function, block 1406 goes to block 1408 which determines whether it is a constructor function, and if it is not, block 1408 goes to block 1412 to skip this function, since initialization occurs in constructor functions.

If the function is a constructor, block 1408 goes to block 1410 which determines whether the function has a block of code and if it does not, it cannot be examined, so block 1410 goes to block 1412 which determines whether there are more functions to process and if there are, returns to block 1404 to process the next function.

If block 1410 found that the function being examined did have a block of code, block 1410 goes to block 1420 which gets the first or next data member of the function. Block 1422 then determines whether the data member is a class, and if it is a class, block 1422 goes to block 1432 to skip processing of the data member. If the data member is not a class, block 1422 goes to block 1424 which determines whether the data member is a class template. If the data member is a class template, block 1424 goes to block 1432 to skip processing the class template. If the data member is not a class template, block 1424 goes to block 1426 which determines whether the data member is static and if it is, it is also skipped so block 1426 goes to block 1432.

If the data member is not static, block 1426 goes to block 1428 which searches the reference list for the data member to find an initialization of the data member. If an initialization is found, block 1430 goes to block 1432 to check the next data member.

If an initialization was not found, block 1430 goes to block 1414 which calls FIG. 15 to check the functions called by this constructor, directly or indirectly, to determine if any of them could perform the initialization. After returning from FIG. 15, block 1416 determines whether FIG. 15 found a potential modification and if it did not, goes to block 1418 which logs a violation for the data variable. If a modification was found, or a potential modification was found, then no violation is logged so block 1416 goes to block 1432 to check the next data member. After all data members have been checked in the function, block 1432 goes to block 1412 to check the next function. After all functions have been checked, FIG. 14 returns to FIG. 2.

FIG. 15 shows a flowchart of the check chain function references called from block 1414 of FIG. 14. Referring now to FIG. 15, after entry, block 1502 determines whether the function has been examined before. FIG. 15 is recursively called within itself, so this step is necessary to prevent an infinite loop. If the function has been examined before, control goes to block 1526 which returns no to FIG. 14.

If the function has not been examined before, block 1502 goes to block 1503 which sets a modification found flag to no, and then continues to block 1504 which searches the function for a reference to the data member. Block 1506 then determines whether a reference, a modification, or neither was found. If a modification was found, block 1506 goes to block 1522 which returns yes to the caller. If a reference was found, block 1506 goes to block 1507 which sets a flag to the condition maybe, since a reference might still have been a modification even though it was not indicated as one, such as the use of a member as a non const parameter. If neither was found, or after setting the flag to maybe, control goes to block 1508. Block 1508 then gets the first or next member function called from this function and block 1510 determines whether the call was done through a pointer. This can occur, for example, for a virtual call. If the call is through a pointer, block 1510 goes to block 1520 to set the flag to maybe, before checking the next function. If the call was not through a pointer, block 1510 goes to block 1512 which determines whether the call is to a function that is not a constructor, not a const function, not a destructor, and not a dereference off "this". If the call is to any of these, block 1512 goes to block 1514 to check the next member function. If the call was not to one of these, block 1512 goes to block 1516 which recursively calls FIG. 15 to check the chain of function references from this function. After returning from the recursive call, block 1518 determines whether a modification was found in the chain and if it was, block 1518 goes to block 1522 to return yes to the caller. If a modification was possibly found, block 1518 goes to block 1520 which sets the flag to maybe before going to block 1514 to determine whether there are more member functions. If block 1518 found no modifications, it goes to block 1514 without setting the flag. If there are more member functions, block 1514 returns to block 1508 to get the next member function. After all member functions have been examined, block 1514 goes to block 1524 to return the flag that had been set by block 1520, block 1503 or block 1507.

Figure 16:
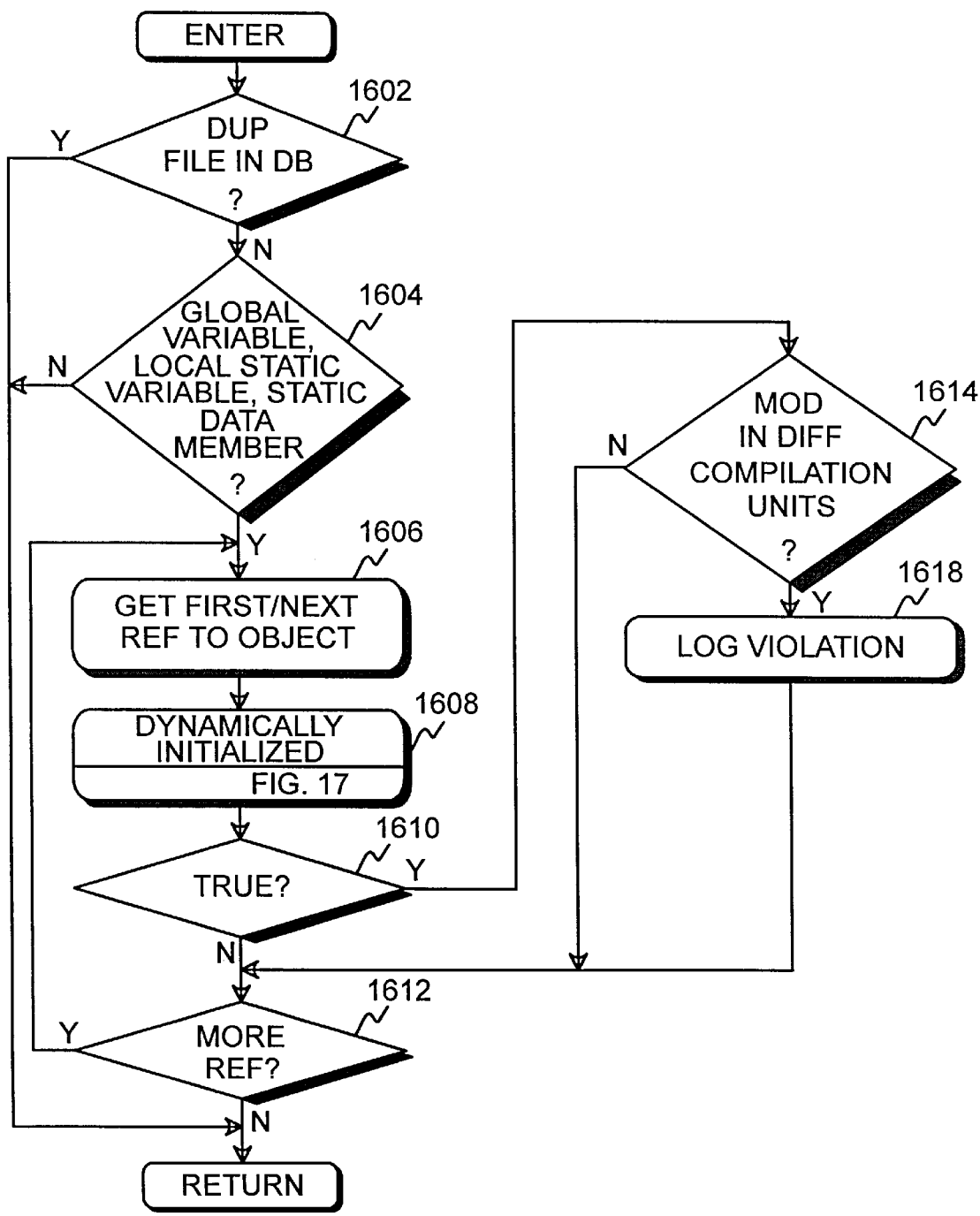
FIGS. 16 and 17 show a flowwchart of detecting when a variable is dynamically initialized in more than one compilation unit.
Figure 17:
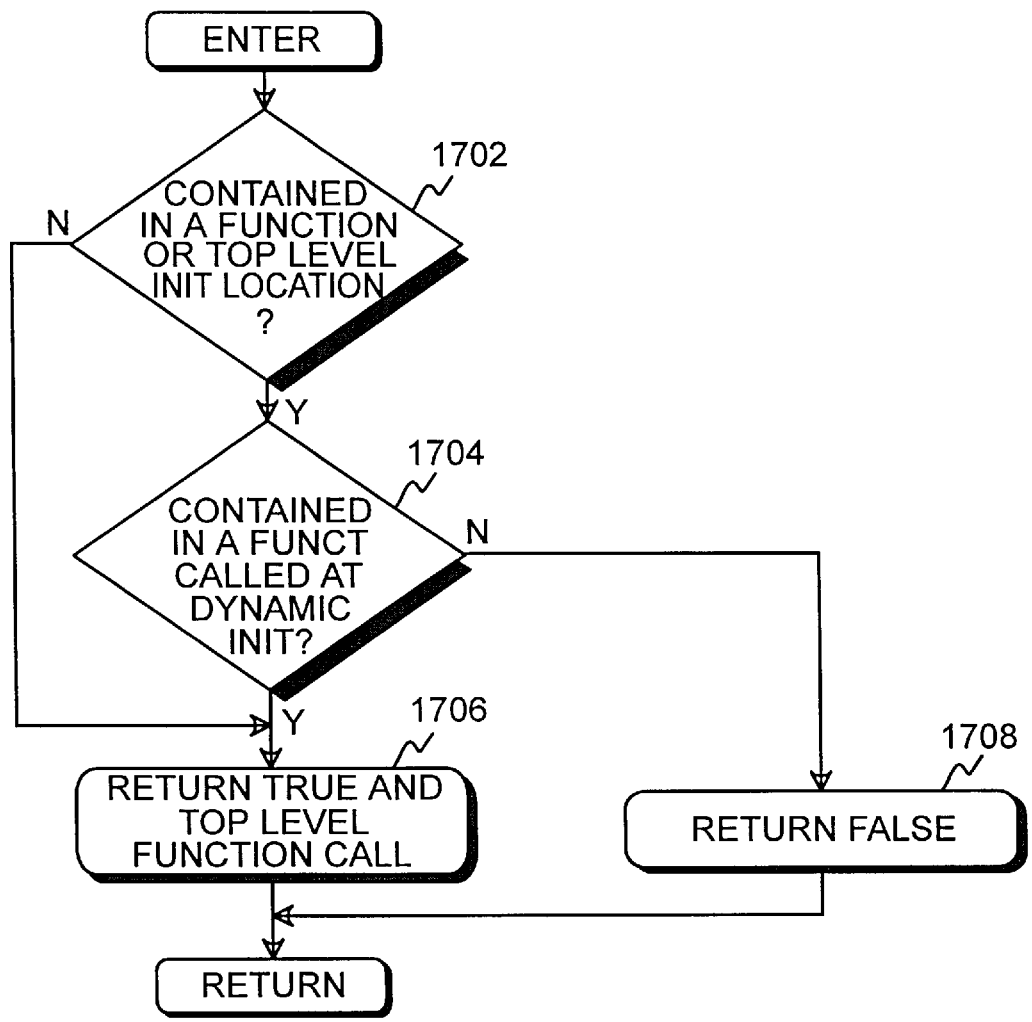

FIGS. 16 and 17 show a flowchart of detecting when a variable is dynamically initialized in more than one compilation unit. Referring now to FIG. 16, after entry, block 1602 determines whether there is a duplicate file contained in the list of files to be examined, and if there is the rule cannot function, so block 1602 simply returns to FIG. 2. If there is not a duplicate file, block 1602 goes to block 1604 which determines whether the object being examined is a global variable, a local static variable, or it is a static data member. If it is not one of these three, it cannot be examined by the rule, so block 1604 returns to FIG. 2. If it one of these, block 1604 goes to block 1606 which gets the first or next reference to the object. Block 1608 then calls FIG. 17 to determine whether the object is dynamically initialized. After returning from FIG. 17, block 1610 determines whether the object was dynamically initialized, and if it was not, block 1610 goes to block 1612 which determines whether there are more references, and if there are, returns to block 1606 to process the next reference. After all references have been processed, FIG. 16 returns to FIG. 2.

If block 1610 found that the variable had been dynamically initialized, block 1610 goes to block 1614 which determines whether a modification has occurred in different compilation units (two modifications appear in different files, which either are separate compilations units or if one file includes the other, the included one is assumed to be included in at least one other compilation unit). Block 1614 also stores the first invocation site returned by block 1608 for comparison with lists for later reference sites. If a modification has occurred in different compilation units, block 1614 goes to block 1618 to log a violation. If the modifications are not in different compilation units, or after logging a violation, control goes to block 1612 to check for additional references. After all references have been examined, block 1612 returns to FIG. 2.

FIG. 17 shows a flowchart of the dynamically initialized function called from block 1608 of FIG. 16. Referring to FIG. 17, after entry, block 1702 determines whether the initialization for the object is contained in a function. If the initialization is not contained within a function, block 1702 transfers to block 1706 to return true, with this reference as the call site, since the object must be dynamically initialized. If the reference is contained in a function, block 1702 goes to block 1704 which determines whether the function is called during dynamic initialization. Block 1704 finds the functions called during dynamic initialization by searching the entire database for functions calls not in the scope of any other function. These call sites are stored with a list of the functions called directly and indirectly. This table is computed once and saved.

If the function is one that is called during dynamic initialization, then the reference is dynamically initialized as a side effect of initializing other variables, and block 1704 goes to block 1706 to return true with the list of initialization sites for the other variables. If the reference is not contained in a function called at dynamic initialization time, block 1704 goes to block 1708 which returns false.

Figure 18:
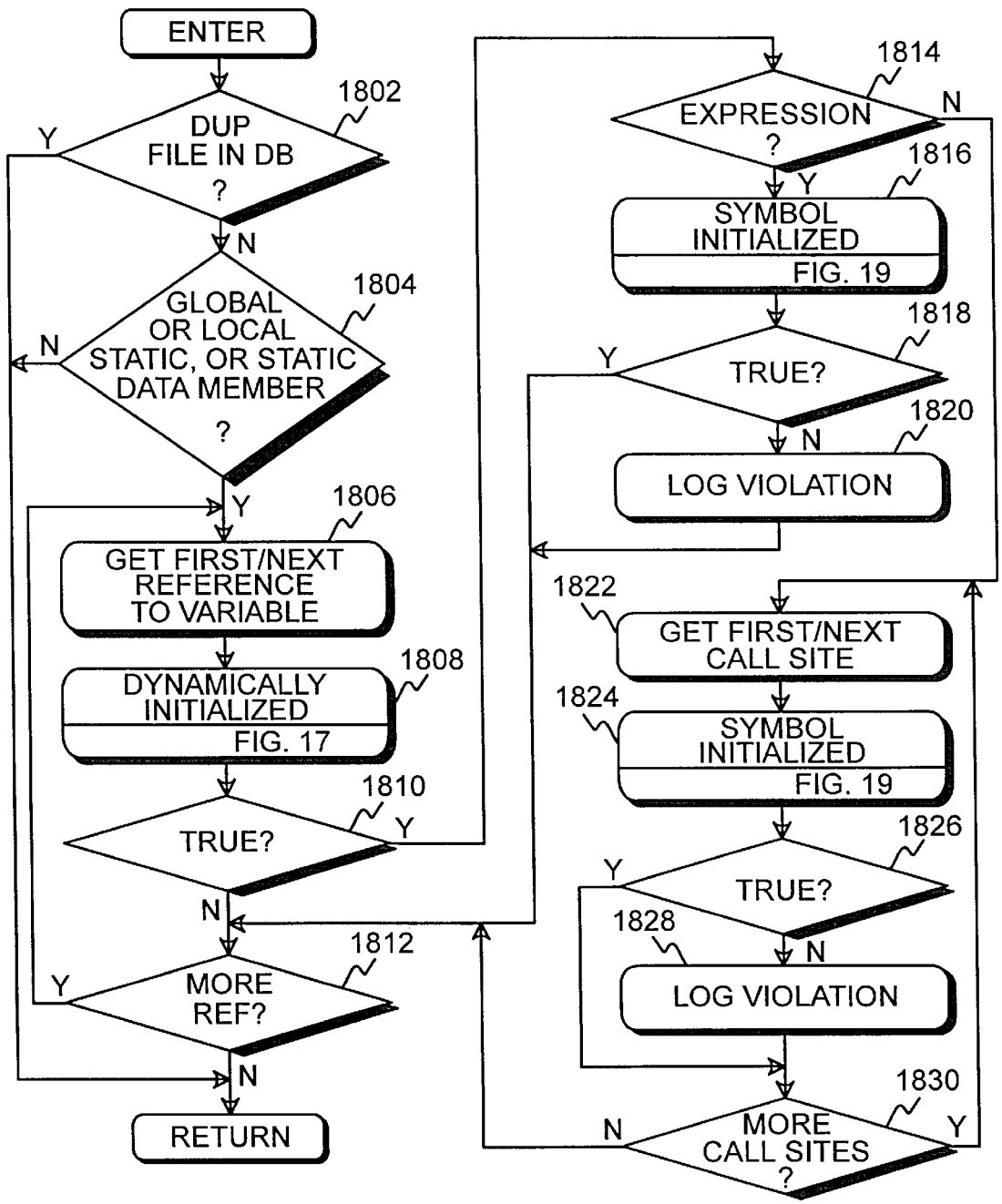
FIGS. 18 and 19 show a flowchart of a method to detect the use of a variable or data member with an ambiguous value during dynamic initialization.
Figure 19:
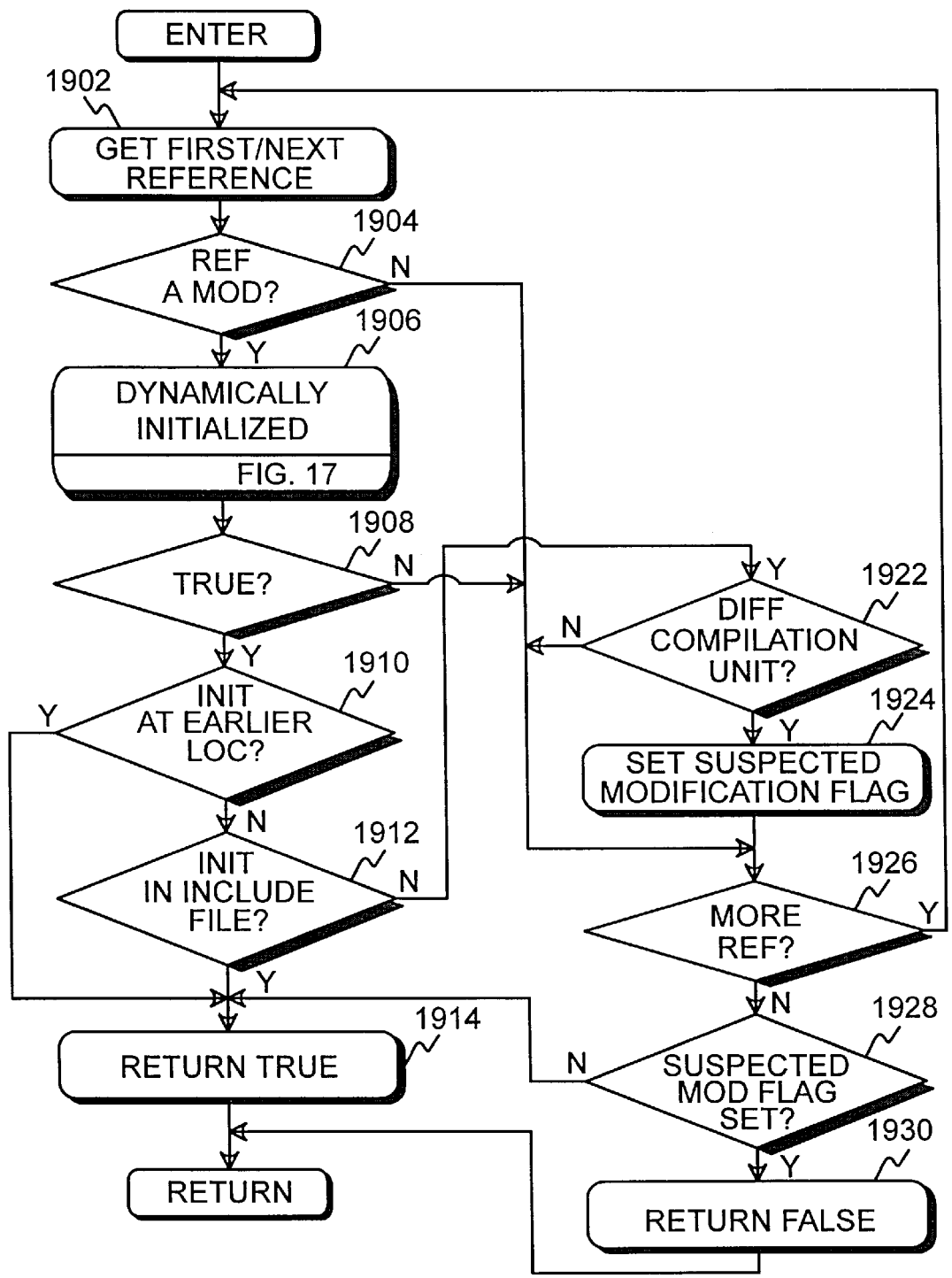

FIGS. 18 and 19 show a flowchart describing a method to detect the use of a variable or data member during dynamic initialization when a modification of the variable or data member also happens during dynamic initialization and the modification does not occur earlier in the same compilation unit. Referring to FIG. 18, after entry, block 1802 determines whether there is a duplicate file in the database, and if there is, returns to FIG. 2, since this rule cannot process with duplicate files. If there are no duplicate files, block 1802 goes to block 1804 which determines whether the object being examined is a global variable, a local static variable, or a static data member. If it is not one of these three, block 1804 returns to FIG. 2. If the object is one of these three, block 1804 goes to block 1806 which gets the first or next reference to the variable. Block 1808 then calls FIG. 17 to determine whether the reference is reached during dynamic initialization, and block 1810 examines the results of the call to FIG. 17. If the reference is not used during dynamic initialization, block 1810 goes to block 1812 to determine whether there are more references to the variable. If the reference is used in the dynamic initialization of another variable, block 1810 goes to block 1814 which determines whether the dynamic initialization is a simple expression or a function which might include a call chain. If it is a simple expression, block 1814 goes to block 1816 which calls FIG. 19 to determine whether the symbol is initialized at the site where the other variable is initialized, and if it is not, block 1818 goes to block 1820 to log a violation. If the symbol was initialized, or after logging a violation, control goes to block 1812 to check the next reference.

If the reference was not a simple expression, block 1814 goes to block 1822 which gets the first or next dynamic initialization call site returned from block 1808. Block 1824 then determines whether the symbol is initialized at this call site and if it is not, block 1826 goes to block 1828 to log a violation. If the symbol was initialized at this call site, or after logging a violation, control goes to block 1830 which determines whether there are more call sites, and if there are, block 1830 returns to block 1822 to process the next call site. After all call sites have been processed, block 1830 goes to block 1812 which determines whether there are more references. If there are more references, block 1812 returns to block 1806 to get the next reference to the variable. After all references have been processed, block 1812 returns to FIG. 2.

FIG. 19 shows a flowchart of the symbol initialized function called from block 1816 and block 1824 of FIG. 18. The symbol initialized function tests a variable and a source location and returns true if the variable has been initialized when the code at the source location is executed during dynamic initialization. Referring to FIG. 19, after entry, block 1902 gets the first or next reference to the symbol. Block 1904 then determines whether the reference is a modification, and if it is, block 1904 goes to block 1906 which calls FIG. 17 to determine whether this reference is executed during dynamic initialization. If the reference is executed during dynamic initialization, block 1908 goes to block 1910 which determines whether the initialization is initiated from an earlier location in the file than the source location being tested for initialization. If the initialization is initiated from an earlier location in the file, block 1190 goes to block 1914 to return a true indication to FIG. 18. If the initialization is not at an earlier location in the file, block 1910 goes to block 1912 which determines whether the initialization is initiated from an included file that is included at an earlier location in the file, and if it is block 1912 goes to block 1914 to return true.

If the initiation location was not in an included file, control goes to block 1922 to determine whether the initiation location was in another compilation unit. If it was, block 1922 goes to block 1924 which sets a suspected modification flag to indicate that it may have been initialized. After setting the flag, or if the reference was not a modification, or if it was not dynamically initialized, or if it was not in a different compilation unit, control goes to block 1926 which determines whether there are more references to be examined and if there are returns to block 1902 to get the next reference. After all references have been examined, block 1926 goes to block 1928 which determines whether the suspected modification flag is set, and if it is, goes to block 1930 to return a false indication. If the suspected modification flag is not set, block 1928 goes to block 1914 which returns a true indication to FIG. 18.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

Appendix A
SoftBench SDK:
CodeAdvisor and Static
Programmer's Guide
 HEWLETT PACKARD
HP Part No. B5073-90004
Printed in USA   January 1996
E0196

Notices

The information contained in this document is subject to change without notice.

*Hewlett-Packard makes no warranty of any kind with regard to this manual, including, but not limited to, the implied warranties of merchantability and fitness for a particular purpose.* Hewlett-Packard shall not be liable for errors contained herein or direct, indirect, special, incidental or consequential damages in connection with the furnishing, performance, or use of this material.

Warranty. A copy of the specific warranty terms applicable to your Hewlett-Packard product and replacement parts can be obtained from your local Hewlett-Packard Sales and Service Office.

Copyright © 1983-1996 Hewlett-Packard Company

This document contains information which is protected by copyright. All rights are reserved. Reproduction, adaptation, or translation without prior written permission is prohibited, except as allowed under the copyright laws.

Restricted Rights Legend. Use, duplication, or disclosure by the Government is subject to restrictions as set forth in subparagraph (c)(1)(ii) of the Rights in Technical Data and Computer Software clause in DFARS 252.227-7013. Rights for non-DOD U.S. Government Departments and Agencies are as set forth in FAR 52.227-19(c)(1,2).

Use of this manual and CD-ROM(s) or tape cartridge(s) supplied for this package is restricted to this product only. Additional copies of the programs can be made for security and back-up purposes only. Resale of the programs in their present form or with alterations, is expressly prohibited.

Copyright © 1980, 1984, 1986 Novell, Inc.

Copyright © 1979, 1980, 1983, 1985-1993 The Regents of the University of California.

This software and documentation is based in part on the Fourth Berkeley Software Distribution under license from the Regents of the University of California.

Copyright © 1994 X/Open Company Limited.

UNIX® is a registered trademark in the United States and other countries, licensed exclusively through X/Open Company Limited.

Copyright © 1990 Motorola, Inc. All Rights Reserved.

"Sun" and the Sun logo are trademarks of Sun Microsystems, Inc.

Copyright © 1986-1992 Sun Microsystems, Inc.

Copyright © 1989, 1990, 1993 Open Software Foundation.

Portions of this software and documentation are based in part on Motif software and documentation developed and distributed by the Open Software Foundation.

OSF/Motif is a trademark of the Open Software Foundation in the U.S. and other countries.

Copyright © 1985, 1986, 1988, 1989 Massachusetts Institute of Technology.

Copyright © 1986 Digital Equipment Corp.

Portions of this software and documentation are based in part on software and documentation for the X Window System, Version 11, developed and distributed by Massachusetts Institute of Technology.

Printing History

New editions of this manual incorporate all material updated since the previous edition.

The manual printing date and part number indicate its current edition. The printing date changes when a new edition is printed. (Minor corrections and updates incorporated at reprint do not cause this date to change.) The manual part number changes when extensive technical changes are incorporated.

January 1996   Edition 1 (B5073-90004)

Preface

This manual describes how to write new rules for the C++ SoftBench CodeAdvisor product. It also documents the Static Database Application Programmer's Interace (API) for programmers who need to access the API for other purposes.

The following reference pages are available online via the man command:

*softbench(5)*   A high-level general description of SoftBench with a listing of generic command line options for all SoftBench tools, including C and C++ encapsulations

*softcheck(1)*   A detailed description of the softcheck command, which implements the C++ SoftBench CodeAdvisor rule engine On-line help is also available by pressing the Help key (usually F1 or Help) on any SoftBench tool.

File Location—install_root

Throughout this manual, *install_root* is:

- /usr/softbench for HP-UX 9.X
- /opt/softbench for HP-UX 10.X and Solaris

Typeface Conventions

| Convention | Description |
|---|---|
| *italic font* | Information you supply, either in syntax examples or in text descriptions. For example, if told to type: *filename*, you supply an actual file name like sample. Italics are also used for *emphasis*, and for *Titles of Books*. |
| `typewriter font` | Computer commands or other information that must be typed exactly as shown. For example, if told to type: `sample`, you type exactly the word in typewriter font, `sample`.<br><br>Menu selections are in typewriter font separated by colons. See "Menu Conventions" in this chapter. |
| boldface font | A term that may need further clarification or definition, especially a familiar word (such as menu) used with a computer-specific meaning. These terms are clarified in the glossary. |
| [ ... ] | Optional parameters in syntax examples are enclosed in brackets. |
| (KeyCap) | Represents a key on your keyboard that you must press, or an on-screen button that you must select, as part of the operation. For example, (Return) is the "Carriage Return" key, which completes a command input. This key may be labelled "RETURN", "Return", or "Enter". |
| (Key1)-(Key2) | A hyphen between keys indicates that two or more keys must be pressed at the same time. For example, "Control-(C)" means to press and hold the Control key while pressing and releasing the (C) key. The Control key may be labelled "CTRL", "Ctrl", or "Control". |

Contents

1. User Defined C++ Rules

2. Understanding the Programming Model
   The Rule Engine . . . . . . . . . . . . . . . . . . . . . . 2-1
   The Rule Base Class . . . . . . . . . . . . . . . . . . . . 2-2
   Example Rule . . . . . . . . . . . . . . . . . . . . . . . 2-5

3. Understanding the Static Database
   Database Objects . . . . . . . . . . . . . . . . . . . . . . 3-1
   Capabilities of the Database . . . . . . . . . . . . . . . . 3-2
   Learning the Database API . . . . . . . . . . . . . . . . . 3-3
      Database Objects . . . . . . . . . . . . . . . . . . . . 3-3
      Incomplete Objects . . . . . . . . . . . . . . . . . . . 3-4
      Database Types . . . . . . . . . . . . . . . . . . . . . 3-5
      Type Qualifiers . . . . . . . . . . . . . . . . . . . . . 3-6
   Accessing the Database . . . . . . . . . . . . . . . . . . 3-7
      Opening and Closing the Database . . . . . . . . . . . . 3-7
      Delimiting Transactions . . . . . . . . . . . . . . . . . 3-8
   Iterators . . . . . . . . . . . . . . . . . . . . . . . . . 3-9
      Attribute Iterators . . . . . . . . . . . . . . . . . . . 3-9
   Object Interfaces . . . . . . . . . . . . . . . . . . . . . 3-10
      The Symbol Base Class . . . . . . . . . . . . . . . . . 3-11
         Method Definitions . . . . . . . . . . . . . . . . . . 3-12
      Global Symbol Table Object . . . . . . . . . . . . . . . 3-13
         Method Definitions . . . . . . . . . . . . . . . . . . 3-14
      RefList Object . . . . . . . . . . . . . . . . . . . . . 3-17
         Method Definitions . . . . . . . . . . . . . . . . . . 3-17
         Example . . . . . . . . . . . . . . . . . . . . . . . 3-19
      Macro Object . . . . . . . . . . . . . . . . . . . . . . 3-20
      File Object . . . . . . . . . . . . . . . . . . . . . . . 3-21

| | |
|---|---|
| Method Definitions | 3-21 |
| Function Object | 3-23 |
|    Method Definitions | 3-23 |
| Parameter Object | 3-25 |
|    Method Definitions | 3-25 |
| Block Object | 3-26 |
|    Method Definitions | 3-26 |
| Label Object | 3-28 |
|    Method Definitions | 3-28 |
| Scalar Object | 3-29 |
|    Method Definitions | 3-29 |
| Variable Object | 3-30 |
|    Method Definitions | 3-30 |
| Typedef Object | 3-31 |
|    Method Definitions | 3-31 |
| Tag Object | 3-32 |
|    Method Definitions | 3-32 |
| Enum Object | 3-33 |
|    Method Definitions | 3-33 |
| EnumMember Object | 3-34 |
|    Method Definitions | 3-34 |
| Struct Object | 3-35 |
|    Method Definitions | 3-35 |
| Class Object | 3-37 |
|    Method Definitions | 3-38 |
|    Example | 3-40 |
| DataMember Object | 3-41 |
|    Method Definitions | 3-41 |
| FunctionMember Object | 3-42 |
|    Method Definitions | 3-42 |
| ClassTemplate Object | 3-43 |
|    Method Definitions | 3-43 |
| FunctionTemplate Object | 3-44 |
|    Method Definitions | 3-44 |
| TemplateArgument Object | 3-45 |
|    Method Definitions | 3-45 |
| Using the Database API | 3-46 |
| The Example Rule | 3-46 |

|   |   |   |
|---|---|---|
| Understanding the Example Rule | | 3-46 |
|    The shadow Function | | 3-46 |
|    kindMask and langMask | | 3-47 |
|    The check Function | | 3-47 |
|    Final Definitions | | 3-48 |
| Example Files | | 3-49 |
| The RulesUser_LocalHides Rule | | 3-50 |

4. Implementing Your Rule

| | |
|---|---|
| Design Guidelines | 4-1 |
| Implementing the Rule | 4-3 |
|    Decide What to Implement | 4-3 |
|    Designing the Rule | 4-4 |
|    Testing the Rule | 4-5 |
| Debugging Your Rule | 4-6 |
|    Running softcheck Under Program Debugger | 4-6 |
|    Setting Breakpoints In Your Rule | 4-8 |
|    Tracing Rule Execution | 4-9 |
| Documenting Your Rule | 4-10 |
|    Writing the On-Line Help | 4-10 |
|    Referring to Other Help Volumes | 4-11 |
|    Associating Your Rule With the On-Line Help | 4-11 |
|    Installing the On-Line Help Volume | 4-11 |

A. Detailed Database Type Descriptions

| | |
|---|---|
| Object Kind | A-2 |
| Attributes | A-3 |
| Scalar Types | A-5 |
| Language Types | A-6 |
| References | A-7 |
| Error Codes | A-8 |

B. Iterators

| | |
|---|---|
| Standard Iterators | B-2 |
| Attribute Iterators | B-4 |

Index

Figures 3-1. RefList Organization . . . . . . . . . . . . . . . . . . 3-18

1

User Defined C++ Rules

C++ SoftBench CodeAdvisor offers you a powerful tool for improving the reliability and maintainability of your C++ code. Many predefined rules come with the C++ SoftBench CodeAdvisor product, allowing you to benefit from the product "right out of the box."

You also have the ability to extend the C++ SoftBench CodeAdvisor functionality by implementing your own rules.

C++ SoftBench CodeAdvisor uses the SoftBench Static Analyzer database as its "view" on your program. You must understand the Static database before you can begin to write rules.

Adding a rule to the C++ SoftBench CodeAdvisor rule set consists of several steps:

1. Understand the C++ SoftBench CodeAdvisor programming model. Study the sample classes and examples in this manual.

2. Understand the Static database. Learn its capabilities and limitations. Learn the API (application programmer interface) used to interact with the database.

3. Design your rule, using the features of the database.

4. Write the rule and link it into the rule-checking environment. Test and debug the rule.

5. Document the new rule.

The following chapters cover each of these steps.

This document assumes you have some experience with C++ programming.

2

Understanding the Programming Model

The C++ SoftBench CodeAdvisor architecture implements rules in shared libraries. When the rule engine initializes itself, it reads in all the rule libraries it can find and invokes these rules as appropriate.

You can add your own rules by creating libraries for the rule engine to read. Your libraries will contain C++ code that define classes to implement the rules. C++ SoftBench CodeAdvisor defines the Rule base class and the interface through which your rule is invoked.

Note that you do not need to write a main() procedure for your rules. Your rules exist in a shared library, and are not intended to be run by themselves. The library is loaded and called by the rule engine in the softcheck command.

The Rule Engine

C++ SoftBench CodeAdvisor loads in all the rule libraries it finds in the shared library search path. For each Rule in a rule library, exactly one instance of the rule must be created. The C++ code that defines the rule instance should be of the form:

```
static NewRuleClass instance;
```

This forces a call to the Rule base class constructor in the main rule engine. The constructor notifies the rule engine of the existence of the new rule. The rule engine then calls each rule for all symbols that meet the rule's criteria (or only once, if that is what the rule specifies).

The Rule Base Class

Your rules are written as a class derived from the Rule base class when the library is loaded. Rule defines the interface functions required of all rules. The public interface to Rule is defined as follows:

```
class Rule
{
public:
    Rule();
    virtual ~Rule() {};    // to ensure derived class objects destructors are
                           // called even when it's deleted through a Rule ptr // Returns a mask of the kind of symbols this rule checks.
    virtual int kindMask() const = 0;

// Returns a mask of the language(s) this rule applies to.
    virtual Language langMask() const = 0;

// The member function check() is called when the engine has found a
    // symbol of interest to the rule and the rule should be checked.
    virtual void check(SymbolTable *symtab, const Symbol &sym)=0;

// Returns a one-line summary of the violation with no
    // instance-specific information.
    virtual const char *errorMess() const = 0;

// Returns the name of this rule.
    virtual const char *name() const = 0;

// When check() find a rule violation, it calls violation() with the
    // violating symbol and possibly, reference site.  Do not override these
    // functions.
    void violation(const Symbol &sym, const char *err);
    void violation(const char *file, const int line, const char *err);
};
```

You should not access the data members or friend functions of the Rule class. They are used by the rule engine.

You must provide your own versions of all the pure virtual functions: kindMask(), langMask(), check(), errorMess(), and name().

2-2 Understanding the Programming Model

The Rule public interface functions are:

Rule()
: Class constructor. As in any C++ class definition, you should implement a constructor to do any initialization (allocating memory, initializing data structures, and so on) required by your rules. Normally, however, you do not need to define your own constructor.

~Rule()
: Rule objects are not currently deleted. The Rule class defines a destructor as a placeholder. If your rule does some operation that should be cleaned up (for example, if you allocate memory), you should define a destructor to do the appropriate cleanup action.

kindMask()
: Returns a bitmask that tells what kinds of Symbols are checked by the rule. Symbol kinds are defined by the enumeration PerKind in the header file DB_Common.h. The bitmask values are created by using the PerKind enumeration values to shift a bit into the appropriate field. A rule can handle several kinds of Symbols by OR-ing the values together. For example, a rule that checks macros and functions should return a kindMask of "1 << KIND_MACRO | 1 << KIND_FUNCTION".

: As a special case, a value of 0 indicates the rule should be called only once for all symbols. You are then responsible for handling any iteration required by your rule.

langMask()
: Returns a bitmask that tells which languages the rule applies to. Languages are defined in DB_Common.h. Language values do not need to be shifted, but can be used as they are defined. As an example, a rule that applies to C and C++ should return a langMask of "LANGUAGE_C | LANGUAGE_CPP". Return LANGUAGE_UNKNOWN if the rule applies to all languages.

check()
: The main rule-check function. check() is called for every symbol in the database of the types described by kindMask(). The rule engine passes check() the SymbolTable of the Static database and the Symbol that matches the kindMask(). check() accesses all elements of the program through the database. See Chapter 3.

Understanding the Programming Model 2-3

| | |
|---|---|
| errorMess() | Returns a string that gives a generic one-line summary of the rule. |
| name() | Returns the name of the rule. Rules should be named using the convention *rulelibrary_rulename*. For example, the XYZ rule in the ABC library should be named ABC_XYZ. This avoids name collisions in the rule libraries. |
| | This naming convention also allows C++ SoftBench CodeAdvisor to retrieve the rule's online help. name() *must* return *rulelibrary_rulename* for its help to be accessed by the rule engine. To avoid confusion, name() should be the same as the class name. |
| violation() | If your rule in check() finds a violation, it should call violation() to report the violation. There are two variations of violation(). The first is used when a problem is found in a symbol definition or declaration. This form locates the definition of the symbol (or the declaration if no definition is found) for browsing purposes. The second form is used when a specific usage problem is detected, and specifies the location (file and line) of the violation. Both forms accept an err parameter, which is a string describing the specific violation. |
| | You do not define your own violation(), but merely call it from check(). |

See Chapter 3 for explanations of the Symbol and SymbolTable types.

Example Rule

The following code defines a very simple rule that enforces a common coding convention: every class name should be capitalized. (You could use the Static Analyzer to find and fix every occurrence of noncapitalized classes.)

This rule uses several data structures and functions from the Static API, which you don't need to understand yet. You can use this example to understand how rules are structured and linked into the rule engine. Since the rule uses the general XPG4 regex expression-matching library, it can easily be extended to implement other stylistic rules. (Note: Solaris 2.4 does not support regex. A simplified example without regex is installed on Solaris systems.)

Source for this rule can be found in
install_root/examples/CodeAdvisor/Rules/ruleCapClass.C. To test the rule, make and install the example rule library, as explained in the Makefile, and notify Program Builder of the new library's location by choosing "Advisor: Edit Rule Library List ... ".

```
// This is an example of a hypothetical design rule that
// could be implemented in an organization whose coding
// standards require that all Class names begin with a
// capital letter.

#include <Rule/Rule.H>
#include <ctype.h>
#include <stdio.h>
#include <regex.h>

// Define the rule interface class RulesUser_CapClass : public Rule
{
public:
   virtual int kindMask() const;
   virtual Language langMask() const;
   void check(SymbolTable *, const Symbol &);
   virtual const char *errorMess() const;
   virtual const char *name() const;
};

// This rule is invoked for all "Tag" objects. Tags include all
// compound objects, such as Classes, Templates, Structs, Unions, and Enums.
// Can't specify a kindMask() of KIND_CLASS, since check() is invoked
// only on Symbol objects. Class is not a Symbol; Tag is.
```

```
int RulesUser_CapClass::kindMask() const
{ return 1 << KIND_TAG; }

// This rule applies only to C++ code.

Language RulesUser_CapClass::langMask() const
{ return LANGUAGE_CPP; }

// Find all non-capitalized class names void RulesUser_CapClass::check(SymbolTable *, const Symbol &sym)
{
   Tag tag;
   Class cl;

// Don't want to check instances; only the class name must be capitalized.
   // This code is a common idiom to reject instances.
   // The !tag.ClassType(cl) call also rejects enums.

if (!sym.SymbolToTag(tag) || !tag.ClassType(cl) || IS_INSTANTIATED(cl.Attrib()))
      return;

// Reject structs and unions, which are also represented as Classes.

if (WAS_STRUCT(cl.Attrib()) || WAS_UNION(cl.Attrib()))
      return;

// Pattern specifying that:
   //  First character is capital letter
   //  If second character exists, it is not uppercase
   static char *capitalized_pattern = "^[[:upper:]]($|[^[:upper:]])";
   static regex_t capitalized_compiled_reg;
   static DBboolean initialized = FALSE;

// only build regular expression once.
   if (!initialized) {
      // Note that if the regular expression is rebuilt for each rule run,
      // then regfree(&capitalized_compiled_reg) should be called once
      // regexec will no longer be called with the expression to avoid
      // a memory leak.
      if (regcomp(&capitalized_compiled_reg, capitalized_pattern,
   REG_EXTENDED | REG_NOSUB)!=0)
return;
      initialized = TRUE;
   } if (regexec(&capitalized_compiled_reg, tag.Name(), 0, NULL, 0)!=0) {
      // doesn't match regular capitalized expression
```

2-6 Understanding the Programming Model

```
        char buf[1024];
        sprintf(buf,
          "Class or class template name '%s' not capitalized", tag.Name());
        violation(tag, buf);
    }
}

// Generic one-line description of the rule const char *RulesUser_CapClass::errorMess() const
{
 return("Class name not capitalized.");
}

// Rule name, should match name of C++ Class const char *RulesUser_CapClass::name() const
{
 return("RulesUser_CapClass");
}

// Force a call to base class constructor in the main program static RulesUser_CapClass instance;
```

3

Understanding the Static Database

Rules use the Static database as their view on the program being checked.

The Static database is represented as a set of persistent objects. That is, the objects are stored in the file system of your computer so they are remembered from one session to another. Each time you build your program and regenerate the Static database, a new set of objects is created in the database for future use.

Database Objects

The objects in the database represent programming constructs such as functions and variables. Each object contains attributes that define the object, and associations with other objects to reflect semantics such as references, scope, and binding. For example, a variable object has an attribute of being either global or local to some scope, and a function object is associated with its parameter list.

The API (application programmer interface) for the database allows you to open the database, examine the contents of the database, and close the database. The database API notifies you of any changes made to the database (by another process rebuilding the database) while you are accessing it.

See the files under *install_root*/examples/DbApi/Query for some simple example database queries.

Capabilities of the Database

Since the Static database contains attributes and associations for each object, it is best matched to certain kinds of rule algorithms.

For example, the database is an ideal match for a rule that examines the member functions defined in a class. The class object lists its member functions on its association list, and each member function object gives full details on its type and declaration information. You can determine inheritance information on the class, allowing you to see if any member function shadows a function inherited from a parent class.

On the other hand, the database does not contain complete information on the structure of your code. For example, the database might indicate that your code references the variable Count in the function Compute_it. Using the information in the database, you could determine if Count is modified or merely used. The database would not, however, indicate exactly what kind of statement the reference was in; you could not tell from the database whether the variable was referenced in an if test, or as a parameter in a function call.

If you consider the information provided by SoftBench Static Analyzer (function and variable references, pointers to locations in the code, and so on), you will have a good idea of the information available to you in the Static database.

If your rule requires more understanding of the program than the database can provide, you may be able to get it by directly examining the source of your program. The Static database indicates on what line of what file the variable reference occurs; from this you can open the source file and examine the code as carefully as necessary for your rule.

Even in cases that aren't a perfect match for the database's capabilities, the information in the database is a tremendous aid in finding the information you need.

Learning the Database API

You access the Static database through an Application Programmer Interface (API). The API gives you an object-oriented view onto the contents of the database, through which you can access information on your program files.

Database Objects

The database is implemented as a collection of objects. The interface to the database consists of functions to open the database and examine those objects.

In order to understand the functions in the API, you must first understand the objects manipulated by the API.

This is a brief overview of the important objects in the database. Each object type has attributes to describe its name, its type, the other objects associated with it, and other important information. See "Object Interfaces" for detailed definitions.

SymbolTable
: Contains object references that lead to all other objects in the database, much like the root directory of a file system "contains" all files below it. All navigation through the database begins at the Symbol Table. There is only one Symbol Table in the database.

Symbol
: Represents all named objects, such as files, variables, classes, and types. Symbol is the main base class. All named objects inherit from Symbol.

RefList
: Contains all references to a specific named object in the database. Each RefList contains references to an object in a specific file. For example, each variable object has RefLists associated with it to describe every reference (definition, declaration, use, modification) to the variable, one RefList per file.

Macro
: Represents a #define macro.

File
: Contains all objects defined in a specific source file. Also contains attributes that indicate "includes" and "included by" relationships.

| | |
|---|---|
| Function, Parameter | Represent program functions and their arguments. |
| Block | Represents blocks within functions. |
| Label | Represents switch and goto labels. |
| Scalar | Represents built-in types, such as int and char. |
| Variable | Represents program variables. |
| Typedef | Represents named user-defined types. |
| Tag | Represents aggregate types: enum, struct, class, and class templates. Each aggregate types is represented by a Tag (to hold the Symbol information) *and* an Enum, Struct, Class, or ClassTemplate object. |
| Enum, EnumMember | Represent enumerations and enumeration constants. |
| Struct | Represents structs and unions in C code. |
| Class | Represents C++ classes, and structs and unions in C++ code. |
| FunctionMember, DataMember | Represent C++ class member functions and data members. |
| ClassTemplate, FunctionTemplate | Represent class templates and function templates (both global template functions and member function templates). |
| TemplateArgument | Represents class template and function template arguments. |

Incomplete Objects

Some object types can be "complete" or "incomplete." An incomplete object is one for which complete information is not available; in particular, no definition is available for the symbol. This is most often encountered with externally defined objects. For example, a program might include the declaration "class Myclass;", but no definition of the class. The database knows Myclass is a class, but knows no more about it. Myclass will be incomplete in the database.

Incomplete objects behave differently than complete objects. For example, Function::Parameters() returns FALSE for an incomplete function. (See each 3-4 Understanding the Static Database object description for details.) In general, many methods return FALSE for incomplete objects. You must test the return value of appropriate methods to ensure an object is complete before using the values returned by the object's methods. Use Symbol::DefinitionSite() to test for completeness. If no definition is available, the object is incomplete.

Note that aggregate objects, such as Class and Enum, do not inherit from Symbol. You must retrieve the Tag associated with the aggregate to test DefinitionSite().

Database Types

A number of utility types are used by the database to describe objects. The most important types include:

| | |
|---|---|
| PerHandle | A "handle" referring to a persistent object in the database. |
| PerKind | The type of a persistent object, as described in the previous section (KIND_FILE, KIND_VARIABLE). |
| Attribute | Attributes of an object, such as ATTR_GLOBAL, ATTR_STATIC, ATTR_PRIVATE, or ATTR_VIRTUAL. Inline functions, such as IS_GLOBAL() and IS_STATIC(), are defined to simplify testing attribute values. |
| ScalarType | The basic type of a variable, such as SCALAR_CHAR or SCALAR_FLOAT. |
| Language | The language (such as LANGUAGE_C or LANGUAGE_CPP) associated with a file or symbol. |
| Usage | The type of reference to a symbol, such as REF_DEFINITION, REF_MODIFICATION, or REF_CALL. |
| Reference | A reference to a symbol, including the Usage type and the line and column where the reference occurs. |
| SourcePosition | A Reference within a specific file. |

These types are defined in the header file DB_Common.h. See Appendix A for a complete listing.

Type Qualifiers

Typed objects, such as Variables and Parameters, include "type" and "type qualifier" information. The Type() member returns a Symbol object referencing the derived object that describes the type. The TypeQualifier() member returns all modifying information on the base type, such as *, &, [], or const.

For example, a Variable defined by "int count" has a Type() of "int". That is, the Symbol returned by Type() represents a Scalar object with a ScalarType() of SCALAR_INT. The TypeQualifiers string is null.

A Variable defined by "class C &Cref const" has a Type() that returns the Tag for "class C". The TypeQualifier() member returns "& const".

The possible values that may be found in a TypeQualifier() string are:

| | |
|---|---|
| * | Qualifies the type as an indirection (pointer). |
| [number] | Qualifies the type as an array of dimension number. |
| & | Qualifies the type as a reference. |
| const | Qualifies the type as a constant. |
| volatile | Qualifies the type as volatile. |

Use the type-safe conversion routines Symbol::SymbolTo*type*() to test the value returned by Type() and to convert it to the appropriate type for use.

3-6 Understanding the Static Database

Accessing the Database

The basic interface to the database is quite simple. You open the database, specifying what language(s) you are interested in, and the open call returns the database's global symbol table.

You then bracket each request to the database in a "transaction," so that no other process can change the database while you are reading it.

Remember to close the database when you are finished.

Note: rule writers do not need to open the database or manage transactions. The rule engine handles all transaction processing.

Opening and Closing the Database

The SymbolTable class (described later) defines two friend functions, OpenDatabase and CloseDatabase. As their names imply, these functions are used to open and close a specified database. The database manages the accesses to it, and can safely handle a writer (such as a compiler updating the database) at the same time a reader (such as your rule) has the database open.

```
DBboolean OpenDatabase(const char *filename,
                       SymbolTable &globalsymboltable,
                       Language language,
                       DBModifiedCallback callback);

void CloseDatabase(SymbolTable &globalsymboltable);
```

Given a filename, OpenDatabase opens the database in that file and returns a pointer to the SymbolTable in the database. Language is used to specify the language(s) you are interested in; normally you will pass in LANGUAGE_CPP or LANGUAGE_CPP | LANGUAGE_C. Use LANGUAGE_UNKNOWN if you are interested in all languages. The function callback is called if the database is modified by a writer while you have it open. You can use this to indicate that the database is now out of date, just like SoftBench Static Analyzer does. The callback function must be defined as "void callback(void) { *body* }".

It is possible to open and manipulate multiple databases at once. This is useful if there are multiple databases representing your program. For example, if you compiled a library separately from the main program, in another directory, the library would have its own Static database.

CloseDatabase simply closes the database and clears the globalsymboltable pointer.

Delimiting Transactions

The database can be accessed by a writer while readers have the database open, but not while readers are actively accessing the database. You must enclose each request to the database in a "transaction." This prevents a writer from changing the database in the middle of your access.

Call the method *GST*.StartTransaction() immediately before your database access, and call *GST*.EndTransaction() as soon as you have finished. (*GST* is the Global Symbol Table object returned by your call to OpenDatabase.)

Iterators

Since an object may have an arbitrary number of items associated with it (for example, a variable may be accessed in arbitrarily many locations), the database provides a mechanism to successively select and operate on each item in a list.

The Iterators mechanism manages the iteration through a collection of items. Using Iterators, it is easy to iterate through all objects in a list, without needing to understand the underlying iteration mechanism.

Iterators are accessed by calling an "iterator definition function" defined in certain database objects. As an example, the SymbolTable class defines "ITERATOR(File) Files() const;". This function returns a C++ object of type ITERATOR(File). You use this iterator by saving the value returned by Files() and looping using the macros ITERATE_BEGIN and ITERATE_END. Within the body of the iteration loop, the current value of the iterator variable points to the current object to be operated upon.

```
ITERATOR(File) filei;       // Declare the iterator pointer
filei = GST.Files();        // Get the File iterator
ITERATE_BEGIN(filei)        // Iterate on all Files
{
    // Access information in each file, using filei as File pointer.
    // For example, to list all source files found in the database:
    cout << "File name is " << filei.Name() << endl;
}
ITERATE_END(filei);
```

See Appendix B for a more complete explanation of iterators.

Attribute Iterators

The Static API also defines a subset of iterators, called Attribute Iterators, that define a set of attributes along with each object in the iteration list. Attributes, as defined in the Static database, specify characteristics of a symbol such as Global, Static, Public, Private, and Virtual. See "Database Types". Attribute Iterators are identical to normal iterators, with the addition of two member functions (GetIteratorAttribute() and SetIteratorAttribute()) to access the attributes. See Appendix B for more information.

Object Interfaces

The class interfaces for the database objects define the bulk of the Static API. Each object defines the methods (functions) that are used to access the object. In addition, many objects also inherit from other, more generic objects (usually Symbol), which in turn define additional function interfaces.

The following sections describe the class definition interface to each object type.

Note that many object methods accept complex objects as parameters and, using C++ references, modify the parameters. These routines return the DBBoolean value FALSE if any error occurs.

Each object defines constructors and destructors. You should not use these functions, since objects are created and destroyed automatically as needed by your code. You are only interested in the additional public methods defined by each object type.

These object classes are defined in the header file DB_Read.h.

The Symbol Base Class

Symbol is the main base class. All named objects (Macro, Variable, Parameter, Function, File, Scalar, Tag, Typedef, EnumMember, DataMember, and TemplateArgument) are derived from the Symbol class. You will not encounter Symbol objects in the database; they are used only to construct other objects. All attributes that make sense for named objects, such as the object's name, definition location, and so on, are defined in Symbol and are available to all derived types.

```
class Symbol {
  public:
    Symbol(PerHandle symbolhandle);
    Symbol();
    ~Symbol();

// Handle, null test, name, kind, and attributes of this symbol.
    PerHandle Handle() const;
    DBboolean IsHandleNull() const;
    char *Name() const;
    PerKind Kind() const;
    Attributes Attrib() const;

// Enclosures of the symbol.
    DBboolean EnclosingFile(File &file) const;
    DBboolean EnclosingBlock(Block &block) const;

// List of references to this symbol
    ITERATOR(RefList) RefLists() const;

// Location of definition, if any; use this to test for completeness
    DBboolean DefinitionSite(SourcePosition &position) const;

// Conversion of this symbol to the derived kind.
    DBboolean SymbolToVariable(Variable &variable) const;
    DBboolean SymbolToParameter(Parameter &parameter) const;
    DBboolean SymbolToFunction(Function &function) const;
    DBboolean SymbolToDataMember(DataMember &datamember) const;
    DBboolean SymbolToEnumMember(EnumMember &enummember) const;
    DBboolean SymbolToFunctionMember(FunctionMember &functionmember) const;
    DBboolean SymbolToScalar(Scalar &scalar) const;
    DBboolean SymbolToTag(Tag &tag) const;
    DBboolean SymbolToTypedef(Typedef &tdef) const;
    DBboolean SymbolToTemplateArgument(TemplateArgument &templatearg) const;
    DBboolean SymbolToFunctionTemplate(FunctionTemplate &functiontempl) const;
    DBboolean SymbolToModule(Module &module) const;
    DBboolean SymbolToFile(File &file) const;
```

```
protected:
    PerHandle SymbolHandle;
};
```

Method Definitions

| | |
|---|---|
| Handle(), IsHandleNull() | Handle() returns the "handle" of the object. The handle is the object's identifier in the database. IsHandleNull() tests to see if the symbol's Handle is null. Certain access methods, such as Find in the SymbolTable object, can return a null object handle. Normally, however, you will not encounter null handles. |
| Name() | Returns the name of the object. |
| Kind() | Kind() returns an enumerated type that tells what kind of object (such as KIND_VARIABLE or KIND_FUNCTION) the symbol represents. See "Database Types". |
| Attrib() | Lists attributes of the symbol, such as ATTR_GLOBAL or ATTR_STATIC. See "Database Types". |
| EnclosingFile(), EnclosingBlock() | These functions return the handle of the file and block that contain the symbol. If the symbol is not enclosed by any block (as is the case with global variables), EnclosingBlock returns FALSE. |
| RefLists() | Returns an iterator to all RefLists for the symbol. Each RefList contains all references to the symbol in a particular file. |
| SymbolTo*type* | These functions convert a Symbol to its derived type. For example, if you had a Symbol that you determined (by checking its Kind()) was actually a Variable, you could use SymbolToVariable to create a Variable object. For example, "sym.SymbolToVariable(var)" converts the Symbol sym into the Variable var. If the Symbol is not actually of (or derived from) type *type*, the function returns FALSE. |

3-12  Understanding the Static Database

Global Symbol Table Object

The SymbolTable class defines the global symbol table for a database. A database contains exactly one SymbolTable, which acts as the "root" of the database just as "/" acts as the "root" of a filesystem. The SymbolTable contains all Files and all globally-scoped objects in the database.

```
class SymbolTable {
  public:
    SymbolTable(PerHandle symtab);
    SymbolTable();
    ~SymbolTable();

const char *FileName() const;
    time_t ModifiedTime() const;
    DBboolean StartTransaction() const;
    DBboolean EndTransaction() const;

DBboolean Contains(Symbol) const;

ITERATOR(Macro) Macros() const;
    DBboolean Find(const char *name, Macro ¯o) const;

ITERATOR(Variable) GlobalVariables() const;
    DBboolean Find(const char *name, Variable &variable) const;

ITERATOR(Function) GlobalFunctions() const;
    DBboolean Find(const char *name, Function &function) const;

ITERATOR(Tag) GlobalTags() const;
    ITERATOR(Tag) LocalTags() const;
    DBboolean Find(const char *name, Tag &tag) const;

ITERATOR(Typedef) GlobalTypedefs() const;
    DBboolean Find(const char *name, Typedef &tdef) const;

ITERATOR(Module) GlobalModules() const;
    DBboolean Find(const char *name, Module &module) const;

ITERATOR(File) Files() const;
    DBboolean Find(const char *name, File &file) const;

ITERATOR(FunctionTemplate) FunctionTemplates() const;
    DBboolean Find(const char *name, FunctionTemplate &functemp) const;

ITERATOR(Symbol) GlobalSymbols() const;
    ATTRIBUTE_ITERATOR(Symbol)
            GlobalSymbols(const char *name, PerKind kind) const;
```

```
DBboolean Find(const char *name, Symbol &sym) const;

DBboolean Find(const char *name, FunctionMember &funmem) const;

DBboolean Find(const char *name, DataMember &datamem) const;

void ActivateFiles(
            int count,
            char **filenames) const;
void ActivateFiles(
            int count,
            char **filenames,
            Language language) const;

ATTRIBUTE_ITERATOR(Symbol) SymbolsAtLocation (
            const char *name,
            const char *filename,
            long line,
            long column,
            DBboolean ignorecase,
            DBboolean useregexp,
            SymbolsAtLocationScoping &scoping) const;

private:
    PerHandle SymbolTableHandle;

friend DBboolean OpenDatabase(const char *filename,
                                SymbolTable &globalsymboltable,
                                Language language,
                                DBModifiedCallback callback);
  friend void CloseDatabase(SymbolTable &globalsymboltable);
};
```

Method Definitions

| | |
|---|---|
| FileName() | Returns the file containing the database. |
| ModifiedTime() | Returns the last time of modification. |
| StartTransaction(), EndTransaction() | Delimit a "transaction." Call these routines around each series of database queries to prevent a writer from changing the database. StartTransaction() triggers a call of the callback routine provided in the OpenDatabase call if the database has been modified since the last transaction. |

3-14  Understanding the Static Database

| | |
|---|---|
| | Transaction management is handled by the rule engine, so rule writers need not be concerned about it. |
| Contains() | Tests whether a Symbol is found in the database. This can be useful if you have multiple databases open. |
| Macros(), GlobalVariables(), GlobalFunctions(), GlobalTags(), LocalTags(), GlobalTypedefs(), GlobalModules(), Files(), FunctionTemplates() | Return iterators to scan through all objects of the specified type. Both global and local iterators are provided for Tags. The combination of the two iterators returns *all* Tags in the database. |
| GlobalSymbols() | Two overloaded functions return either all global symbols, or all global symbols of a specified name and PerKind. |
| Find() | A Find() method, for finding a global object by name, is defined for each symbol type. |
| ActivateFiles() | Limits searches to the files specified in the filenames array. Each filename must be a full canonical filename of the form *host:fullpath*. Run the command *install_root*/bin/path_to_canon *filename* to see a sample canonical name. |
| | By default, all files are active. Pass a count value of 0 to resume searching all files. |
| SymbolsAtLocation() | Returns an *attribute* iterator listing all symbols at a specified location. Null values of filename, line, or column mean to return symbols with the specified name in any File, or line or column in a File. ignorecase specifies a case-insensitive search, and useregexp specifies that name is a regular expression. If useregexp is true, name can contain any normal non-extended regular expression. The RE can also use + (preceding RE must appear 1 or more times) and |

Understanding the Static Database 3-15

? (preceding RE must appear 0 or 1 times). scoping specifies the type of "scoping" to use when searching for the symbols. See the Static Analyzer chapter of the *C and C++ User's Guide* for an explanation of scoping.

RefList Object

RefList represents an array of references. Each RefList lists all references to a symbol within one file. The Symbol object contains an iterator of Reflists, one for each file containing a reference to the Symbol.

```
class RefList {
  public:
    RefList(PerHandle reflisthandle);
    RefList();
    ~RefList();

PerHandle Handle() const;
    DBboolean IsHandleNull() const;
    Symbol SymbolFor() const;
    File FileIn() const;

int ReferenceCount() const;
    Reference operator[] (int index) const;

protected:
    PerHandle RefListHandle;
};
```

Method Definitions

| | |
|---|---|
| Handle(), IsHandleNull() | Since RefList does not inherit from Symbol, it defines its own Handle methods. |
| SymbolFor() | Returns the Symbol referenced in the RefList. |
| FileIn() | Returns the File in which the RefList references occur. |
| ReferenceCount() | Returns the number of references in the array. |
| operator[] | The [] operator is overloaded to give access to the array of references. The RefLists() iterator defined by Symbol inherits from the RefList object, and hence inherits the [] operator. See below for an example. |

Notice that there are RefLists() iterators defined on Symbol *and* File objects. The two-dimensional organization of RefLists (below) allows you to access references by symbol (stepping through the accesses in each file) or by file (stepping through accesses to all the symbols defined in that file).

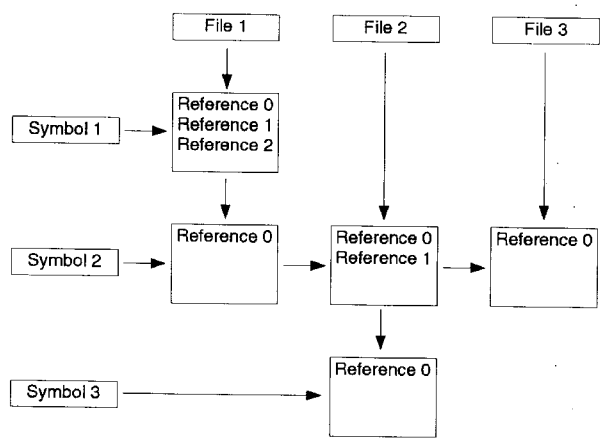

Figure 3-1. RefList Organization

In this illustration, the boxes containing "References" are RefLists. In this example, Symbol1 is a local symbol referenced only in File1. Symbol2 is global, and is referenced in all three files. File1 contains references to Symbol1 and Symbol2.

The RefLists() iterator on Symbol1 returns one element: a RefList containing three references in File1. The RefLists() iterator on File1 returns two elements: a RefList containing three references (the same RefList that was returned for Symbol1, since the references are references for Symbol1) and a RefList containing one reference to Symbol2.

See below for example code that illustrates the two-dimensional organization.

3-18  Understanding the Static Database

Example

These code fragments illustrate the use of RefLists. Notice the use of the overloaded [] operator.

This code is equivalent to choosing a "Symbol" in Figure 3-1 and following the arrows to the right:

```
// Print location of all references for the variable "var".

ITERATOR(RefList) rli = var.RefLists();
ITERATE_BEGIN(rli)
{
   printf("References in file %s:\n", rli.FileIn().Name());
   int i;
   for (i=0; i<rli.ReferenceCount(); i++) {
     printf("Line = %d, column = %d\n",
        rli[i].line, rli[i].column);
     }
}
ITERATE_END(rli)
```

This code is equivalent to choosing a "File" in Figure 3-1 and following the arrows downward:

```
// Print location of references to all symbols in the file "file".

ITERATOR(RefList) rli = file.RefLists();
ITERATE_BEGIN(rli)
{
   printf("References to symbol %s:\n", rli.SymbolFor().Name());
   int i;
   for (i=0; i<rli.ReferenceCount(); i++) {
     printf("Line = %d, column = %d\n",
        rli[i].line, rli[i].column);
     }
}
ITERATE_END(rli)
```

Macro Object

The Macro object represents C preprocessor macros (#define). It is *not* used for C++ inline functions.

```
class Macro : public Symbol {
  public:
    Macro(PerHandle symbolhandle);
    Macro();
    ~Macro();
};
```

Macro defines no interface methods of its own. All Symbol methods are available; in particular, EnclosingFile() and EnclosingBlock() can be used to find the definition scope for global and local macros, respectively.

File Object

File objects contain all the Symbols and RefLists defined within a file.

```
class File : public Symbol {
  public:
    File(PerHandle filehandle);
    File();
    ~File();

Language FileType() const;
    const char *CompileName() const;
    const char *CompileOptions() const;
    const char *CompileHost() const;
    const char *CompileDir() const;
    time_t ModifiedTime() const;

ITERATOR(RefList) RefLists() const;
    ITERATOR(File) Includes() const;
    ITERATOR(File) IncludedBy() const;
    ITERATOR(Module) Modules() const;
    ITERATOR(Macro) Macros() const;
    ITERATOR(Variable) Variables() const;
    ITERATOR(Function) Functions() const;
    ITERATOR(Tag) Tags() const;
    ITERATOR(Typedef) Typedefs() const;
    ITERATOR(FunctionTemplate) FunctionTemplates() const;

DBboolean EnclosingFunction(Symbol &symbol, int line) const;
};
```

Method Definitions

| | |
|---|---|
| FileType() | Returns the Language type of the file. |
| CompileName(), CompileOptions(), CompileHost(), CompileDir() | If the File is a source file, these function return the name of the compiler used to compile the file, the compile options used to compile the file, and the host (system) and working directory on which the file was compiled. |
| ModifiedTime() | Returns time of last file modification. |
| RefLists() | Returns an iterator over all RefLists contained in the file. |

| | |
|---|---|
| Includes(), IncludedBy() | Return iterators over all files that this file includes, and all files that include this file. |
| Modules(), Macros(), Variables(), Functions(), Tags(), Typedefs(), FunctionTemplates() | Return iterators for all types of symbols defined within the file. |
| EnclosingFunction() | Returns the function that encloses the line line in the file. Notice that EnclosingFunction returns a Symbol, not a Function. The enclosing function may be a FunctionMember or a FunctionTemplate. |

3-22 Understanding the Static Database

Function Object

Function represents complete and incomplete functions. An "incomplete" function is a function that is known only by its signature. It may be defined by an extern reference, or by a forward reference that is never completed.

Many incomplete function references are created by #include files, since they declare a function without defining it.

For incomplete functions, only the base Symbol methods are valid. All other methods return FALSE and/or null results.

```
class Function : public Symbol {
  public:
    Function(PerHandle fun);
    Function();
    ~Function();

DBboolean ReturnType(Symbol &symbol) const;
    DBboolean TypeQualifiers(char **typequalifier) const;
    DBboolean ParameterCount(int &count) const;
    ITERATOR(Parameter) Parameters() const;

DBboolean DefinitionSite(SourcePosition &position) const;

DBboolean FunctionBlock(Block &funblock) const;
    DBboolean MemberFunction(FunctionMember &funmem) const;
    DBboolean ExpandedFrom(FunctionTemplate &funtemp) const;
};
```

Method Definitions

| | |
|---|---|
| ReturnType(), TypeQualifiers() | Return the type symbol and qualifier string (such as "*" or "&") of the function return value. See "Type Qualifiers" for a more complete explanation. |
| | TypeQualifier() accepts the address of a "char *". On return the "char *" contains a pointer to the qualifier information. The memory allocated for the qualifier string is managed by the database. You should not release it. |
| ParameterCount(), Parameters() | Return the count of parameters, and an iterator over all parameters. |

| | |
|---|---|
| DefinitionSite() | This function shadows the DefinitionSite() method in Symbol. It is specialized to handle multiple functions of the same name, such as if your database includes multiple main() functions. |
| FunctionBlock() | Returns the outermost block of the function. To traverse over all scopes in the function (for example, to check all variables defined within the function), use Block::AllBlocks() on the function block. |
| MemberFunction() | Converts a Function object to a FunctionMember object. |
| ExpandedFrom() | If the function is a function instance, ExpandedFrom() returns the function template from which it was derived. |

Parameter Object

Parameter represents function parameters.

```
class Parameter : public Symbol {
public:
    Parameter(PerHandle paramhandle);
    Parameter();
    ~Parameter();

Symbol Type() const;
    const char *TypeQualifiers() const;
};
```

Method Definitions

Type(),  
TypeQualifiers()      Return the type symbol and qualifier string of the variable. See "Type Qualifiers" for a more complete explanation.

Block Object

Block represents a code block within a function. Each block defines its own local scope.

```
class Block {
  public:
    Block(PerHandle blockhandle);
    Block();
    ~Block();

PerHandle Handle() const;
    DBboolean IsHandleNull() const;
    int BeginLine() const;
    int EndLine() const;
    File BlockFile() const;

ITERATOR(Variable) BlockVariables() const;
    ITERATOR(Tag) BlockTags() const;
    ITERATOR(Typedef) BlockTypedefs() const;
    ITERATOR(Function) BlockFunctions() const;
    ITERATOR(Label) BlockLabels() const;

ITERATOR(Block) NestedBlocks() const;
    ITERATOR(Block) AllBlocks() const;
  protected:
    PerHandle BlockHandle;
};
```

Method Definitions

| | |
|---|---|
| Handle(), IsHandleNull() | Since Block does not inherit from Symbol, it defines its own Handle methods. |
| BeginLine(), EndLine(), BlockFile() | Indicate the block's location. |
| BlockVariables(), BlockTags(), BlockTypedefs(), BlockFunctions(), BlockLabels() | Return iterators over the variables, tags (classes, structs, enums, and templates), typedefs, functions, and labels defined in the block. |
| NestedBlocks() | Returns an iterator over all top-level blocks nested within the block. |

3-26  Understanding the Static Database

| | |
|---|---|
| AllBlocks() | Returns an iterator over all blocks, at all levels, nested within the block, including the block itself. This allows you to check all scopes within the block without needing to do a recursive search within the block. |

Label Object

Label represents the target of switch or goto commands. The RefLists() defined for a Label refer to the statements that branch to the Label.

```
class Label : public Symbol {
  public:
    Label(PerHandle label);
    Label();
    ~Label();

// Label container; Block, Module or File.
    DBboolean Scope(Block &block) const;
    DBboolean Scope(Module &module) const;
    DBboolean Scope(File &file) const;
};
```

Method Definitions

Scope()  These overloaded functions return the Block, Module, or File that contains the Label.

Scalar Object

Scalar objects represent built-in intrinsic types, such as int or char.

```
class Scalar : public Symbol {
  public:
    Scalar(PerHandle scalar);
    Scalar();
    ~Scalar();

ScalarType Type() const;
};
```

Method Definitions

Type()                Returns the type of the Scalar. ScalarType is
                      defined in DB_Common.h. See Appendix A for a listing.

Variable Object

Variable represents complete and incomplete program variables.

For incomplete variables, only the base Symbol methods are valid. All other methods return FALSE and/or null results.

```
class Variable : public Symbol {
  public:
    Variable(PerHandle symbolhandle);
    Variable();
    ~Variable();

Symbol Type() const;
    const char *TypeQualifiers() const;
    DBboolean Scope(Block &block) const;
};
```

Method Definitions

| | |
|---|---|
| Type(), TypeQualifiers() | Return the type symbol and qualifier string (such as "*" for a pointer) of the variable. See "Type Qualifiers" for a more complete explanation. |
| Scope() | Returns the enclosing block within which the variable is defined. |

Typedef Object

Typedef objects represent named types.

```
class Typedef : public Symbol {
  public:
    Typedef(PerHandle tdef);
    Typedef();
    ~Typedef();

Symbol Type() const;
    const char *TypeQualifiers() const;
};
```

Method Definitions

Type(),  
TypeQualifiers()      Return the type symbol and qualifier string of the typedef. See "Type Qualifiers" for a more complete explanation.

Tag Object

Tag objects represent all aggregate types, such as classes and enums. The two-part representation of aggregates (the Tag and the Enum, Struct, Class, or ClassTemplate) allows the database to handle self-referential objects.

Each tag can be mapped onto its corresponding aggregate, and vice versa. The Tag inherits from Symbol, and therefore contains all information about the aggregate's name.

```
class Tag : public Symbol {
  public:
    Tag(PerHandle symbolhandle);
    Tag();
    ~Tag();

PerKind TypeKind() const;
    DBboolean EnumType(Enum &enumeration) const;
    DBboolean StructType(Struct &structure) const;
    DBboolean ClassType(Class &cppclass) const;
    DBboolean ClassTemplateType(ClassTemplate &classtempl) const;
};
```

Method Definitions

| | |
|---|---|
| TypeKind() | Returns the type (class, enum, struct, or template) of the tag. |
| EnumType(), StructType(), ClassType(), ClassTemplateType() | These functions convert a Tag into the corresponding object. |

Enum Object

Enum objects represent enumerated types. Each Enum has a corresponding Tag. Enums objects contain EnumMember objects representing each value defined by the enum.

For an incomplete enum, only EnumTag() and Attributes() return meaningful results. All other methods return FALSE or null values.

```
class Enum {
  public:
    Enum(PerHandle symbolhandle);
    Enum();
    ~Enum();

PerHandle Handle() const;
    DBboolean IsHandleNull() const;
    DBboolean EnumTag(Tag &tag) const;
    Attributes Attrib() const;

int MemberCount() const;
    DBboolean FindEnumMember(const char *name,
                             EnumMember &member) const;
    ITERATOR(EnumMember) EnumMembers() const;

protected:
    PerHandle EnumHandle;
    friend class Tag;
};
```

Method Definitions

| | |
|---|---|
| Handle(), IsHandleNull() | Since Enum does not inherit from Symbol, it defines its own Handle methods. |
| EnumTag() | Returns the Tag object associated with the Enum. |
| Attrib() | Returns the attributes (such as ATTR_GLOBAL) of the enum. |
| MemberCount() | Returns the number of members (constants) in the enum. |
| FindEnumMember() | Returns the EnumMember with the specified name. |
| EnumMembers() | Returns an iterator over all members in the enum. |

EnumMember Object

EnumMember objects represent the constant values of an Enum.

```
class EnumMember : public Symbol {
  public:
    EnumMember(PerHandle symbolhandle);
    EnumMember();
    ~EnumMember();

Enum MemberOf() const;
    int Value() const;
};
```

Method Definitions

MemberOf()      Returns the enum of which this object is a member.

Value()         Returns the ordinal (numeric) value of this member.

Struct Object

Struct objects represent structures and unions in C code. Structures and unions are represented as Class objects in C++ code, since C++ makes no real distinction between structs, unions, and classes.

Note: if a header file is included by both C and C++ files, any structs defined in the header file are promoted to Class objects even when they are used in C code.

Each Struct has a corresponding Tag.

Struct objects contain DataMember objects to represent the data fields in the struct.

For an incomplete struct, only StructTag() and Attributes() return meaningful results. All other methods return FALSE or null values.

```
class Struct {
  public:
    Struct(PerHandle structhandle);
    Struct();
    ~Struct();

PerHandle Handle() const;
    DBboolean IsHandleNull() const;
    DBboolean StructTag(Tag &tag) const;
    Attributes Attrib() const;

int MemberCount() const;
    DBboolean FindDataMember(const char *name,
                             DataMember &datamember) const;
    ITERATOR(DataMember) DataMembers() const;

private:
    PerHandle StructHandle;
    friend class Tag;
};
```

Method Definitions

| | |
|---|---|
| Handle(), IsHandleNull(), StructTag(), Attrib() | These members are identical to the corresponding members in Enum. |
| MemberCount() | Returns a count of data members in the struct. |

Understanding the Static Database  3-35

| | |
|---|---|
| FindDataMember() | Returns the DataMember in this Struct with the specified name. |
| DataMembers() | Returns an iterator over all data members in the struct. |

Class Object

Class objects represent C++ classes. Structs and unions in C++ code are also represented by Class, since C++ makes no real distinction between classes and the other aggregate types. (You can determine if the Class was declared as a struct or union by testing the Attrib() value using the attribute-testing functions WAS_STRUCT() and WAS_UNION().)

Each Class has a corresponding Tag.

Class objects contain DataMember and FunctionMember objects to represent the data fields and methods defined by the class. Class objects also contain iterators to list the parent (base) classes and children (derived) classes of the class.

Class objects contain only the members that are defined *by that class*. You must seek back through parent classes to find all members inherited from base classes. See below for an example.

For an incomplete struct, only ClassTag() and Attrib() return meaningful results. All other methods return FALSE or null values.

Note that class *instances* are represented as incomplete Classes. In this specific case, when the attribute IS_INSTANTIATED is set, ExpandedFrom() returns the template from which the class is instantiated. To derive information about instances, you must access the instantiating template.

```
class Class {
  public:
    Class(PerHandle cls);
    Class();
    ~Class();

PerHandle Handle() const;
    DBboolean IsHandleNull() const;
    DBboolean ClassTag(Tag &tag) const;
    Attributes Attrib() const;

int MemberCount() const;
    DBboolean FindDataMember(const char *name,
                             DataMember &member) const;
    DBboolean FindFunctionMember(const char *name,
                                 FunctionMember &member) const;
    ITERATOR(DataMember) DataMembers() const;
    ITERATOR(FunctionMember) FunctionMembers() const;
    ITERATOR(Function) AllFunctions() const;
```

```
    ATTRIBUTE_ITERATOR(Tag) BaseClasses() const;
    ATTRIBUTE_ITERATOR(Tag) DerivedClasses() const;
    ITERATOR(Tag) NestedClasses() const;
    ITERATOR(Tag) NestedEnums() const;
    ITERATOR(Symbol) Friends() const;
    DBboolean ExpandedFrom(Tag &tag) const;

protected:
    PerHandle ClassHandle;
    friend class Tag;
};
```

Method Definitions

| | |
|---|---|
| Handle(), IsHandleNull(), ClassTag(), Attrib() | These members are identical to their corresponding members in Enum. |
| MemberCount() | Returns a count of the data and function members in the class. |
| FindDataMember(), FindFunctionMember() | Returns the DataMember or FunctionMember in this Class with the specified name. |
| DataMembers(), FunctionMembers() | Return iterators over all data members or function members in the class. |
| AllFunctions() | Like FunctionMembers(), but also returns FunctionTemplates in a ClassTemplate. |
| BaseClasses(), DerivedClasses() | Return *attribute* iterators over the immediate parent or immediate derived classes of this class. (Notice that these iterators return Tags, not Classes.) For example, suppose class Z inherits from classes Y1 and Y2, and Y1 inherits from X. The BaseClasses() iterator on class Z returns *only* Y1 and Y2. To find the deeper ancestors of Z, you must use the BaseClasses() iterators on Y1 and Y2. Similarly, DerivedClasses() on X returns *only* Y1 and any other classes that inherit directly from X. See below for an example. |

3-38  Understanding the Static Database

| | |
|---|---|
| | Note that `BaseClasses()` is guaranteed to return all base classes of a class, but `DerivedClasses()` cannot be guaranteed to return all derived classes. It is possible that code not included in the database derives from this class. |
| | `GetIteratorAttribute()` returns the attributes of the inheritance relationship: virtual, public, private, or protected. |
| `NestedClasses()`, `NestedEnums()` | Return iterators over the classes and enums nested within the class. |
| `Friends()` | Returns an iterator over the `friend` functions of the class. |
| `ExpandedFrom()` | If the class is an instance of a class template, `ExpandedFrom()` returns the tag of the class template of which it is an instance. |

Example

This function prints all data members in the class referred to by a specified Class, including all inherited data members.

```
void function_members(Class cls) { printf("Function Members defined in class %s:\n", cls.Name());
   ITERATOR(FunctionMember) fmi = cls.FunctionMembers();
   ITERATE_BEGIN(fmi)
   {
      printf("  %s:\n", fmi.Name());
   }
   ITERATE_END(fmi)

// Iterate over immediate parent classes of this class
   // and recursively print their function members ATTRIBUTE_ITERATOR(Tag) bci = cls.BaseClasses();
   ITERATE_BEGIN(bci)
   {
     Class cls2;
     bci.ClassType(cls2);        // BaseClasses returns Tags;
     function_members(cls2);     //   convert to Class & recurse
   }
   ITERATE_END(bci)
}
```

DataMember Object

DataMember objects represent the data members of structures, classes, and class templates.

```
class DataMember : public Symbol {
  public:
    DataMember(PerHandle datamem);
    DataMember();
    ~DataMember();

Symbol Type() const;
    const char *TypeQualifiers() const;
    DBboolean MemberOf(Struct &parentstruct) const;
    DBboolean MemberOf(Class &parentclass) const;
    DBboolean MemberOf(ClassTemplate &parenttemplate) const;
};
```

Method Definitions

Type(),
TypeQualifiers()
: Return the type symbol and qualifier string of the data member. See "Type Qualifiers" for a more complete explanation.

MemberOf()
: The overloaded functions MemberOf return the aggregate structure (struct, class, or class template) of which this object is a member. If you do not know what type of object contains the DataMember, you can call each of the overloaded MemberOf functions until one returns TRUE.

Understanding the Static Database 3-41

FunctionMember Object

FunctionMember objects represent function members of C++ classes. FunctionMember inherits from the Function class.

```
class FunctionMember : public Function {
  public:
    FunctionMember(PerHandle funmem);
    FunctionMember();
    ~FunctionMember();

Class MemberOf() const;
};
```

Method Definitions

MemberOf()  Returns the class of which this function is a member.

ClassTemplate Object

ClassTemplate objects represent C++ parametric classes. Each ClassTemplate has a corresponding Tag.

Like Class objects, ClassTemplate objects contain the data members and member functions defined by that class template.

For an incomplete object, only ClassTag() and Attrib() return meaningful results. All other methods return FALSE or null values.

```
class ClassTemplate : public Class {
  public:
    ClassTemplate(PerHandle classtemplatehandle);
    ClassTemplate();
    ~ClassTemplate();

int ArgumentCount() const;
    ITERATOR(TemplateArgument) TemplateArguments() const;

DBboolean FindFunctionTemplate(
                const char *name,
                FunctionTemplate &functiontemplate) const;
    ITERATOR(FunctionTemplate) FunctionTemplateMembers() const;

ITERATOR(Tag) Instantiations() const;

protected:
    PerHandle ClassTemplateHandle;
    friend class Tag;
};
```

Method Definitions

| | |
|---|---|
| ArgumentCount(), TemplateArguments() | Return a count of, and an iterator over, the template's arguments. |
| FindFunction-Template() | Returns the function template member with the specified name. |
| FunctionTemplate-Members() | Returns an iterator over all function templates in the template. |
| Instantiations() | Returns an iterator over all classes instantiated from this template. |

FunctionTemplate Object

FunctionTemplate objects represent C++ parametric functions.
FunctionTemplate inherits from the Function class.

```
class FunctionTemplate : public Function {
  public:
    FunctionTemplate(PerHandle functiontemplatehandle);
    FunctionTemplate();
    ~FunctionTemplate();

int ArgumentCount() const;
    ITERATOR(TemplateArgument) TemplateArguments() const;
    DBboolean MemberOf(ClassTemplate &parenttemplate) const;
    ITERATOR(Function) FunctionInstantiations() const;
};
```

Method Definitions

| | |
|---|---|
| ArgumentCount(), TemplateArguments() | Return a count of, and an iterator over, the function template's arguments. |
| MemberOf() | If the FunctionTemplate is a member of a ClassTemplate, returns the class template of which this function template is a member. |
| FunctionInstantiations() | If the FunctionTemplate is a pure function template, FunctionInstantiations() returns a function iterator over all instances of the template. |

3-44 Understanding the Static Database

TemplateArgument Object

TemplateArgument objects represent C++ parametric type arguments. They are used for class template and template function arguments.

```
class TemplateArgument : public Symbol {
  public:
    TemplateArgument(PerHandle templateargumenthandle);
    TemplateArgument();
    ~TemplateArgument();

// Type and type qualifiers of the argument.
    Symbol Type() const;
    const char *TypeQualifiers() const;

DBboolean ArgumentOf(ClassTemplate &usedinclass) const;
    DBboolean ArgumentOf(FunctionTemplate &usedinfunc) const;
};
```

Method Definitions

| | |
|---|---|
| Type(), TypeQualifiers() | Return the type symbol and qualifier string of the argument. See "Type Qualifiers" for a more complete explanation. |
| ArgumentOf() | Returns the class or function template of which this is an argument. If you do not know what type of object contains the TemplateArgument, you can call each of the overloaded ArgumentOf() functions until one returns TRUE. |

Using the Database API

The following example is one of the actual rules delivered with the C++ SoftBench CodeAdvisor product. This real-life example will help you to understand how the database API is used in rules.

The Example Rule

This rule, RulesUser_LocalHides, detects local identifiers with the same name as a local or inherited data member or member function. You can read a description of the rule in the online help for the CommonCxx_LocalHides rule. The source of the rule is included in the next section, and can also be found in *install_root*/examples/CodeAdvisor/Rules/ruleLocalHides.C. To test the rule, make and install the example rule library, as explained in the Makefile, and notify Program Builder of the new library's location by choosing "Advisor: Edit Rule Library List ... ".

The algorithm used is straightforward: for each class, scan through all member functions. In each function, check all parameters and all local variables to see if there is a conflict.

The majority of this processing happens in two functions: RulesUser_LocalHides::check() and shadow(). shadow() is a utility routine that does the actual checking for conflicts.

Understanding the Example Rule

As with the simple RulesUser_CapClass rule in Chapter 2, RulesUser_LocalHides starts out by defining the RulesUser_LocalHides class interface. Every rule you write should define the class interface like this. The only difference will be the actual name of the rule class.

The shadow Function

After defining a short utility function to extract the simple name of a class member (the part after the "::"), the code defines the shadow utility function. This function returns TRUE if it finds any visible symbol in the class cl or any base (inherited) classes with the same name as sym. If so, the hidden symbol is returned in hidden_sym.

3-46 Understanding the Static Database

After getting the name of the symbol, shadow() begins by iterating through all local functions in cl. (AllFunctions() returns all member functions in a class, and all function templates in a template.) Next it iterates through all local data members. The test is the same for both types of symbols: if the symbol is visible (if it is in this class, or is a non-private member of a base class), and has the same name as sym, return the hidden_sym.

If there are no collisions in the current class, shadow iterates through all base classes of the current class and calls itself recursively to check the base classes. Note that BaseClasses() returns only the *immediate* parent or parents of a class, not all ancestor classes. The recursive call takes care of moving up the inheritance chain.

If the current class has no base classes, BaseClasses() returns no items, so the iterator loop is never entered. Execution continues after the ITERATE_END(tagi) and the function returns FALSE, indicating it has not yet found any collisions.

kindMask and langMask kindMask() returns the bitmask 1 << KIND_TAG, indicating that check() should be called on all Tag objects. As with RulesUser_CapClass, this rule applies only to Class objects, but check() is invoked only on Symbol objects. Class does not inherit from Symbol, so check() cannot be invoked on Class. The rule must accept all Tags and filter out the non-Class objects.

langMask() indicates that the rule applies only to C++ code.

The check Function

Other than shadow(), the check() function handles the majority of the rule processing. check() is called for each Tag object. The first test in check(), as with RulesUser_CapClass, screens out all class or template instances. (Since the instances have the same member names as the classes and class templates, there is no need to check them.) Note that RulesUser_LocalHides does not filter out structs and unions like RulesUser_CapClass did. Since structs and classes are essentially identical in C++, it is possible to have name conflicts in structs just as in classes.

Understanding the Static Database 3-47 check() then iterates through all functions in the class. Remember that AllFunctions() returns all member functions of a class, as well as all function templates in a template, so the same code can handle both cases.

The loop first rejects "synthetic" compiler-generated functions and "incomplete" functions. (Incomplete functions have a declaration but no definition, and therefore no FunctionBlock. Ordinarily you should check for incompleteness by testing the DefinitionSite(), as explained in "Incomplete Objects". However, since check() needs the FunctionBlock later, testing for FunctionBlock is a handy alternate way to check for incompleteness.) Since "incomplete" functions have no code definition and therefore no parameter definitions, they should not be checked.

Finally, check() iterates through all the member function parameters and all variables defined within the function, calling shadow() on each one. If shadow() detects any conflicts, check() calls violation() to signal a problem.

Final Definitions errorMess() defines a generic one-line description of the rule.

name() returns the name of the rule. By convention this name must be of the form *libname_rulename*; among other things, this is required so C++ SoftBench CodeAdvisor can access the rule's online help. For simplicity, name() should also be the same as the rule class name.

Once the rule class is completely defined, a static definition forces a call to the Rule constructor. This links the rule into the rule engine and enables it for use.

Example Files

The RulesUser_CapClass and RulesUser_LocalHides rules are available on-line in *install_root*/examples/CodeAdvisor/Rules. The files in this directory include:

| | |
|---|---|
| Makefile | A make control file to build all the example files |
| ruleCapClass.C, ruleLocalHides.C | Sources for the example rules |
| symName.C | Source for the symName() function described in "Debugging Your Rule" in Chapter 4 |
| RulesUser.htg | On-line help file for the example rules |
| Testcase | A directory containing a simple test case for RulesUser_CapClass |
| ruleTemplate.C | A "template" file to use as a starting point when writing rules |
| debugPoints.C | Source for the debuggable main() in softcheck—used only by SoftBench Program Debugger |

You can examine the sources for any of the rules and support files. You can also build and test the rules using the Makefile. "make" builds the rule library. "make all" builds the rule library, test case, and help volume. See the comments in the Makefile for more information.

You can test the rule library using Program Builder, or using softcheck. You must specify the location of the rule library (using "Advisor: Edit Rule Library List ... " in Program Builder, or the -1 flag to softcheck) and the location of the test case Static.sadb file (if not in the current directory).

"make install" installs the rule library in a suggested location. Note that you must do the install as "root" in order to install the help library, since the required directory (*install_root*/dt/appconfig/help/C) is not writable by users.

Understanding the Static Database  3-49

The RulesUser_LocalHides Rule

```cpp
#include <Rule/Rule.H>
#include "strings.h"
#include <assert.h>
include <stdio.h>        // Note, only sprintf is used; no stdio/iostream mix class RulesUser_LocalHides : public Rule
{
public:
   virtual int kindMask() const;
   virtual Language langMask() const;
   void check(SymbolTable *, const Symbol &);
   virtual const char *errorMess() const;
   virtual const char *name() const;
};

// Return a pointer to the simple name of a member.
// Returns a pointer to a static buffer.
//
static char * simpleFuncName(char const *x)
{
assert(x != NULL);

static char buffer[100];
   char const *colon, *pren;

if ((colon = strstr(x, "::")) != NULL)
     colon = colon + 2;
   else colon = x;

if ((pren = strchr(colon, '(')) == NULL)
     strcpy(buffer, colon);
   else
     { strncpy(buffer, colon, pren-colon);
       buffer[pren-colon] = '\0';
     } return(buffer);
}

// Test to see if a symbol hides (or has the same name but doesn't hide)
// some member of a class, or some inherited member.
//
static DBboolean shadow(const Symbol &sym,      // symbol that may be shadowed
                        const Class &cl,        // class to check members of
```

3-50   Understanding the Static Database

```
                        Symbol &hidden_sym,    // symbol sym hides
                        DBboolean baseclassp = FALSE   // is this a baseclass
                        )                      // of one where sym defined?
{
   const register char * const name = sym.Name();

// test sym name against local member functions
   ITERATOR(Function) fmi=cl.AllFunctions();
   ITERATE_BEGIN(fmi)
   {
      if ((!(baseclassp && IS_PRIVATE(fmi.Attrib()))) &&   // visible
          strcmp(name, simpleFuncName(fmi.Name()))==0) {   // name matches
         hidden_sym = fmi;
         return TRUE;
      }
   }
   ITERATE_END(fmi)

// test sym name against local member data
   ITERATOR(DataMember) dmi=cl.DataMembers();
   ITERATE_BEGIN(dmi)
   {
      if ((!(baseclassp && IS_PRIVATE(dmi.Attrib()))) &&   // visible
          strcmp(name, simpleFuncName(dmi.Name()))==0) {   // name matches
         hidden_sym = dmi;
         return TRUE;
      }
   }
   ITERATE_END(dmi)

// test base classes of this class
   ATTRIBUTE_ITERATOR(Tag) tagi=cl.BaseClasses();
   ITERATE_BEGIN(tagi)
   {
      Class baseclass;
      if (!tagi.ClassType(baseclass)) {
         // can't put above stmt in assert, or it would only happen debug
         assert(tagi.ClassType(baseclass));
      } if (shadow(sym, baseclass, hidden_sym, TRUE))
         return TRUE;         // as soon as you find one, it's safe to return
   }
   ITERATE_END(tagi)

return FALSE;
}
```

```
int RulesUser_LocalHides::kindMask() const
{ return 1 << KIND_TAG; }

Language RulesUser_LocalHides::langMask() const
{ return LANGUAGE_CPP; }

// For all member functions of all classes,
//   Find all local variables defined in all blocks within function
//   Also find all parameters of the member function
//      See if any local variable/parameter duplicates the name of any local
//            or inherited *visible* member.
//      If so, report a violation.
//
void RulesUser_LocalHides::check(SymbolTable *, const Symbol &sym)
{  Tag tag, templ;
   Class cl;
   Symbol hidden_sym;

if (!sym.SymbolToTag(tag) || !tag.ClassType(cl) || cl.ExpandedFrom(templ))
       return;           // look at classes and templates, skip instances // Find all member functions
   ITERATOR(Function) fmi=cl.AllFunctions();
   ITERATE_BEGIN(fmi)
   {
      if (IS_SYNTHETIC(fmi.Attrib()))
          continue;                       // skip compiler generated functions // locate function's main block
      Block fblock;
      if (!fmi.FunctionBlock(fblock))   // Incomplete function?
          continue;

char buf[1024];
      // check member function's parameters
      ITERATOR(Parameter) parami=fmi.Parameters();
      ITERATE_BEGIN(parami)
      {
         if (shadow(parami, cl, hidden_sym)) {
            sprintf(buf,
                 "Parameter '%s' of '%s' hiding member '%s' with same name",
                 parami.Name(), fmi.Name(), hidden_sym.Name());
            violation(parami, buf);
         }
      }
      ITERATE_END(parami)
```

3-52  Understanding the Static Database

```
    // check variables defined in any block within function
    ITERATOR(Block) blocki=fblock.AllBlocks();
    ITERATE_BEGIN(blocki)
    {
        ITERATOR(Variable) vari=blocki.BlockVariables();
        ITERATE_BEGIN(vari)
        {
            if (shadow(vari, cl, hidden_sym)) {
                sprintf(buf,
                        "Local variable '%s' in '%s' hiding member '%s' with same name",
                        vari.Name(), fmi.Name(), hidden_sym.Name());
                violation(vari, buf);
            }
        }
        ITERATE_END(vari)
    }
    ITERATE_END(blocki)
  }
  ITERATE_END(fmi)
} const char *RulesUser_LocalHides::errorMess() const
{
 return("Local variable or parameter hiding member (function or data) with same name");
} const char *RulesUser_LocalHides::name() const
{
 return("RulesUser_LocalHides");
}

// Force a call to base class constructor in the main program
static RulesUser_LocalHides instance;
```

Understanding the Static Database  3-53

4

Implementing Your Rule

Now that you understand the building blocks you can work with, you can decide how to implement your rule. You must decide what approach will work best within the C++ SoftBench CodeAdvisor framework.

Design Guidelines

The following are suggested guidelines for your rule designs.

- *Do not generate excessive violations.*
  It's usually better to miss flagging a few errors than to flag incorrect violations. If you generate incorrect violations, or too many violations, the user will tend to discount the warnings. You may want to flag "possible" errors if they are very serious, but try to generate only violations that definitely warrant attention.

Note that "noisy" rules may be useful to flag possible problems for code-reading sessions.

- *Choose breadth over depth.*
  Do not try to cover every possible case when writing a rule. There is often a nearly-infinite supply of odd corner cases. Your time is better spent covering the major cases, and then moving on to cover the major cases of another rule.

- *Check templates and classes, not instances.*
  Almost all rules that test classes check the class structure. For example, a rule might check the safety of the constructor, or the member functions and data members in the class. Since class instances have the same structure as their parent template, you should not test instances. If you did, it would result in duplicate error messages for the template and for all its instances.

- *Write your code to work for both classes and templates.*
  Most class rules apply equally well to classes and templates, so it makes sense to check both. Test Symbol objects with Symbol::SymbolToClass(), which succeeds for both classes and templates. Be aware that the test also succeeds for structs and unions in C++ code, since C++ treats them almost identically. Use the functions WAS_STRUCT and WAS_UNION to test the object's Attrib() value in the rare case (such as RulesUser_CapClass) when it's important to distinguish between classes, structs, and unions.

Use AllFunctions() to iterate through member functions, since this iterator also returns function templates.

- *Test for incomplete objects.*
  Design your rules so they properly handle incomplete objects. Certain objects (Variables, Functions, Enums, Structs, Classes, and ClassTemplates) can exist in an "incomplete" state. This happens when only a forward or external reference is found, so no definitional information is available. (Class template instances are also represented as incomplete classes.) See "Incomplete Objects" in Chapter 3 for more information on detecting incomplete objects.

- *Implement a test case before implementing a rule.*
  It's possible that the C++ compiler already detects the rule you are considering. Make sure the job hasn't already been done for you. Try higher "verbosity" levels on your compiler, such as "+w" on HP-UX.

Implementing the Rule

Once you understand the rule model, the Static API, and the design guidelines, you can begin implementing your rules.

The example files provided with the system can be very helpful when learning the rule programming environment. If you have not studied the examples described in "Example Files" in Chapter 3, please do so before proceeding.

The following sections outline a recommended procedure for developing rules.

Decide What to Implement

First, you should consider what kind of rules you want to implement. There are several possible classes of rules:

- Rules that detect subtle C++ usage errors, such as the rules shipped with C++ SoftBench CodeAdvisor. You may be aware of other C++ areas that can cause problems. If so, you may want to implement your own rules to check for them. Be aware that Hewlett Packard intends to continue to expand the set of rules shipped with C++ SoftBench CodeAdvisor, and it is possible that your rule may be superseded by a new rule in a future release. However, in the meantime you will benefit from the rule.

- Rules that detect common coding errors, such as the C++ SoftBench CodeAdvisor rule that detects accidental use of "/n" instead of "\n".

- Rules that enforce adherence to a standard such as XPG4.

- Stylistic rules that help to enforce local coding conventions. This may be one of the most useful areas for you to explore.

Develop a list of rule candidates. You may want to examine the current literature to get ideas for good rules. Your local coding conventions may provide a good source of ideas.

When you have drawn up a list of potential rules, you should prioritize them. Which rules are the most practical to implement? You don't want to spend time on a rule that turns out to be nearly impossible to implement. Your time might be better spent writing several less-challenging rules.

Keep the Static API capabilities in mind when assigning difficulty scores. An apparently simple rule may be difficult to implement if it requires program knowledge that the database does not provide.

Next, which rules would provide the most benefit? Which rules detect severe errors, and which detect minor problems? A rule might be simple to implement, but will it actually help to prevent coding problems? Will it catch only minor problems that could be ignored without penalty?

Once you understand these properties, you can use a simple "biggest bang for the buck" measure to decide which rules to implement.

Designing the Rule

Write a clear description of the rule. Write example code that illustrates the problem. This example will provide useful test cases.

Examine the logic of the rule. How can you implement it using the database? For example, does the rule apply to all functions? If so, you should use the API's built-in iteration to select all functions for you. Define a kindMask() that causes the rule engine to invoke your rule on every Function object.

Does the rule apply to all classes? If so, you must implement a "two-step" approach. Your rule's check() function can only be called on objects derived from Symbol, but Class does not inherit from Symbol. You must instead specify a kindMask() of "1 << KIND_TAG", and filter out the non-Class objects. See the RulesUser_LocalHides rule in "Using the Database API" in Chapter 3 for an example.

Once you have decided how the API should call your check() function, you can determine what check() should do when it is called. What does the rule test for? If it checks the parameters of a function, you would want to iterate using Function::Parameters(). If the rule checks for inheritance problems in classes, you would iterate over Class::BaseClasses() and recursively test each of the base classes. The exact procedure you use will depend on your rule's semantics.

4-4 Implementing Your Rule

Testing the Rule

After you write the initial code for your rule, you will enter an iterative development process. Run the rule on your example code. Does it catch all the cases it should?

You should also run the rule on some large code samples. Verify that any violations are valid. Does the rule detect the appropriate error cases? Does it flag code that should not be flagged? Does it trigger so many violations that users will get overwhelmed and tend to ignore the rule's warnings?

Modify your implementation to refine the error cases detected by the rule, and test again. Continue in this process until your rule meets your requirements.

See "Debugging Your Rule" for an explanation of running and debugging rules.

Debugging Your Rule

After you have implemented your rule, you can test it by running it under Program Builder or by using the softcheck command.

Program Builder provides the complete user interface that your users will see, and also allows you to test the linkage to your on-line help. To notify Program Builder of the new rule library's location, choose "Advisor: Edit Rule Library List ... ".

softcheck provides a very simple and "light-weight" interface to the rule engine. You *must* use softcheck if you need to use SoftBench Program Debugger to find subtle problems. See the *softcheck(1)* reference page for an explanation of softcheck.

Be aware that the rule engine holds open a transaction during the time that you debug your rule. Other processes will be unable to update the database (the Static.sadb file) while you are debugging.

Running softcheck Under Program Debugger

The example Makefile in *install_root*/examples/CodeAdvisor/Rules correctly handles debug and static flags (-g and -y) from Program Builder. If you invoke make directly from the command line, you must specify the debug flags using "make CXXOPTS="-g -y"" (on HP-UX) or "make COMPFLAGS="-g -y"" (on Solaris).

The softcheck executable shipped with CodeAdvisor is not debuggable. User defined rules can be debugged by building the rules into a debuggable shared library and then running the debuggable SDK version of softcheck, *install_root*/examples/CodeAdvisor/softcheck, under Program Debugger.

1. Once Program Debugger has started, choose "File: Load New Executable ... ".

2. In the "Program Arguments" Input Box, enter "-l *library-dir*", where *library-dir* is the directory containing your debuggable rule library. This tells softcheck to load your rule library, just as if you chose "Advisor: Edit Rule Library List ... " in Program Builder.

4-6  Implementing Your Rule

3. In the "Working Directory" Input Box, enter the directory where the Static.sadb file containing your test cases is located. (If you started Program Debugger in that directory, you don't need to specify it in the "Working Directory" Input Box.)

4. If you want to run only a few rules in your test library, specify them by entering "-r *rule-name*" in the "Program Arguments" Input Box.

5. If desired, you can set the environment variable RULE_DEBUG by entering the appropriate values in the "Program Environment Variables" section of the dialog box. See "Tracing Rule Execution".

6. Select (OK) to run softcheck.

If you want to save these settings for future debugging sessions, select (Save As Defaults) before selecting (OK), then choose "Options: Save All Settings".

Program Debugger now starts softcheck, and pauses in main() in the file debugPoints.C.

When debugging your rule, you may want to define a simple function to return the Name of a symbol. Program Debugger does not allow you to call functions interactively across shared libraries, so you cannot call Symbol::Name() on your symbol. If you define SymName(Symbol) in your library, you can (Print) "SymName(sym)" to display the name of the current symbol. A sample implementation of symName() is provided in *install_dir*/examples/CodeAdvisor/Rules/symName.C.

Implementing Your Rule   4-7

Setting Breakpoints In Your Rule

Since rules are stored in dynamically-loaded shared libraries, you must know how to debug these libraries within Program Debugger. You cannot yet set breakpoints in your rule library, since the library has not been loaded. You must load your rule libraries first.

1. Enter "libsLoaded" in the Program Debugger "( ):" Input Box and choose "Break: Set At ( )". (Or, since libsLoaded() is directly after main() in debugPoints.C, you can simply scroll the window down to libsLoaded and set the breakpoint by clicking in the Annotation Margin to the left of the Source File Edit Area.) This sets a breakpoint on an empty function that is called after the rule libraries are loaded, but before any rules are checked.

2. Select (Continue) as needed until you reach the breakpoint at libsLoaded. Depending on how the libraries were built and a few timing issues, you may encounter SIGCHLD and/or SIGALRM signals, or you may stop as your shared library is loaded.

3. Choose "Execution: Images ... ".

Your rules library will be one of the last libraries listed in the "Dynamic Images" dialog box. Select the toggle button next to your library to load its debug information.

The debug information can also be loaded by entering "property libraries -add" (or "pro lib -add") followed by the basename of your rule library in the "Debugger Input" Input Box.

4. Set any break points needed in your rules.

5. Select (Continue). When you encounter the breakpoints in your rule, you can debug as you normally would.

Tracing Rule Execution

You can cause softcheck to generate some extra output that may be useful in your debugging. The environment variable RULE_DEBUG accepts several values:

RULE_DEBUG=1   Displays a message just before calling each rule. The message indicates the object on which the rule is being invoked. This can be very useful if, for example, you encounter a core dump in your rules. By turning on this message, you can immediately see what rule caused the core dump, and what object triggered the problem.

RULE_DEBUG=4   Displays a message when a Static.sadb file is loaded into the database. This can be useful when you are "merging" several Static.sadb files using "Advisor: Add Code Check Directories ... "

These values are elements in a bitmask, and can be combined. For example, "RULE_DEBUG=5" displays messages when rules are called *and* when Static.sadb files are loaded.

You can also set the SA_SHLIB_TEST variable (to any value) to display a message when a rule library is loaded. This allows you to ensure that your library is being loaded properly. If not, you may need to change the -l arguments to softcheck, or add the library directory to the search list using "Advisor: Edit Rule Directory List ... ". Note that this diagnostic message can sometimes appear *after* violations have been displayed.

You can set RULE_DEBUG and SA_SHLIB_TEST at a shell prompt before calling the softcheck command, or in the "Program Environment Variables" Input Box in the "File: Load New Executable ... " dialog box in Program Debugger.

Documenting Your Rule

In addition to the normal documentation that is recommended for any program, you should provide on-line help for your rule.

When your rule detects and reports a violation, the user has the option of displaying an on-line summary and explanation of the rule. In SoftBench Program Builder, this is done by selecting the (Help) button after selecting the violation display.

When the user selects (Help), a message is sent to the SoftBench On-Line Help server to display the help text. The help server searches for and displays the help associated with your rule.

Writing the On-Line Help

SoftBench uses the CDE-standard dthelptag on-line help tool. Use dthelptag to compile your help volume, and dthelpview to view it. See *Common Desktop Environment: Help System Author's and Programmer's Guide* for a description of the HelpTag language and compilation tools. A compressed PostScript copy of this manual is available in install_root/dt/doc/Help_Pgrmer_Guide.ps.Z.

Your help text should conform to the format used by the standard C++ SoftBench CodeAdvisor help. Each node should include the following:

- A node title, named after the rule
- An italicized one-line summary of the rule
- A more in-depth explanation of the rule and its rationale
- "What Triggers Rule": A clear description of the conditions that cause the rule to fire
- "Corrective Action": Recommended steps to resolve the problem
- "Exceptions": Cases in which a rule violation may be ignored If desired, you may also mention the rule's origin.

See install_root/examples/CodeAdvisor/Rules/RulesUser.htg for a sample help volume.

Referring to Other Help Volumes

The basic HelpTag tools allow you to refer to other nodes within your help volume. The SoftBench help server has been extended to allow you to refer to a node in another volume, using the EXTERNREF hyperlink keyword:

```
<link hyperlink="EXTERNREF helpvolume helpnode" type="AppDefined">
Hyperlink text
<\link>
```

Associating Your Rule With the On-Line Help

In order for your help text to be accessible to (Help) requests, you must follow certain naming conventions.

The Rule::name() defined for each rule must consist of two parts: the rule library name and the rule name, separated by an underscore ("_"). This should be the same as the name of the rule object. For example, the RulesUser_CapClass rule in Chapter 2 defines a name() of "RulesUser_CapClass".

Note, however, that "_" is not a legal character in HelpTag node names. For this reason, the "RulesUser_CapClass" help node is named "RulesUserCapClass". The SoftBench On-Line Help system constructs this node name from the rule's Rule::name() and displays the proper help node.

The help volume (the helpvol.sdl file generated by the dthelptag command) must be named rulelib.sdl, where rulelib corresponds to the rule library name in your rules ("RulesUser" in the example above). Each rule help node within the help volume must have an id= entry that gives the node the same name as the rule it describes, with the underscore removed. For example, the help node for the RulesUser_CapClass rule is named RulesUserCapClass.

Installing the On-Line Help Volume

As root, install the rulelib.sdl file in the install_root/dt/appconfig/help/$LANG directory. For non-localized installations, $LANG has a value of C.

See *SoftBench SDK: Encapsulator User's Guide* for more information on writing and installing help volumes.

Implementing Your Rule 4-11

A

Detailed Database Type Descriptions

The Static database interface provides three header files to declare the constants, types, and functions used to access the database. These files are:

DB_Common.h   Common types and constants used by the database. The contents of this file are described in this Appendix.

DB_Read.h   The "read" interface to the database. The contents of this file are described in "Object Interfaces" in Chapter 3.

DB_Write.h   The "write" interface to the database. These routines are used only by tools that create Static databases, such as compilers. This package is available as a separate product. The "write" library is not included in the basic SDK.

The database header files are found under *install_dir*/include/DB_Access.

Object Kind

Database objects are represented by a "handle" of type PerHandle. They are typed by the enum PerKind, which has the following values:

KIND_BADSYMBOL, KIND_SYMBOLENTRY, KIND_FILEENTRY,
        KIND_RELATION, KIND_REFLIST, KIND_ENUM, KIND_STRUCT,
        KIND_CLASS, KIND_CLASSTEMPLATE, KIND_SOURCEFILE,
        KIND_SCALAR, KIND_MODULE, KIND_MACRO, KIND_IDENTIFIER,
        KIND_LABEL, KIND_TAG, KIND_TYPEDEF, KIND_VARIABLE,
        KIND_PARAMETER, KIND_BLOCK, KIND_FUNCTION,
        KIND_ENUMMEMBER, KIND_DATAMEMBER, KIND_FUNCTIONMEMBER,
        KIND_FUNCTIONTEMPLATE, and KIND_TEMPLATEARGUMENT.

The first four PerKind values are only used internally. You will not encounter them.

The remaining PerKind values correspond to the different object types defined in the database. (See "Object Interfaces" in Chapter 3.)

Each Symbol is tagged with a PerKind, allowing you to determine what type of object it represents. Various functions (such as the SymbolTable::GlobalSymbols iterator) allow you to "filter" their results by specifying the PerKind you are interested in.

Rules specify a kindMask that limits the PerKinds for which they are designed.

A-2 Detailed Database Type Descriptions

Attributes

Each object has an attribute field that describes the attributes pertinent to that object. The Attribute type is defined as a bit vector:

```
typedef unsigned long Attribute;
```

Attributes are combined as necessary for a given object.

The interface also defines inline functions in DB_Common.h to test the associated Attribute values. These predicate functions generally start with IS_, WAS_, or HAS_, such as IS_GLOBAL(), WAS_STRUCT(), and HAS_DEFAULT(). The predicate associated with each Attribute value is listed below.

The attributes are:

| | |
|---|---|
| ATTR_GLOBAL | Must be set on all symbols in the global SymbolTable. (IS_GLOBAL()) |
| ATTR_CONST | Applies to constant class members and constant Variables. (IS_CONST()) |
| ATTR_STATIC | Applies to static class members and static Variables. (IS_STATIC()) |
| ATTR_VOLATILE | Applies to local Variables. (IS_VOLATILE()) |
| ATTR_PUBLIC | Applies to class members and inheritance relationships. (IS_PUBLIC()) |
| ATTR_PRIVATE | Applies to class members and inheritance relationships. (IS_PRIVATE()) |
| ATTR_PROTECTED | Applies to class members and inheritance relationships. (IS_PROTECTED()) |
| ATTR_VIRTUAL | Applies to class members and inheritance relationships. (IS_VIRTUAL()) |
| ATTR_PURE | Applies only to virtual class member functions. (IS_PURE()) |
| ATTR_ABSTRACT | Applies to classes that contain a pure virtual function. (IS_ABSTRACT()) |

| | |
|---|---|
| ATTR_DECLARED_STRUCT | Applies to C++ classes that were declared as a C struct. (WAS_STRUCT()) |
| ATTR_DECLARED_UNION | Applies to C++ classes that were declared as a C union. (WAS_UNION()) |
| ATTR_ANONMEM | Applies to class members and local Variables that are part of an anonymous union. (IS_ANONMEN()) |
| ATTR_DEFAULT | Applies to function parameters that have a default initializer. (HAS_DEFAULT()) |
| ATTR_SPECIALIZATION | Applies to specialized class and function template instances. (IS_SPECIALIZATION()) |
| ATTR_INLINED | Applies to functions and member functions that are declared inline. (IS_INLINED()) |
| ATTR_MERGE_MEMBERS | Applies to Blocks to indicate if Block members of the same name should be merged or kept distinct. (MERGE_MEMBERS()) |
| ATTR_COMPILE_ERRORS | Applies to Files that compiled with errors. (HAS_COMPILE_ERRORS()) |
| ATTR_INSTANTIATED | Applies to functions and classes that are instances of a template. (IS_INSTANTIATED()) |
| ATTR_SYNTHETIC | Applies to compiler generated functions, class members (such as automatically created class constructors or destructors), and variables. (IS_SYNTHETIC()) |

A-4 Detailed Database Type Descriptions

Scalar Types

Scalar types are described by members of the ScalarType enum. Legal ScalarType values are:

| | |
|---|---|
| SCALAR_CHAR | Signed character type. |
| SCALAR_UNSIGNED_CHAR | Unsigned character type. |
| SCALAR_WIDE_CHAR | The NLS wide character type. |
| SCALAR_SHORT | Signed short integer type. |
| SCALAR_UNSIGNED_SHORT | Unsigned short integer type. |
| SCALAR_INT | Signed integer type. |
| SCALAR_UNSIGNED_INT | Unsigned integer type. |
| SCALAR_FLOAT | Floating point type. |
| SCALAR_DOUBLE | Double precision floating point type. |
| SCALAR_LONGDOUBLE | Long double precision floating point type. |
| SCALAR_TEMPLARG | Class type variable of a template. |
| SCALAR_FUNCTYPE | Type is a function. |
| SCALAR_LOGICAL | Fortran logical type. |
| SCALAR_STRING | Pascal string type. |
| SCALAR_TEXT | Pascal file type. |
| SCALAR_LABEL | Type code label. |
| SCALAR_POINTER | Fortran pointer type. |
| SCALAR_VOID | C and C++ void type. |
| SCALAR_LONG | Signed long integer type. |
| SCALAR_UNSIGNED_LONG | Unsigned long integer type. |

Language Types

The Language type is used to determine the programming language contained in a File. Language is a bit vector defined as:

typedef unsigned long Language;

The legal Language values are:

| | |
|---|---|
| LANGUAGE_C | C source file. |
| LANGUAGE_F77 | FORTRAN 77 source file. |
| LANGUAGE_PASCAL | HP Pascal source file. |
| LANGUAGE_COBOL | HP COBOL source file. |
| LANGUAGE_BASIC | BASIC source file. |
| LANGUAGE_ADA | Ada source file. |
| LANGUAGE_CPP | C++ source file. |
| LANGUAGE_UNKNOWN | Any source file kind. |

References

A reference is a tuple of line, column, length, and usage information. The line, column and length describe the token position in the file; the Usage describes the context in which the reference occurs. Reference is defined as follows:

```
typedef struct  { unsigned long length : 8;
                  unsigned long line   : 24;
                  unsigned short column;
                  Usage use; } Reference;
```

Usage is defined as a bit vector containing any combination of the following values:

| | |
|---|---|
| REF_DEFINITION | Site at which the object is defined and the storage of the construct is determined. An object usually has only one REF_DEFINITION site. |
| REF_DECLARATION | Site at which an object is introduced into scope. A REF_DEFINITION is also a REF_DECLARATION site. |
| REF_MODIFICATION | Site at which the memory associated with the object is written. |
| REF_CALL | Site at which a function or procedure is called. |
| REF_DEREF | Site at which a pointer value is used to read or write memory. |
| REF_ADDROF | Site at which the address of the object is determined. |
| REF_USE | Site at which the object is read or used. |
| REF_VIRTUALCALL | Site at which a virtual function is being called via the dynamic binding mechanism. |

Detailed Database Type Descriptions   A-7

Error Codes

The database interface routines define a global variable DBError to allow the application to diagnose any problems. This variable is primarily set during database open/close operations and during write operations; therefore, it is not generally used in rules.

DBError has two fields: one to record any system error (errno) and the other to record any error condition detected by the database.

The definition of DBError is:

```
typedef struct { unsigned short database;
                 unsigned short system; } DBErrorCode;
extern DBErrorCode DBError;
```

The database error codes are:

| | |
|---|---|
| DBERR_INCORRECT_DB_VERSION | The file being opened as a database file is not a database file or is an obsolete version. |
| DBERR_DATABASE_NOT_OPEN | A database operation was attempted without a database file open. |
| DBERR_DATABASE_ALREADY_OPEN | The process attempted to open a database that it already had open. |
| DBERR_MAPPING | There was an error in mapping the database file. |
| DBERR_FILETABLE_EXCEEDED | There was an attempt to open more than the maximum number of databases (512) that may be simultaneously opened. |
| DBERR_DBSIZE_EXCEEDED | There was an attempt to create a database larger than the configured maximum size. |
| DBERR_DBFILE_OPEN | There was a problem in opening the database file. |
| DBERR_DBFILE_RESIZE | There was a system failure in an attempt to resize the database file. |
| DBERR_DBFILE_STAT | There was a system failure in an attempt to stat the database file. |

A-8 Detailed Database Type Descriptions

| | |
|---|---|
| DBERR_DBFILE_READ | There was a system failure in an attempt to read from the database file. |
| DBERR_LOCKFILE_OPEN | There was a system failure in an attempt to open the lock file. |
| DBERR_LOCK | There was a system failure in an attempt to lock the lock file. |
| DBERR_BAD_NAME | A bad (non string) name value was passed to a routine in the write interface. |
| DBERR_BAD_ATTRIBUTES | A bad attribute value was passed to a routine in the write interface. |
| DBERR_BAD_SCALAR | A bad ScalarType was passed to a routine in the write interface. |
| DBERR_BAD_HANDLE | A bad handle was passed to a routine in the write interface. |

B

Iterators

Iterators are the mechanism used to loop through an arbitrary number of objects in the Static database. Because of some limitations in the C++ template mechanism, it's not possible to define general iterators using templates. Instead, the Static database interface simulates the template functionality using #defines.

"Iterators" in Chapter 3 gives a simple explanation of the use of iterators. That explanation is sufficient for most users. This section explains the mechanism behind iterators.

Standard Iterators

Iterators are defined as follows:

```
class Iterator {
public:
    Iterator(long count, PerHandle *handles);
    Iterator();
    Iterator(const Iterator &iterator);
    ~Iterator();
    Iterator &operator=(Iterator &iterator);
    void add(long count, PerHandle *handles) const;
    DBboolean Open(PerHandle &handle) const;
    DBboolean Next(PerHandle &handle) const;
    DBboolean Done() const;
protected:
    PerHandle IteratorHandle;
};

define ITERATOR(Base) Base##Iterator define ITERATOR_IMPLEMENT(Base, Handle)                        \
class ITERATOR(Base) : public Base, public Iterator {           \
public:                                                         \
    ITERATOR(Base)(long count, PerHandle *PH) :                 \
        Base(), Iterator(count, PH) { }                         \
    ITERATOR(Base)():Base(),Iterator() { }                      \
    ~ITERATOR(Base)() { }                                       \
    DBboolean Open() {return Iterator::Open(Handle);}           \
    DBboolean Next() {return Iterator::Next(Handle);}           \
}
```

Iterator defines a base class upon which all iterators are implemented. The iterator for each object type in the database is defined by invocations of ITERATOR_IMPLEMENT in DB_Read.h.

ITERATOR_IMPLEMENT(*object*) defines the class ITERATOR(*object*) (which expands to *object*Iterator). This new class inherits from both Iterator and the *object* base class.

B-2 Iterators

Static database code can then declare functions of type ITERATOR(*object*).
These functions return an iterator on objects of type *object*. Since the iterator
class inherits both from Iterator and from *object*, the new iterator can be
used to access both Iterator operations (to step through objects in the
iteration list) and *object* operations and data (to manipulate objects in the
list).

The methods Open() and Next() allow navigation through the array of
iterators. For readability, the following macros are defined:

```
// Macros for constructing iterator loops.
#define ITERATE_BEGIN(sym)   if ((sym).Open()) do
#define ITERATE_END(sym)     while ((sym).Next());
```

Thus, to access all RefLists on symbol sym, you could write:

```
ITERATOR(RefList) rli = sym.RefLists();
ITERATE_BEGIN(rli)
{
  // manipulate Symbol rli:
  printf("Referenced in file %s\n",
         rli.FileIn().Name());
}
ITERATE_END(rli)
```

Iterators  B-3

Attribute Iterators

A few objects use a specialized form of Iterator called AttributeIterator. AttributeIterators are identical to Iterators in every way, except that each object in the iteration list includes an Attribute field.

Attribute, as defined in DB_Common.h, specifies what kind of symbol is defined by the current object. As an example, a symbol may be ATTR_PUBLIC or ATTR_PRIVATE.

Attribute iterators are defined in only two situations: in the Global Symbol Table and in Class objects. The attribute iterators in the Global Symbol Table give access to the Attribute value of all global symbols and on all symbols matching a set of criteria. The attributes returned by these iterators can include any attribute that can apply to a symbol. The attribute iterators in classes describe the nature of the inheritance relationship with base and inherited classes: public, private, protected, or virtual.

AttributeIterators define two additional member functions, GetIteratorAttribute() and SetIteratorAttribute(), to access the Attribute field of the symbol or inheritance. Ordinarily you should use only the GetIteratorAttribute() member.

Other than the occasional use of the GetIteratorAttribute() and SetIteratorAttribute() accessor functions, you use AttributeIterators exactly the same as ordinary Iterators.

B-4   Iterators

Attributes are defined as follows:

```
class AttributeIterator : public Iterator {
  public:
    AttributeIterator(long count, PerHandle *handles, Attributes *attr);
    AttributeIterator();
    ~AttributeIterator();
    void add(long count, PerHandle *handles, Attributes *attr) const;
    DBboolean SetIteratorAttribute(Attributes) const;
    DBboolean GetIteratorAttribute(Attributes &) const;
};

define ATTRIBUTE_ITERATOR(Base) Base##AttributeIterator define ATTRIBUTE_ITERATOR_IMPLEMENT(Base, Handle)                       \
class ATTRIBUTE_ITERATOR(Base) : public Base, public AttributeIterator { \
  public:                                                                \
    ATTRIBUTE_ITERATOR(Base)(long count, PerHandle *PH, Attributes *ATT) \
        : Base(), AttributeIterator(count,PH,ATT) { }                    \
    ATTRIBUTE_ITERATOR(Base)() : Base(), AttributeIterator() { }         \
    ~ATTRIBUTE_ITERATOR(Base)() { }                                      \
    DBboolean Open() {return Iterator::Open(Handle);}                    \
    DBboolean Next() {return Iterator::Next(Handle);}                    \
}
```

Iterators  B-5

Index

A

Aggregate objects, 3-5
AllBlocks(), 3-26
AllFunctions(), 3-38
API, 3-1
ArgumentCount(), 3-43, 3-44
ArgumentOf(), 3-45
ATTR_*attrtype*, A-3
Attrib(), 3-12, 3-33, 3-35, 3-38
Attribute, 3-5, A-3
Attribute iterators, 3-9, B-4

B

BaseClasses(), 3-38
BeginLine(), 3-26
Block, 3-4, 3-26
BlockFile(), 3-26
BlockFunctions(), 3-26
BlockLabels(), 3-26
BlockTags(), 3-26
BlockTypedefs(), 3-26
BlockVariables(), 3-26
Boldface font, vi
Breakpoints, 4-7

C check(), 2-3
Class, 3-4, 3-37
ClassTag(), 3-38
ClassTemplate, 3-4, 3-43
ClassTemplateType(), 3-32
ClassType(), 3-32

CompileDir(), 3-21
CompileHost(), 3-21
CompileName(), 3-21
CompileOptions(), 3-21
Computer font, vi
Contains(), 3-15

D

Database, 3-1
  opening and closing, 3-7
  transactions, 3-8
DataMember, 3-4, 3-41
DataMembers(), 3-35, 3-38
DBERR_*errtype*, A-8
DBError, A-8
Debugging rules, 4-6, 4-8
DefinitionSite(), 3-23
DerivedClasses(), 3-38
Design guidelines, 4-1
Designing rules, 4-4
Documenting, 4-10
dthelptag, 4-10

E

Ellipses, vi
EnclosingBlock(), 3-12
EnclosingFile(), 3-12
EnclosingFunction(), 3-21
EndLine(), 3-26
EndTransaction(), 3-15
Enum, 3-4, 3-33
EnumMember, 3-4, 3-34

EnumMembers(), 3-33
EnumTag(), 3-33
EnumType(), 3-32
errorMess(), 2-3
Example rules, 2-5, 3-46–53
ExpandedFrom(), 3-23, 3-38
EXTERNREF, 4-11

F

File, 3-3, 3-21
FileIn(), 3-17
FileName(), 3-15
Files(), 3-15
FileType(), 3-21
Find(), 3-15
FindDataMember(), 3-35, 3-38
FindEnumMember(), 3-33
FindFunctionMember(), 3-38
FindFunctionTemplate(), 3-43
Font
  boldface, vi
  computer, vi
  italic, vi
  typewriter, vi
Friends(), 3-38
Function, 3-3, 3-23
FunctionBlock(), 3-23
FunctionInstantiations(), 3-44
FunctionMember, 3-4, 3-42
FunctionMembers(), 3-38
Functions(), 3-21
FunctionTemplate, 3-4, 3-44
FunctionTemplateMembers(), 3-43
FunctionTemplates(), 3-15, 3-21

G

GlobalFunctions(), 3-15
GlobalModules(), 3-15
GlobalSymbols(), 3-15
GlobalTags(), 3-15
GlobalTypedefs(), 3-15

GlobalVariables(), 3-15
Guidelines, 4-1

H

Handle(), 3-12, 3-17, 3-26, 3-33, 3-35, 3-38

I

Implementing rules, 4-3
IncludedBy(), 3-21
Includes(), 3-21
Incomplete objects, 3-4
*install_root*, v
Instantiations(), 3-43
IsHandleNull(), 3-12, 3-17, 3-26, 3-33, 3-35, 3-38
Italic font, vi
ITERATE_BEGIN, 3-9
ITERATE_END, 3-9
Iterators, 3-9, B-1

K

Keycaps, vi
Kind(), 3-12
KIND_*kind*, A-2
kindMask(), 2-3

L

Label, 3-4, 3-28
LANG_*langtype*, A-6
langMask(), 2-3
Language, 3-5, A-6
LocalTags(), 3-15

M

Macro, 3-3, 3-20
Macros(), 3-15, 3-21
Makefile, 3-49
MemberCount(), 3-33, 3-35, 3-38
MemberFunction(), 3-23
MemberOf(), 3-34, 3-41, 3-42, 3-44

ModifiedTime(), 3-15, 3-21
Modules(), 3-21

N name(), 2-3
Name(), 3-12
NestedBlocks(), 3-26
NestedClasses(), 3-38
NestedEnums(), 3-38

O

Object types, 3-3
Online examples, 3-49
On-line help, 4-10
   external links, 4-11
operator[], 3-17

P

Parameter, 3-3, 3-25
ParameterCount(), 3-23
Parameters(), 3-23
PerHandle, 3-5
PerKind, 3-5, A-2

Q

Qualifiers, 3-6

R

Reference, 3-5, A-7
ReferenceCount(), 3-17
RefList, 3-3, 3-17
RefLists(), 3-12, 3-21
REF_*reftype*, A-7
ReturnType(), 3-23
Rule(), 2-3
Rule class, 2-2
RULE_DEBUG, 4-8
Rule engine, 2-1
Rules
   debugging, 4-6, 4-8
   designing, 4-4 implementing, 4-3
testing, 4-5

S

SA_SHLIB_TEST, 4-8
Scalar, 3-4, 3-29, A-5
SCALAR_*scalartype*, A-5
ScalarType, 3-5
Scope(), 3-28, 3-30
Setting breakpoints, 4-7
softcheck, 4-6
SourcePosition, 3-5
StartTransaction(), 3-15
Static API, 3-1
Static database, 3-1
Struct, 3-4, 3-35
StructTag(), 3-35
StructType(), 3-32
Symbol, 3-3, 3-11
SymbolFor(), 3-17
SymbolsAtLocation(), 3-15
SymbolTable, 3-3, 3-14
SymbolTo*type*, 3-12

T

Tag, 3-4, 3-32
Tags(), 3-21
TemplateArgument, 3-4, 3-45
TemplateArguments(), 3-43, 3-44
Testing rules, 4-5
Tracing rules, 4-8
Transactions, 3-8
Type(), 3-25, 3-29, 3-30, 3-31, 3-41,
   3-45
Typedef, 3-4, 3-31
Typedefs(), 3-21
TypeKind(), 3-32
Type qualifiers, 3-6
TypeQualifiers(), 3-23, 3-25, 3-30,
   3-31, 3-41, 3-45
Typewriter font, vi

U

Usage, 3-5

V

Value(), 3-34
Variable, 3-4, 3-30
Variables(), 3-21
violation(), 2-3

What is claimed is:

1. A method for indicating a logical error within a program of calling a virtual function of a class passed in by value within a computer program, said method comprising the steps of:
   (a) examining each function within said program to determine when a function calls other functions;
   (b) when step (a) finds a qualifying function that calls other functions, examining said qualifying function to determine when said qualifying function contains a parameter that is a class passed in by value;
   (c) when step (b) finds a class parameter that is passed by value, examining each call to a virtual function within said qualifying function and when a c all is to a virtual function that matches said parameter found in step (b) indicating an error.

2. A method for indicating a logical error within a program of failing to identify a member function of a class as a "const" function when said member function modifies no data members of said class, said method comprising the steps of:
   (a) examining each member function within said program to determine when said member function is not a constructor function, is not a destructor function, is not a virtual function, is not a static function, does not return a non "const" reference and does not return a pointer;
   (b) when step (a) finds a qualifying function, examining said qualifying function to determine when said qualifying function fails to modify a data member of a class containing said function, fails to call any other function that modifies a data member, and fails to indirectly modify a data member through the use of a "this" reference;
   (c) when step (b) finds a qualifying function meeting the requirements of step (b), indicating an error.

3. A method for indicating a logical error within a program of failing to identify a parameter of a function as a "const" parameter when said function does not modify said parameter, said method comprising the steps of:
   (a) examining each parameter of a function within said program;
   (b) when a parameter of step (a) is a reference parameter and is not identified as a "const" parameter, examining each reference to said parameter within said function;
   (c) when said reference found in step (b) fails to modify said parameter, indicating an error of failing to identify said parameter as "const".

4. A method for indicating a logical error within a program of using a compiler generated constructor function that fails to initialize non-inherited data members, said method comprising the steps of:
   (a) examining each class of said program to determine if a class fails to contain a user-defined constructor;
   (b) when a qualifying class is found in step (a), further examining said qualifying class to determine if said qualifying class contains any data members that are not a class, or a class template; and
   (b) when step (b) finds a class satisfying the requirements of step (b), indicating an error.

5. A method for indicating a logical error within a program of calling a virtual function from within a constructor function or a destructor function, said method comprising the steps of:
   (a) examining each constructor function of each class of said program;
   (b) examining each function call within each constructor found in step (a);
   (c) when a function call found in step (b) is a call to a virtual function, indicating an error;
   (d) examining each destructor function of each class of said program;
   (e) examining each function call within each destructor found in step (d); and
   (f) when a function call found in step (e) is a call to a virtual function, indicating an error.

6. A method for indicating a logical error within a program having multiple definitions of an object, said method comprising the steps of:
   (a) examining each object of said program;
   (b) examining each reference to said object examined in step (a), and when said reference comprises a definition of said object, retaining a location of said definition;
   (c) when step (b) finds subsequent definitions of said object, indicating an error.

7. A method for indicating a logical error within a program having multiple declarations of an object, said method comprising the steps of:
   (a) examining each object of said program to determine whether said object is not a class, and not a static variable;
   (b) examining each reference to said object qualified by step (a), and when said reference comprises a declaration of said object, retaining a location of said definition;
   (c) when step (b) finds subsequent declarations of said object, indicating an error.

8. The method of claim 7 wherein step (b) further comprises the step of examining a location of a definition of said object and when said location of said definition and said location of said declaration are not in files that are compiled as part of a same compilation unit, indicating an error.

9. A method for indicating a logical error within a program using incompatible types of input/output functions, said method comprising the steps of:
   (a) examining said program to locate a function call to a function of a first type of input/output; and
   (b) examining said program to locate a reference to an object of a second type of input/output, and when step (a) finds a function call to said first type, and step (b) finds a reference to said second type, indicating an error.

10. A method for indicating a logical error within a program when a data member or member function inherited from a base class is hidden by a data member or member function defined in a class derived from said base class, said method comprising the steps of:
    (a) examining each object of said program to determine if said object is a member function or data member;
    (b) when step (a) finds a qualifying object, examining each function in each base class from which a class containing said qualifying object has been derived, directly or indirectly, to detect whether said qualifying object matches an object located in said each base class;
    (c) when step (b) finds a matching object, examining said matching object and when said matching object is not a virtual member function and when said qualifying object performs any operation other than calling said matching object using identical parameters, indicating an error.

11. The method of claim 10, wherein step (c) further comprises the step of:
- (c1) when step (b) finds a matching object that is a data member, indicating an error.

12. A method for indicating a logical error within a program when a non-static data member of a class is not initialized, said method comprising the steps of:
- (a) examining each object of said program to determine if said object is a definition of a class;
- (b) when step (a) finds a qualifying object, examining each function within said qualifying object to select functions that are constructor functions not created by a compiler of said program;
- (c) when step (b) finds a qualifying function, examining each data member of said qualifying object to select data members that are not classes, not class templates, and not static;
- (d) when step (c) finds a qualifying data member, examining said qualifying function to locate an initialization of said qualifying data member;
- (e) when step (d) finds no initialization for said data member in said qualifying function, examining each function called by said qualifying function for an initialization of said qualifying data member and when no initialization is found, indicating an error.

13. A method for indicating a logical error within a program when dynamically initialized variables are dynamically initialized in more than one compilation unit, said method comprising the steps of:
- (a) examining each object of said program to select those objects that are global variables, local static variables, or static data members;
- (b) when step (a) finds a qualifying object, examining each reference to said qualifying object and selecting those references that dynamically initialize the qualifying object;
- (c) when step (b) finds a qualified reference, examining each location that initiated said qualified reference to be dynamically initialized and indicating an error when locations are found in more than one compilation unit.

14. A method for indicating a logical error within a program when dynamically initialized variables are used in dynamic initialization before said dynamically initialized variables are initialized, said method comprising the steps of:
- (a) examining each object of said program to select those dynamically initialized objects that are global variables, local static variables, or static data members;
- (b) when step (a) finds a qualifying object, examining each reference to said qualifying object and selecting those other objects identified by said each reference that are dynamically initialized using said qualifying object;
- (c) when step (b) finds a qualified other object, identifying a dynamic initialization site of said qualified other object and indicating an error when said dynamic initialization site of said qualified other object is not located beyond a location of said qualifying object in a same compilation unit.

* * * * *